(12) United States Patent
Kato et al.

(10) Patent No.: US 7,721,343 B2
(45) Date of Patent: May 18, 2010

(54) COPYRIGHT MANAGEMENT METHOD, INFORMATION RECORDING/REPRODUCING METHOD AND DEVICE, AND INFORMATION RECORDING MEDIUM AND METHOD OF MANUFACTURING THE MEDIUM

(75) Inventors: Taku Kato, Kamakura (JP); Tadashi Kojima, Yokohama (JP); Hisashi Yamada, Yokohama (JP); Atsushi Ishihara, Yokohama (JP)

(73) Assignee: Kabushiki Kaish Toshiba, Tokyo (JP)

( * ) Notice: Subject to any disclaimer, the term of this patent is extended or adjusted under 35 U.S.C. 154(b) by 1093 days.

(21) Appl. No.: 11/263,034

(22) Filed: Nov. 1, 2005

(65) Prior Publication Data

US 2006/0112284 A1    May 25, 2006

(30) Foreign Application Priority Data

Nov. 22, 2004  (JP)  ............................ 2004-337635
Jan. 24, 2005  (JP)  ............................ 2005-015973

(51) Int. Cl.
G06F 7/04    (2006.01)
G06F 17/30   (2006.01)
H04N 7/16    (2006.01)

(52) U.S. Cl. .......................... 726/27; 713/193; 380/200
(58) Field of Classification Search ................. 380/200, 380/201, 203; 726/26, 27, 29, 31, 33; 713/193
See application file for complete search history.

(56) References Cited

U.S. PATENT DOCUMENTS 6,398,245 B1 *   6/2002  Gruse et al. ................. 280/228
6,609,116 B1 *   8/2003  Lotspiech ..................... 705/57
6,738,878 B2 *   5/2004  Ripley et al. ................. 711/164
6,748,539 B1 *   6/2004  Lotspiech ..................... 726/20
6,789,177 B2 *   9/2004  Okada ......................... 711/164
6,832,319 B1 *  12/2004  Bell et al. .................... 713/193

(Continued)

FOREIGN PATENT DOCUMENTS

EP    1 089 273 A2    4/2001

(Continued)

OTHER PUBLICATIONS

European Search Report dated Mar. 31, 2006 for Appln. No. 05109458.9.

(Continued)

*Primary Examiner*—David García Cervetti
(74) *Attorney, Agent, or Firm*—Pillsbury Winthrop Shaw Pittman, LLP

(57) ABSTRACT

Reinforcement of a system renewability is realized skillfully utilizing properties peculiar to a system. As a result, there is produced such a new effect as to similarly reinforce required specification with respect to copyright protection of a content recorded in a medium for exclusive use in reproduction and a recordable medium. In a system which encrypts information such as a content to record/reproduce the information, design is made so that encryption/decryption processing information differs for a device (software (S/W) main body device) whose main body is software constituted of a recording/reproducing drive of a recording medium and a personal computer (PC), a device (hardware (H/W) main body device) whose main body is hardware integrally containing a drive and data coding/demodulation processing, and the medium for exclusive use in reproduction and the recording medium.

4 Claims, 34 Drawing Sheets

U.S. PATENT DOCUMENTS

| | | | |
|---|---|---|---|
| 6,883,097 B1* | 4/2005 | Lotspiech et al. | 713/193 |
| 6,912,634 B2* | 6/2005 | Ripley et al. | 711/164 |
| 6,993,135 B2* | 1/2006 | Ishibashi | 380/277 |
| 7,007,162 B1* | 2/2006 | Lotspiech | 713/151 |
| 7,120,251 B1* | 10/2006 | Kawada et al. | 380/201 |
| 7,136,348 B2* | 11/2006 | Irie et al. | 369/275.3 |
| 7,142,494 B2* | 11/2006 | Sako et al. | 369/53.21 |
| 7,155,591 B2* | 12/2006 | Ripley et al. | 711/164 |
| 7,155,609 B2* | 12/2006 | Chan et al. | 713/171 |
| 7,170,839 B2* | 1/2007 | Irie et al. | 369/59.24 |
| 7,227,952 B2* | 6/2007 | Qawami et al. | 380/201 |
| 7,305,711 B2* | 12/2007 | Ellison et al. | 726/29 |
| 7,380,137 B2* | 5/2008 | Bell et al. | 713/193 |
| 7,395,429 B2* | 7/2008 | Kitani et al. | 713/171 |
| 7,421,742 B2* | 9/2008 | Kitani et al. | 726/31 |
| 7,499,550 B2* | 3/2009 | Athaide et al. | 380/278 |
| 7,500,101 B2* | 3/2009 | Kitani | 713/169 |
| 7,512,239 B2* | 3/2009 | Ueno et al. | 380/263 |
| 7,516,331 B2* | 4/2009 | Jin et al. | 713/187 |
| 7,523,307 B2* | 4/2009 | Lotspiech et al. | 713/163 |
| 7,536,355 B2* | 5/2009 | Barr et al. | 705/57 |
| 7,536,727 B2* | 5/2009 | Kojima et al. | 726/31 |
| 7,539,307 B2* | 5/2009 | Lotspiech et al. | 380/239 |
| 7,565,691 B2* | 7/2009 | Kitani | 726/22 |
| 7,577,251 B2* | 8/2009 | Kawada et al. | 380/201 |
| 2001/0021255 A1* | 9/2001 | Ishibashi | 380/277 |
| 2002/0001385 A1* | 1/2002 | Kawada et al. | 380/201 |
| 2002/0085715 A1* | 7/2002 | Ripley | 380/202 |
| 2002/0087814 A1* | 7/2002 | Ripley et al. | 711/154 |
| 2002/0087818 A1* | 7/2002 | Ripley et al. | 711/164 |
| 2002/0104001 A1* | 8/2002 | Lotspiech et al. | 713/163 |
| 2002/0161571 A1* | 10/2002 | Matsushima et al. | 704/200 |
| 2002/0164034 A1* | 11/2002 | Asano et al. | 380/278 |
| 2002/0176575 A1* | 11/2002 | Qawami et al. | 380/201 |
| 2002/0186842 A1* | 12/2002 | Sabet-Sharghi et al. | 380/200 |
| 2003/0005309 A1* | 1/2003 | Ripley et al. | 713/185 |
| 2003/0051151 A1* | 3/2003 | Asano et al. | 713/193 |
| 2003/0061500 A1* | 3/2003 | Mimura et al. | 713/193 |
| 2004/0030909 A1* | 2/2004 | Sako et al. | 713/193 |
| 2004/0039907 A1* | 2/2004 | Sako et al. | 713/164 |
| 2004/0109569 A1* | 6/2004 | Ellison et al. | 380/277 |
| 2004/0114759 A1* | 6/2004 | Yoshimura et al. | 380/251 |
| 2004/0156503 A1* | 8/2004 | Bell et al. | 380/44 |
| 2004/0172549 A1* | 9/2004 | Kojima et al. | 713/193 |
| 2004/0268128 A1* | 12/2004 | Kitani et al. | 713/176 |
| 2005/0038997 A1* | 2/2005 | Kojima et al. | 713/165 |
| 2005/0038998 A1* | 2/2005 | Ueno et al. | 713/165 |
| 2005/0076225 A1* | 4/2005 | Talstra et al. | 713/187 |
| 2005/0081047 A1* | 4/2005 | Kitani | 713/193 |
| 2005/0089165 A1* | 4/2005 | Kitani et al. | 380/201 |
| 2005/0108560 A1* | 5/2005 | Han et al. | 713/193 |
| 2005/0111663 A1* | 5/2005 | Lotspiech et al. | 380/239 |
| 2005/0141011 A1* | 6/2005 | Han et al. | 358/1.14 |
| 2005/0160284 A1* | 7/2005 | Kitani et al. | 713/193 |
| 2005/0163030 A1* | 7/2005 | Irie et al. | 369/275.3 |
| 2005/0177740 A1* | 8/2005 | Athaide et al. | 713/189 |
| 2005/0198529 A1* | 9/2005 | Kitani | 713/200 |
| 2005/0226416 A1* | 10/2005 | Jung et al. | 380/228 |
| 2005/0278257 A1* | 12/2005 | Barr et al. | 705/57 |
| 2006/0059573 A1* | 3/2006 | Jung et al. | 726/31 |
| 2006/0067529 A1* | 3/2006 | Kojima | 380/201 |
| 2006/0126831 A1* | 6/2006 | Cerruti et al. | 380/30 |
| 2006/0147045 A1* | 7/2006 | Kim et al. | 380/277 |
| 2006/0150251 A1* | 7/2006 | Takashima et al. | 726/26 |
| 2006/0153378 A1* | 7/2006 | Lotspiech et al. | 380/201 |
| 2006/0161502 A1* | 7/2006 | Cerruti et al. | 705/71 |
| 2007/0116278 A1* | 5/2007 | Asano et al. | 380/203 |
| 2007/0160209 A1* | 7/2007 | Kasahara et al. | 380/217 |
| 2007/0198424 A1* | 8/2007 | Yamamoto et al. | 705/57 |
| 2007/0237329 A1* | 10/2007 | Qawami et al. | 380/201 |
| 2008/0040814 A1* | 2/2008 | Kasahara et al. | 726/28 |
| 2008/0056492 A1* | 3/2008 | Okayama et al. | 380/45 |
| 2008/0069354 A1* | 3/2008 | Kitani et al. | 380/202 |
| 2008/0072072 A1* | 3/2008 | Muraki et al. | 713/193 |
| 2008/0101766 A1* | 5/2008 | Shimizu et al. | 386/96 |
| 2008/0137865 A1* | 6/2008 | Sabet-Sharghi et al. | 380/277 |
| 2008/0152137 A1* | 6/2008 | Nakano et al. | 380/201 |
| 2008/0172334 A1* | 7/2008 | Jung et al. | 705/50 |
| 2008/0253574 A1* | 10/2008 | Jung et al. | 380/278 |
| 2008/0260162 A1* | 10/2008 | Jung et al. | 380/278 |
| 2008/0273702 A1* | 11/2008 | Foster et al. | 380/277 |
| 2009/0016533 A1* | 1/2009 | Jung et al. | 380/201 |
| 2009/0028342 A1* | 1/2009 | Cerruti et al. | 380/279 |
| 2009/0185688 A1* | 7/2009 | Lotspiech et al. | 380/277 |

FOREIGN PATENT DOCUMENTS

| | | |
|---|---|---|
| JP | 2000-330870 | 11/2000 |
| JP | 2004-220317 | 8/2004 |

OTHER PUBLICATIONS

INTEL Corporation et al.; "Content Protection for Prerecorded Media Specification, DVD Book, Revision 0.93", Jan. 31, 2001; XP002202232; pp. 2.1-2.9.

INTEL Corporation et al.; "Content Protection for Recordable Media Specification, DVD Book, Revision 0.95"; May 31, 2001; XP002226155; pp. 4.1-6.1.

INTEL Corporation et al.; "Content Protection for Prerecorded Media Specification, Introduction and Common Cryptographic Elements, Revision 1.0"; Jan. 17, 2003; XP002370100; pp. 1.1-1.2; 3.1-3.6.

INTEL Corporation et al.; "Content Protection for Recordable Media Specification, Introduction and Common Cryptographic Elements, Revision 1.0"; Jan. 17, 2003; XP002370201; pp. 1.1-1.2; 3.1-3.9.

\* cited by examiner

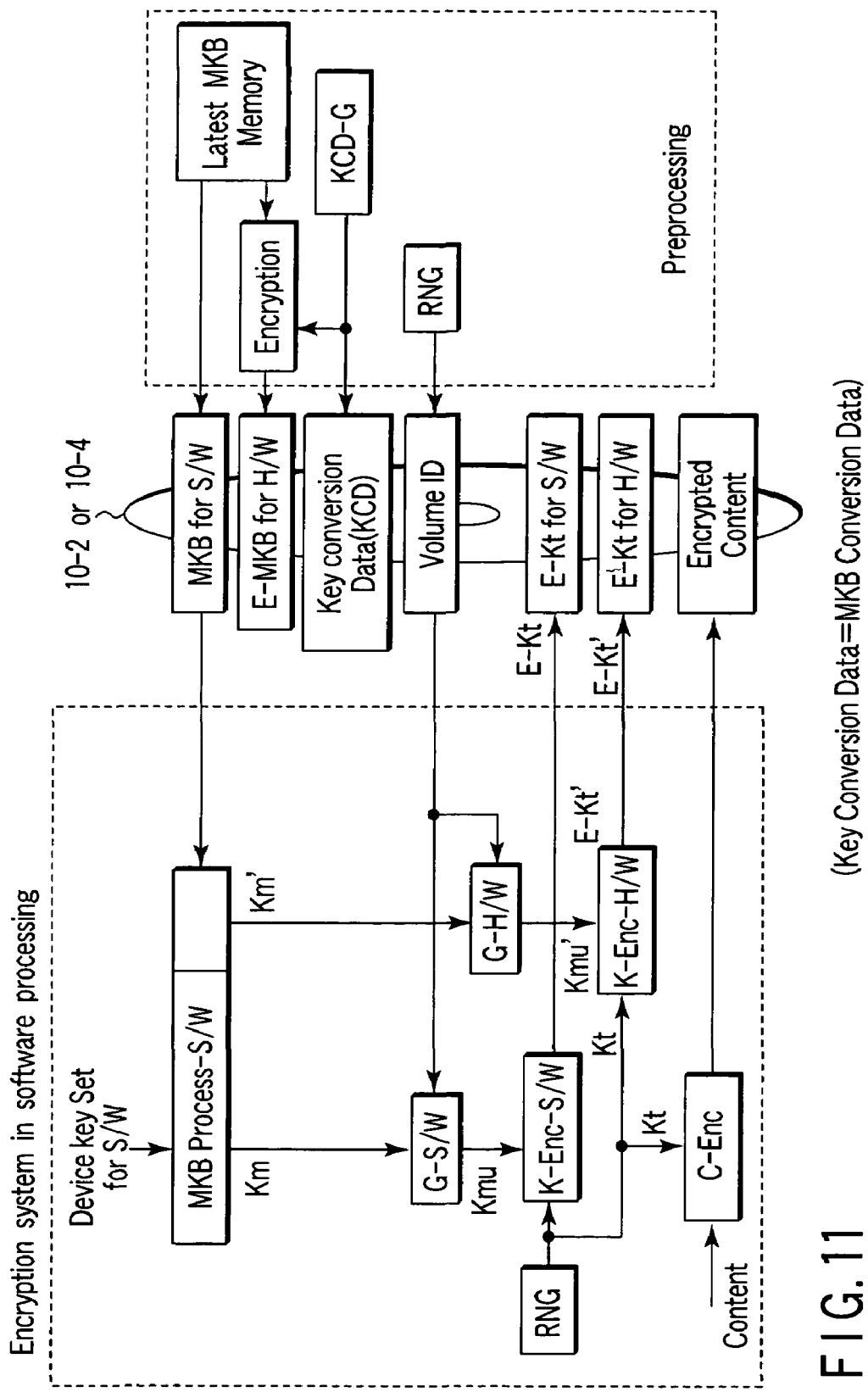
F I G. 11

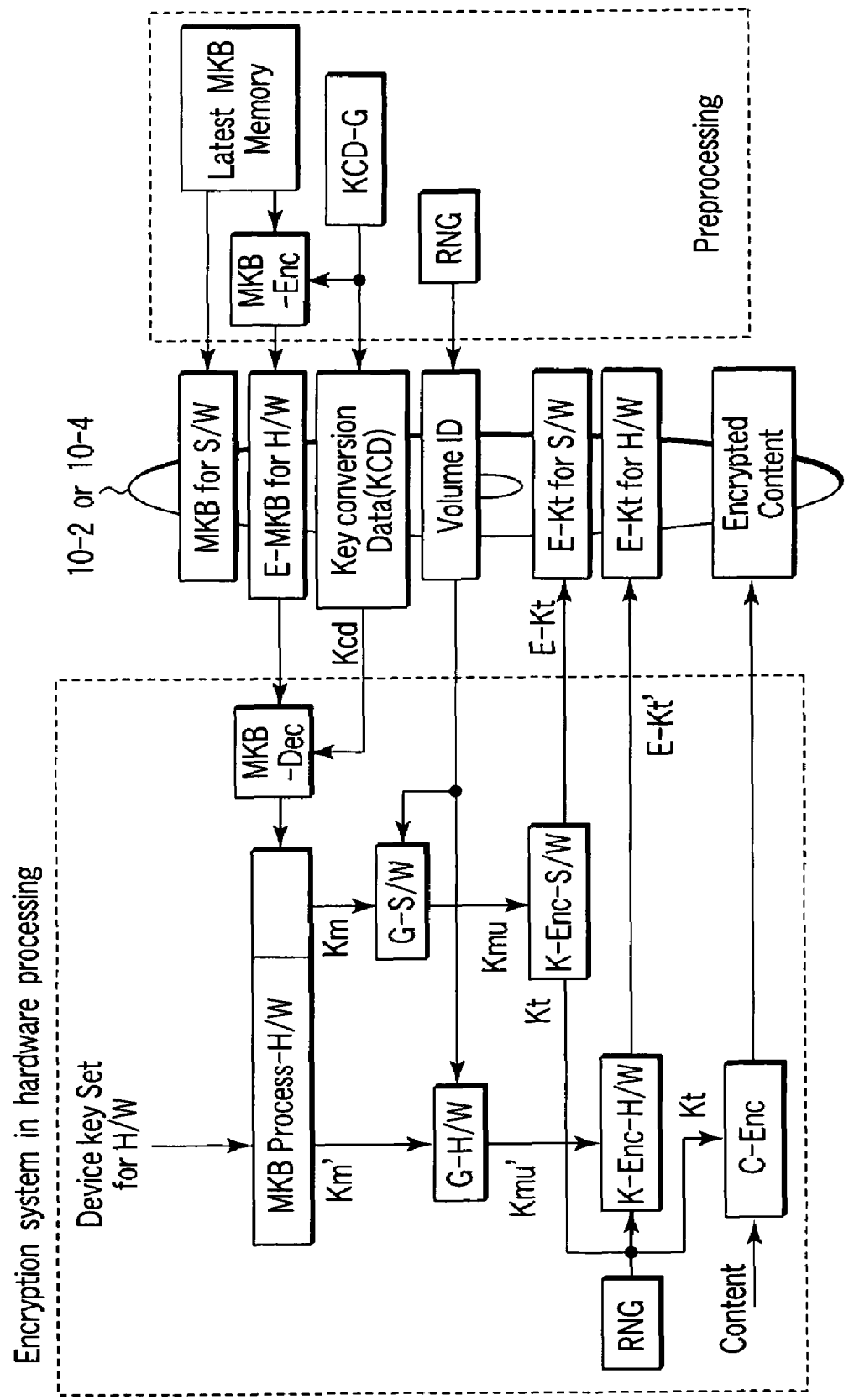
F I G. 12

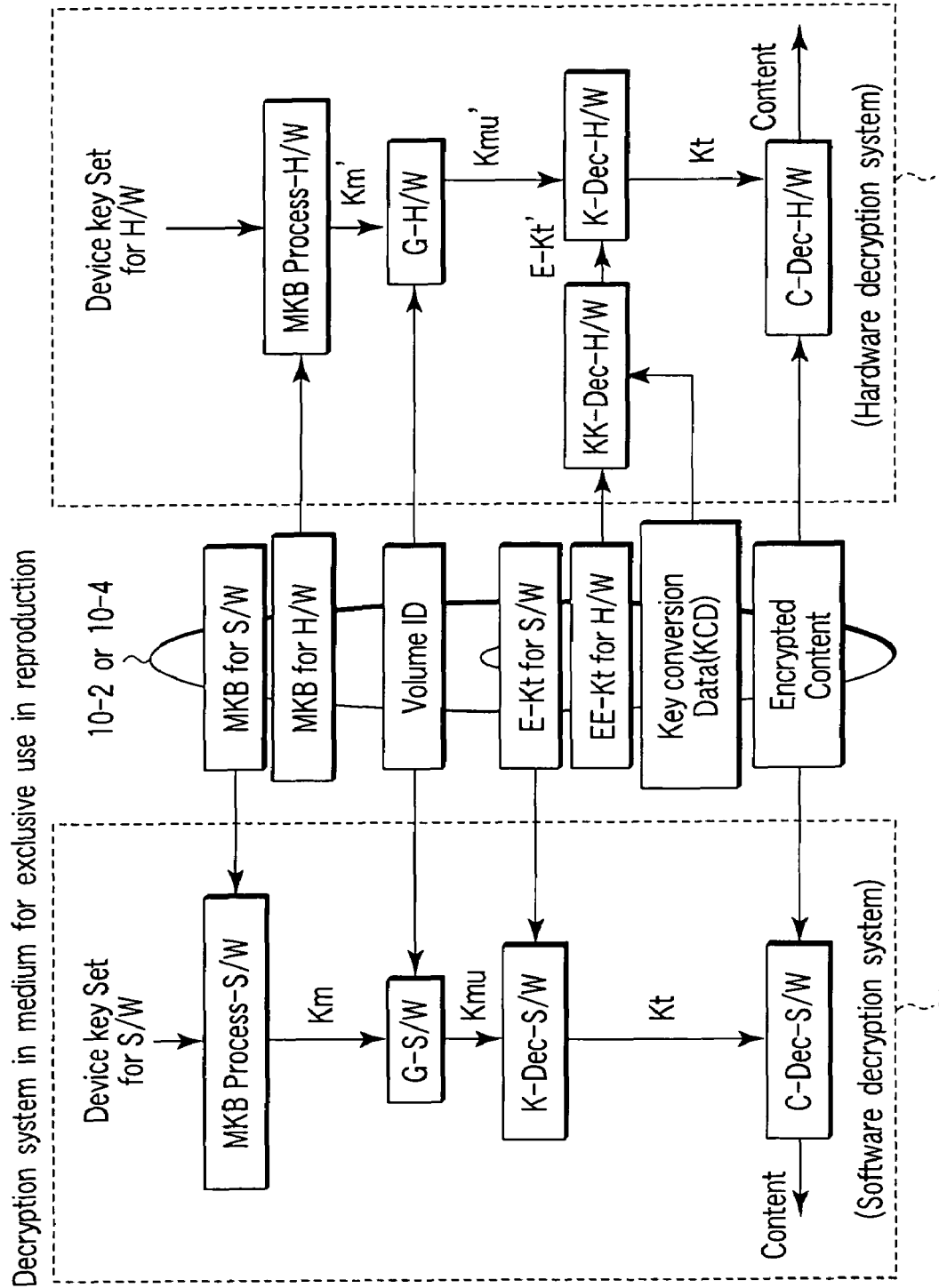
F I G. 16

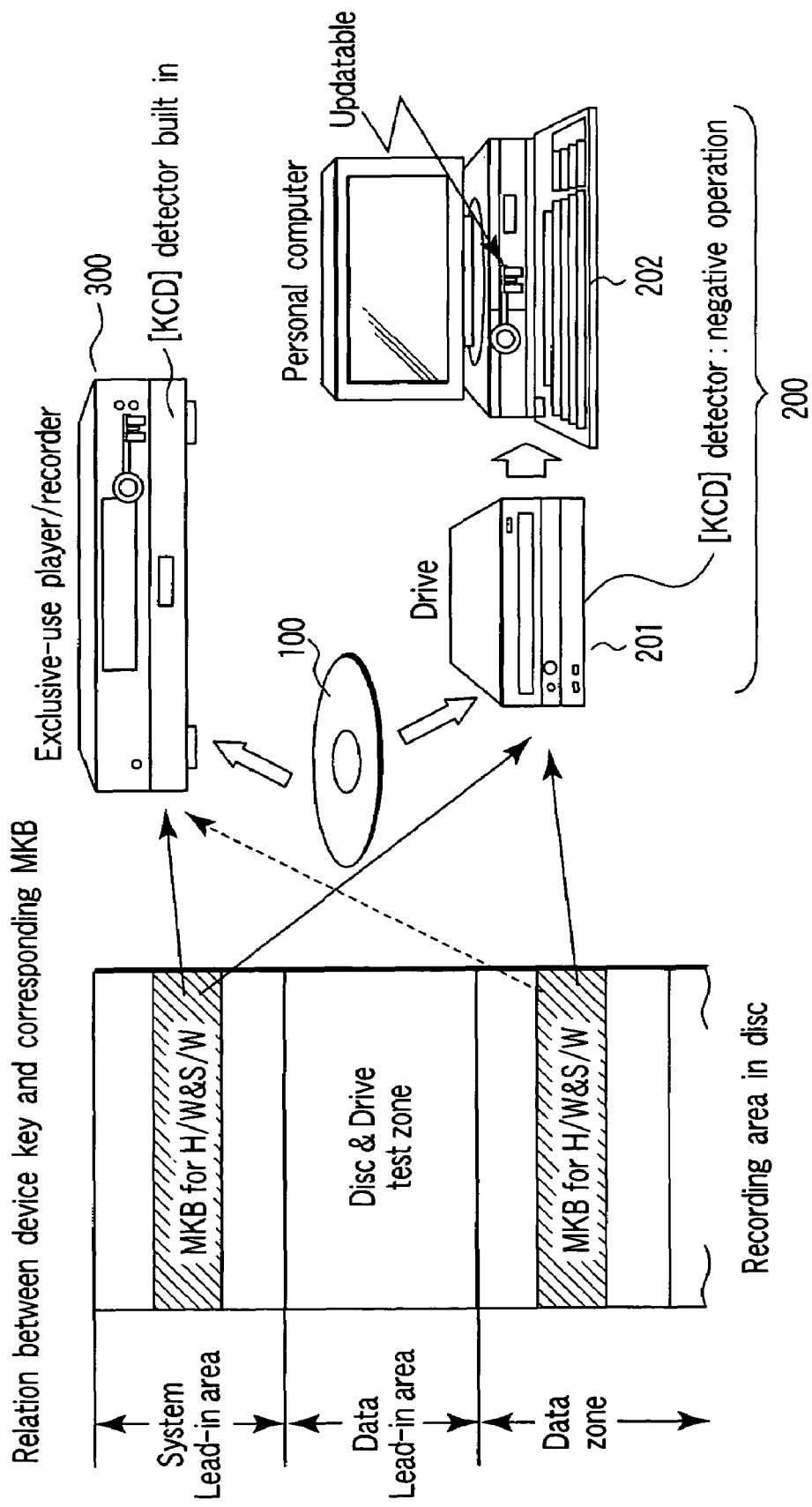
F I G. 20

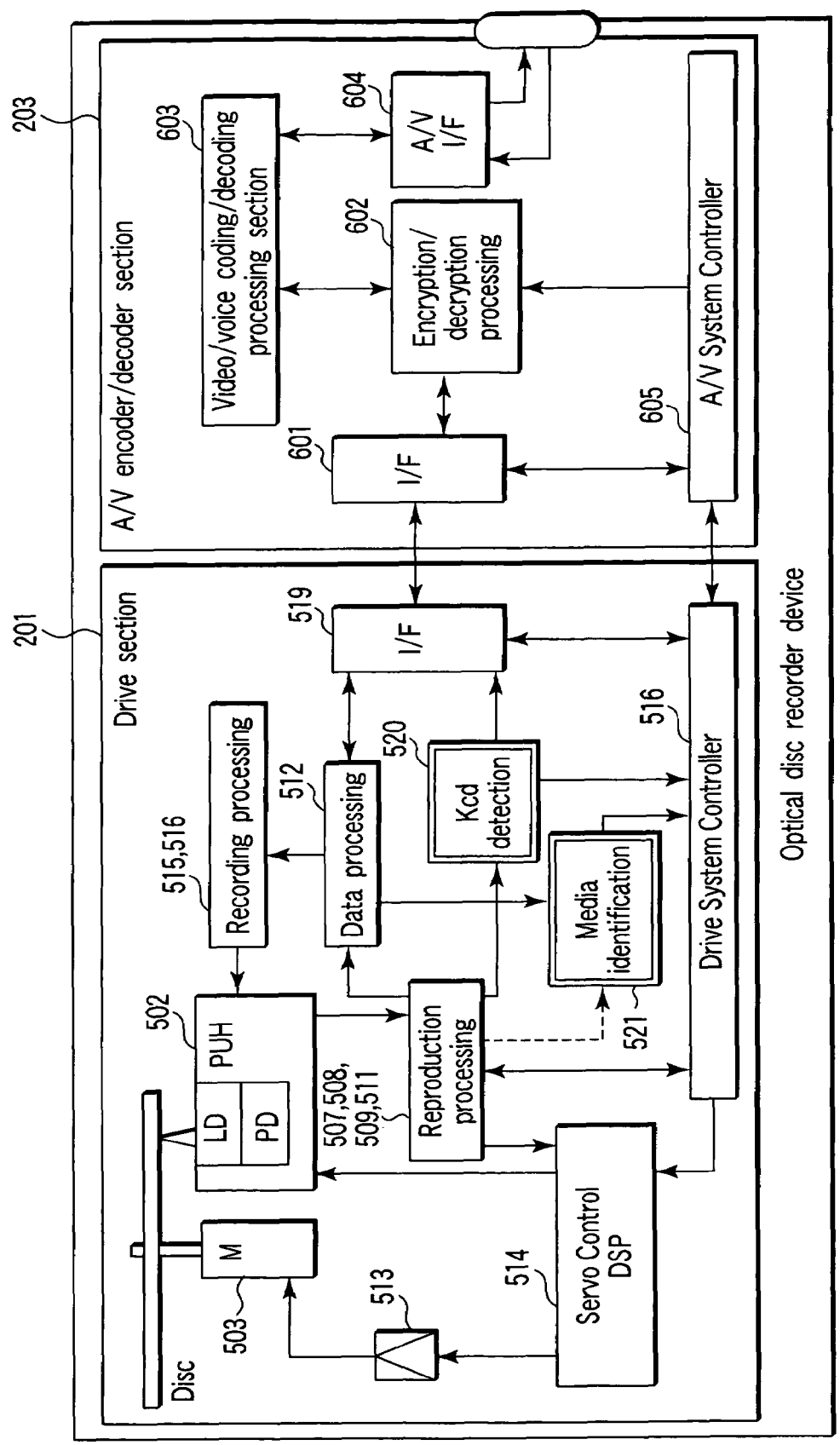
F I G. 26

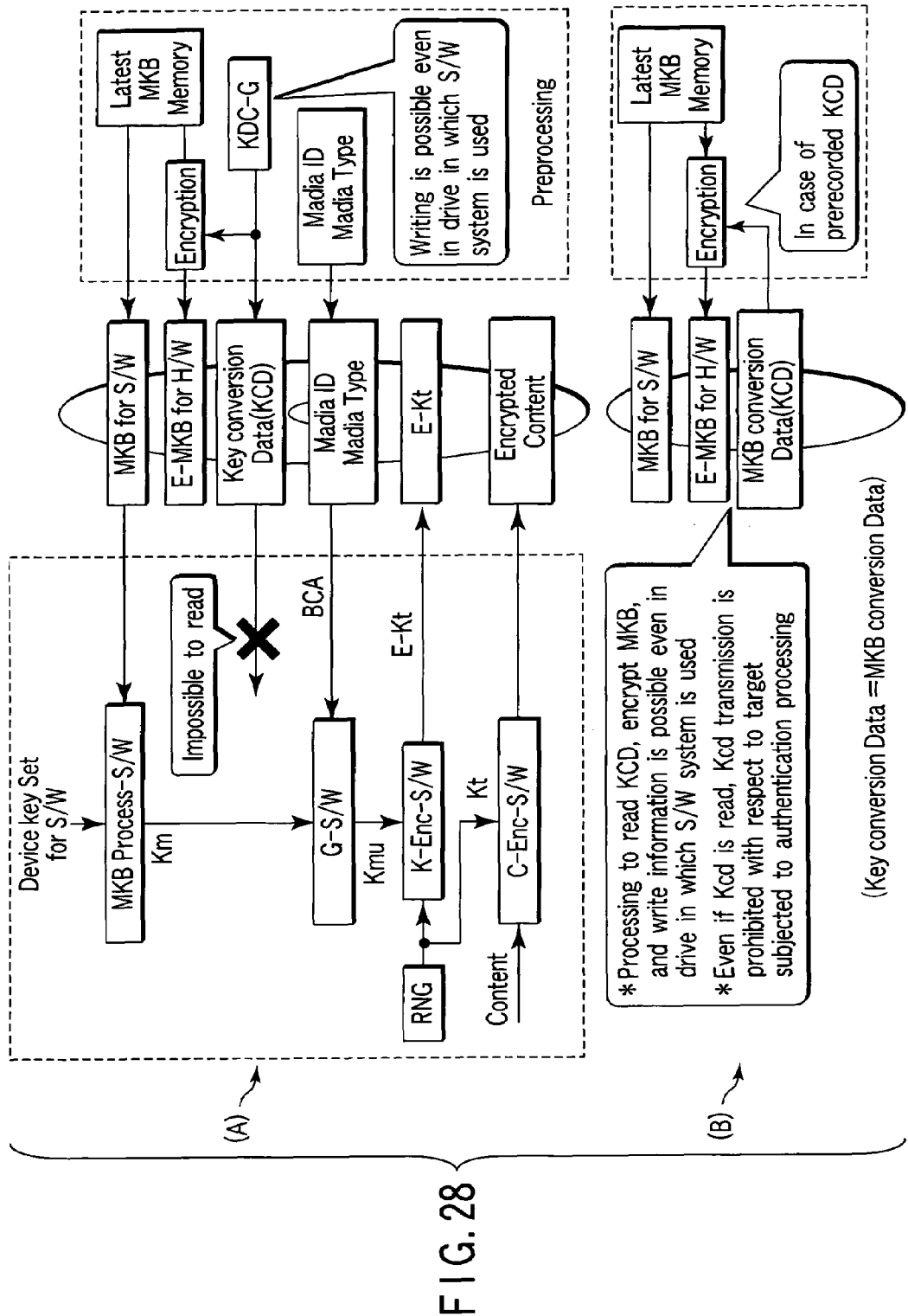
F I G. 28

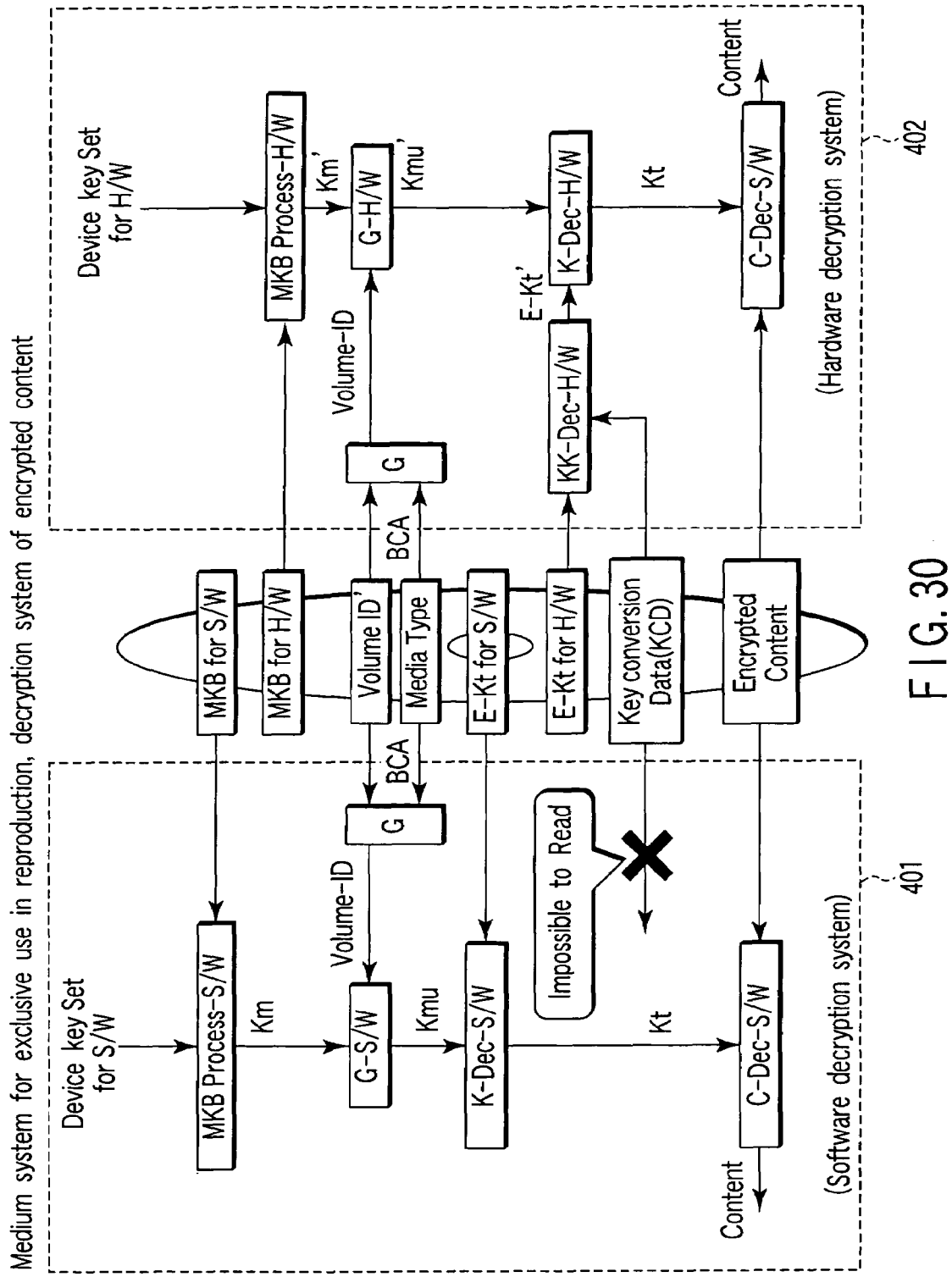
F I G. 30

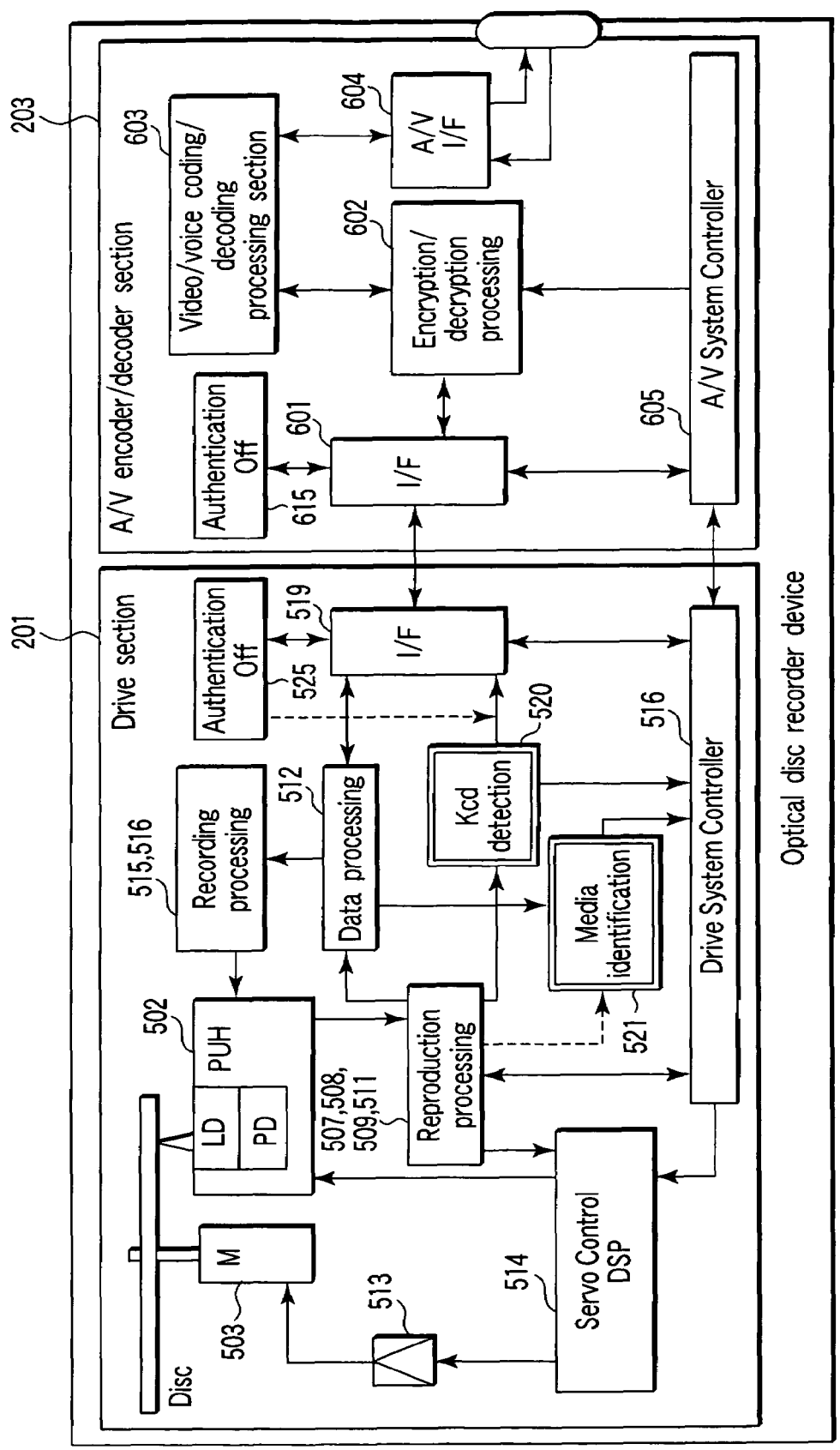
F I G. 33

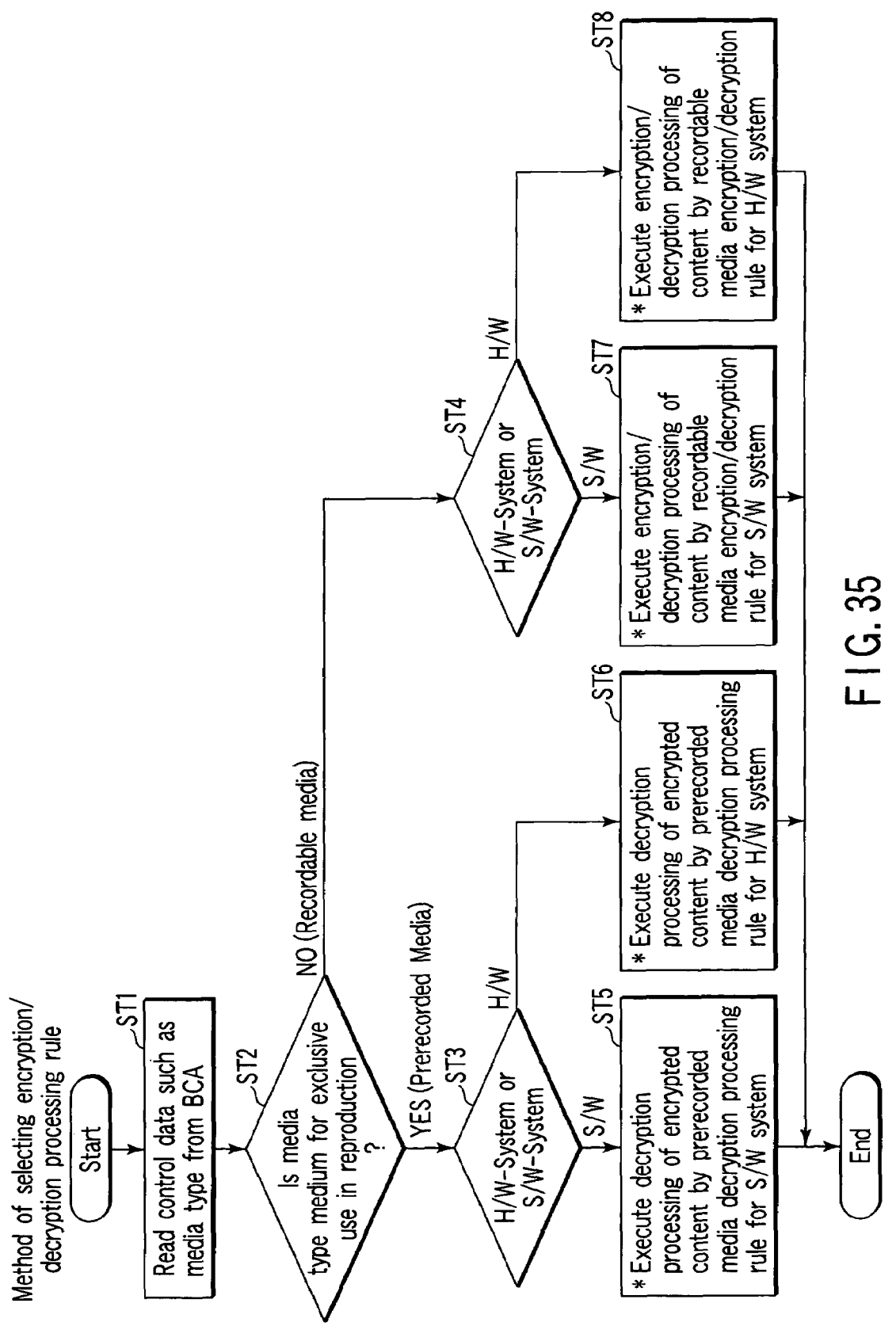
F I G. 35

COPYRIGHT MANAGEMENT METHOD, INFORMATION RECORDING/REPRODUCING METHOD AND DEVICE, AND INFORMATION RECORDING MEDIUM AND METHOD OF MANUFACTURING THE MEDIUM

CROSS-REFERENCE TO RELATED APPLICATIONS

This application is based upon and claims the benefit of priority from prior Japanese Patent Applications No. 2004-337635, filed Nov. 22, 2004; and No. 2005-015973, filed Jan. 24, 2005, the entire contents of both of which are incorporated herein by reference.

BACKGROUND OF THE INVENTION

1. Field of the Invention

The present invention is an invention which is useful, when applied to an information recording/reproducing method and device useful for recording encrypted information in an information recording medium, a method and device for reproducing information from an information recording medium in which encrypted information is recorded, an information recording medium in which encrypted information is recorded, and an information reproducing medium.

2. Description of the Related Art

In a case where information is recorded in an information recording medium such as an optical disc, the information is sometimes required to be encrypted and recorded. For example, in a copyright protection system, a content which is a writing is encrypted with an encryption key to form an encrypted content. Furthermore, the content is encrypted with another encryption key to form an encrypted encryption key in order to keep secret the encryption key used for encryption. The encrypted encryption key is recorded together with the encrypted content in the recording medium to prevent illegal copying.

At present, the following handling is performed in the copyright protection system concerning a digital versatile disc (DVD) which is rapidly expanding its market. That is, there is utilized a content scramble system (CSS) licensed by DVD Copy Control Association (DVD CCA) in a DVD video in which a video signal for exclusive use in reproduction is recorded. A content protection for prerecorded media (CPPM) system is utilized in a DVD audio for exclusive use in reproduction. A content protection for recordable media (CPRM) system is utilized in the copyright protection system of the content to be recorded in the recording medium. Licensing of the CPPM and CPRM systems is performed by specific organizations (e.g., organizations called 4C Entity and LLC).

On the other hand, there has further been advanced development of a high-capacity next-generation DVD or the like in which a high-definition video, a voice signal or the like is recordable/reproducible. There is a demand for introduction of a system in which a security ability is improved more than in a conventional technology in the copyright protection system in a case where a writing having a high quality level is recorded in the next-generation recording medium.

That is, in recent years, digital-TV broadcasting or the like has been started in which a high definition video (HD-Video) is broadcasted. A copyright holder side requires a security system which has been advanced more than in the conventional technology as recording permission conditions with respect to a recording/reproducing system to record/reproduce a broadcasted program. On the other hand, a user demands a freely usable system as long as a form of use is correct. If inconvenient use is enforced because of some illegal users, oppositions are to be expected.

In this situation, it is important to improve a function of a basic portion in a system which copes with the next generation. Basic requirements for content protection will be described below:

1) prevention of bit-by-bit copying;
2) encryption of the content;
3) system renewability; and
4) securement of perfectibility of copy control information (CCI).

In examples of the CPPM or the CPRM, the following handling is performed:

concerning 1), the bit-by-bit copying is prevented by adding of an inherent ID to each medium;

concerning 2), a cryptographic unit is sophisticated;

concerning 3), a media key block (MKB) is adopted; and concerning 4), CCI is utilized (application-dependent) as the encryption key.

An encryption system is constituted using a structure in which characteristics or properties of individual constituting elements are skillfully utilized in this manner, and accordingly efforts are made to realize required specifications.

Concerning 1) . . . When the inherent ID added to each medium is utilized, the following functions can be obtained. In a case where the content is encrypted with the encryption key related to the inherent ID, even if the encrypted content is directly copied to another medium, decryption cannot be correctly performed, and the bit-by-bit copying can be prevented.

Concerning 2) . . . The encryption depends on an ability of the cryptographic unit, and the cryptographic unit having a high ability is being adopted. Moreover, an MKB is a set of device keys installed as secret keys in a device which records/reproduces the content with respect to the recording medium, and is a media key block in which a media key as a base key for content encryption is encrypted to arrange a mathematical system. When the device key of the recording/reproducing device is hacked to perform illegal utilization, a new MKB is newly issued. The new MKB is adopted in a newly issued recording medium. As a result, when the information of the newly issued recording medium is processed, calculation and generation are performed by a bunch of keys from which a hacked object (device key) has been removed. An illegal recording/reproducing device having the hacked device key cannot use the recording medium in which the new MKB is recorded. That is, the hacked recording/reproducing device is revoked from the copyright protection system. In this processing, a system renewability function works.

The CCI is a control flag for each content such as copy prohibition or copy-once, but tampering of the flag itself needs to be prevented. Therefore, the CCI is utilized as the encryption key to thereby complicate the tampering.

As described above, even at present, a sophisticated technology has been used with respect to enhancement of reliabilities of the constituting elements and improvement of the security ability by the system in order to cope with necessary protection requirements.

BRIEF SUMMARY OF THE INVENTION

However, at present, there has been a copyright protection system in which a content is prohibited from being moved between recording mediums and which includes a restriction on a utilization form by a final user. Furthermore, since a digital video signal has a high quality level, a copyright holder requires an illegal copying prevention system more than before.

Moreover, concerning the above-described system renewability, if a hacked device key is diffused via an internet or the like, and illegally utilized, the number of illegal users often results in an infinite number. Even if the key is revoked, a recording medium to which a new MKB has been added is simply unusable, and a recording medium which has been sold before is usable.

An object of the embodiments is to realize reinforcement of system renewability by a technology skillfully utilizing properties inherent in a system.

Moreover, as a result, it is possible to produce a new effect that the renewability is also reinforced with respect to required specification concerning copyright protection of a content to be recorded in a medium for exclusive use in reproduction or a recordable medium.

In one aspect of the present invention, as to a system which encrypts and records/reproduces information such as a content, the system is designed in such a manner that encryption/decryption processing information is varied with a device (software (S/W) main body device) whose main body is software comprising: a recording/reproducing drive of a recording medium; and a personal computer (PC), and a device (hardware (H/W) main body device) whose main body is hardware comprising a recording/reproducing drive integrated with data coding/demodulation processing. Furthermore, there is incorporated a design in which the encryption/decryption processing information is varied with kinds of recording mediums such as a recording medium for exclusive use in reproduction and a recording medium for recording.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a diagram showing a constitution example of the software encryption system corresponding to the software decryption system of FIG. 10 in recording of the content in the recording medium;

FIG. 12 is a diagram showing a constitution example of the hardware encryption system corresponding to the hardware decryption system of FIG. 10;

FIG. 16 is a diagram showing constitution examples of the software decryption system and the hardware decryption system with respect to the recording medium for exclusive use in reproduction according to still another embodiment of the present invention;

FIG. 20 is an explanatory view showing an example of an arrangement of an MKB in the recording medium in a case where a KCD according to the present invention is utilized;

FIG. 26 is an explanatory view of a case where the drive 201 is incorporated together with an AV encoder/decoder section 203 into the same housing, and utilized as an exclusive-use recorder/player 200 (hardware main body device);

FIG. 28 is a diagram showing a constitution example of the software encryption system corresponding to the software decryption system shown in FIG. 27;

FIG. 30 is a diagram showing the software decryption system and the hardware decryption system with respect to the medium for exclusive use in reproduction according to still another embodiment of the present invention;

FIG. 33 is a diagram showing an example of the hardware main body device according to the present invention;

FIG. 35 is a flowchart showing basic processing of a decryption method according to the present invention;

DETAILED DESCRIPTION OF THE INVENTION

Embodiments of the present invention will be described hereinafter with reference to the drawings. First, a basic technology of a copyright protection reproduction processing method will be described with reference to FIGS. 1A, 1B, 2A, 2B, and 3.

Figure 1A:
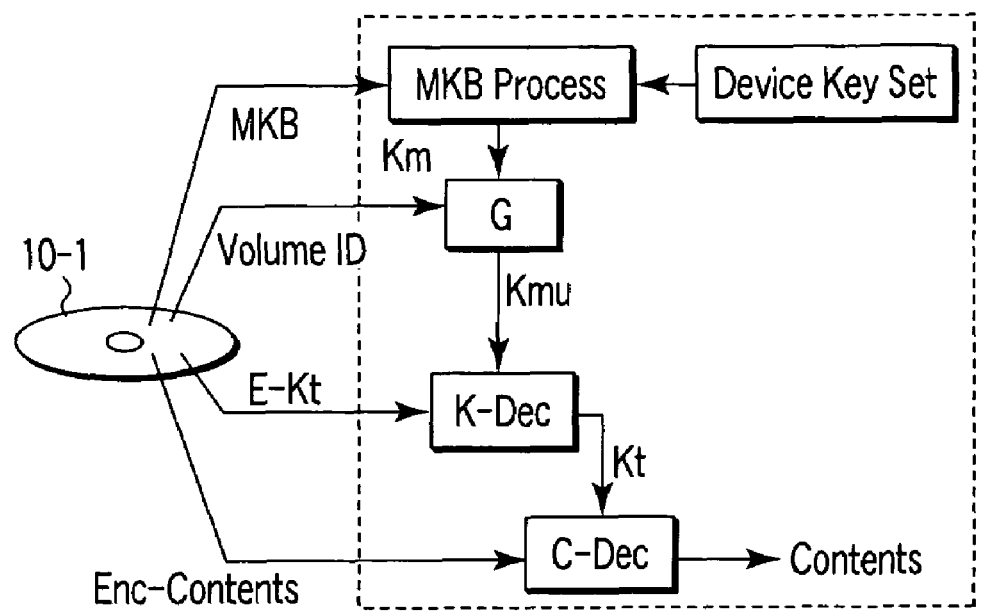
FIGS. 1A, 1B are explanatory views of a processing block and a disc shown in order to describe a basic technology of a copyright protection reproduction processing method (CPPM system)
Figure 1B:
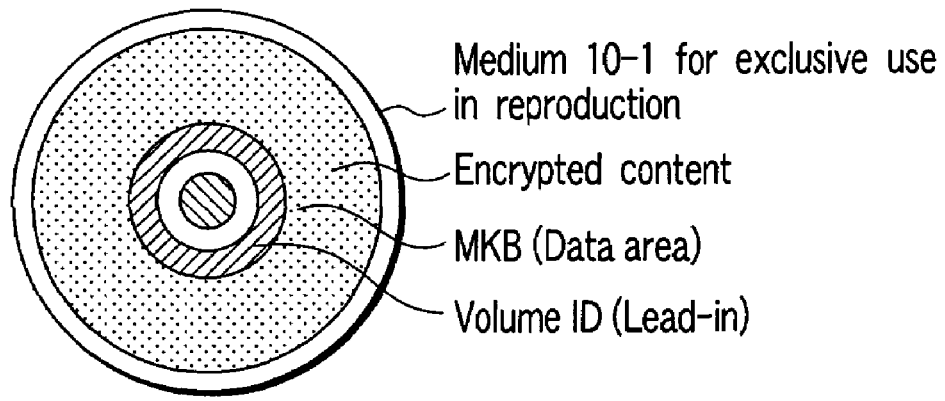

FIG. 1A shows a basic constitution of a CPPM system adopted in DVD-Audio. FIG. 1B shows a medium for exclusive use in reproduction (e.g., an optical disc) in which an encrypted content is recorded. The encrypted content and a media key block (MKB) are recorded in a medium data area, and a volume-ID called an album-ID is recorded in a lead-in area on an inner peripheral side.

To reproduce information recorded in the recording medium in which the encrypted content is recorded, decryption processing is performed in a decryption tree shown in FIG. 1A. In a reproduction device, a device key set distributed from a CP management mechanism is stored in a secret state. First, in an MKB processing section, an MKB read from a recording medium 10-1 is calculated with the device key set, and a media key (Km) is extracted. When this key (Km) is sent together with the volume-ID read from the recording medium to a generator (G) such as a unidirectional function unit, and processed there, a media inherent key (Kmu) is generated. An encrypted title key (E-Kt) recorded with the media inherent key (Kmu) in the recording medium is decrypted in a key decryption (K-Dec) section to reproduce a title key (Kt). The encrypted content recorded in the recording medium is decoded by this title key (Kt) in a content decryption section (C-Dec) to reproduce a plain-text content.

It is to be noted that in the encryption of the content by the title key (Kt), when enormous stream data is encrypted with the same key, there is a high possibility that the encrypted key is presumed. In order to prevent this presumption, an encryption key conversion system having a chain structure is used in which the title key is supplied to a certain function unit, and converted to encrypt a specific unit of content data. The data is converted again in the function unit to encrypt the next content data unit.

The decryption of the encrypted content by the title key in FIG. 1A is shown as if the content were simply decrypted in the content decryption section. However, even in the decryption, when the title key is converted through the function unit, the encrypted content is consecutively decoded with different decryption keys.

It is to be noted that in FIG. 1 and the subsequent figures, a control section in which a microcomputer is built is actually disposed, and recording processing and reproduction processing are performed with respect to a recording/reproducing medium based on a controlling operation of the control section.

Figure 2A:
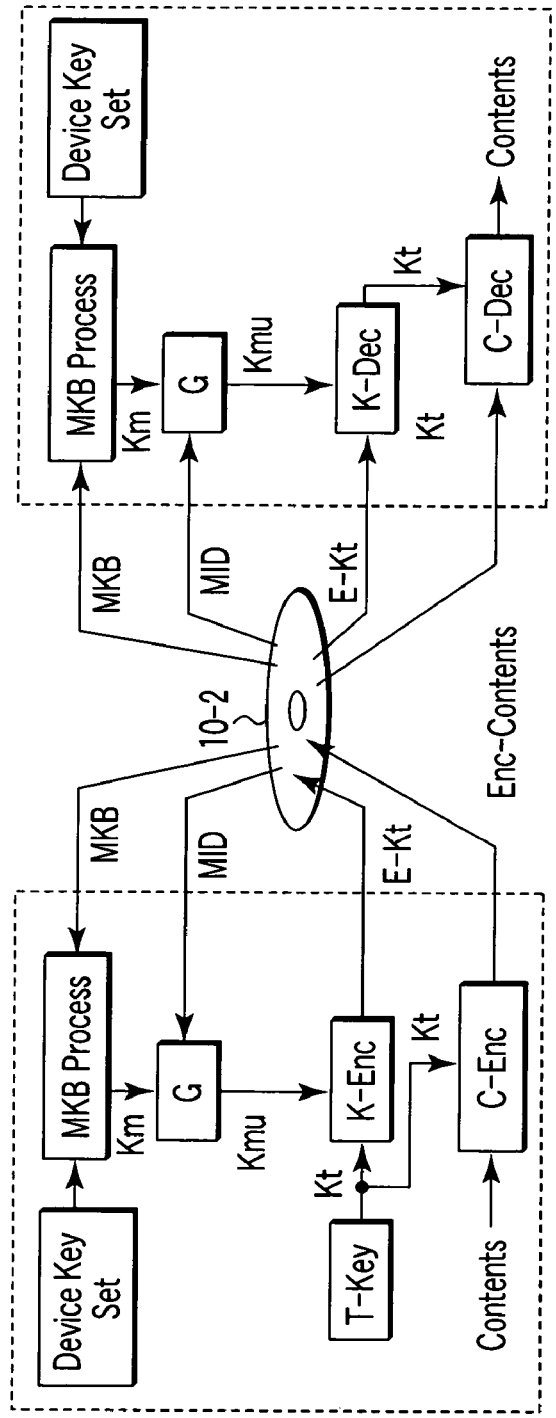
FIGS. 2A, 2B are explanatory views of a processing block and a disc shown in order to describe a basic technology of a copyright protection reproduction processing method (CPRM system)
Figure 2B:
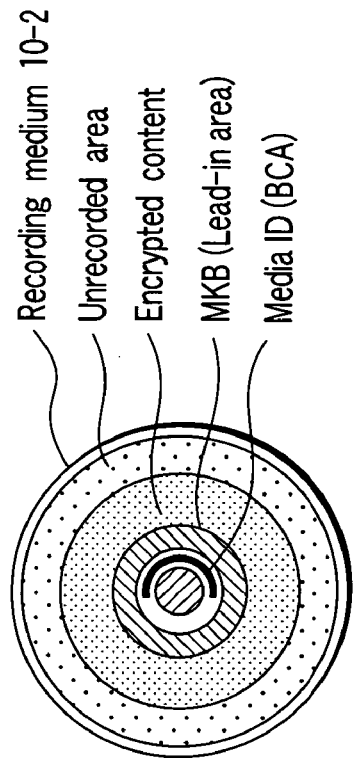

FIG. 2A is a diagram showing a recording/reproducing processing system using a copyright protection system in the same manner as described above. This figure shows an encryption/decryption tree in which a CPRM system for use in a recording/reproducing medium 10-2 is simplified. The recording medium 10-2 in which the CPRM system is utilized is shown in FIG. 2B. In encryption processing in the processing system of FIG. 2A, first an MKB (recorded in a lead-in area) and a media ID (MID) (recorded in a burst cutting area (BCA)) added as an inherent ID to each recording medium are read from the recording medium. Next, in MKB processing, a media key (Km) is calculated and extracted using the MKB and a device key set buried in the device. Next, a generator (G) calculates and generates a media inherent key (Kmu) by use of Km and MID. Next, a key encryption section (K-Enc) encrypts Kt with Kmu to generate an encrypted key (E-Kt). The title key (Kt) is generated by a title key generator (T-Key) comprising a random number generator or the like. The generated E-Kt is recorded in the recording medium 10-2.

The content is encrypted with the title key (Kt), and recorded as the encrypted content in the recording medium. In the decryption processing of the encrypted content recorded in this manner, processing similar to that of FIG. 1A is performed to reproduce content data of a plain text.

It is to be noted that the device key set comprises a plurality of device keys. To calculate and extract the media key from the MKB, a first device key is selected from a key set to extract Km. If it cannot be extracted, the calculation and extraction are performed using the next device key. In this manner, the calculation and extraction processing is performed consecutively using the keys in the key set in order until the calculation and extraction are successful. When the extraction does not become successful to the last moment, revoking from the system is performed. Such plurality of device keys need to be buried as the device key set in the device for the following reasons.

As a system renewability function, the device key on which a fraudulent action has been performed can be revoked. Here, in a case where the device keys each of which differs for each of devices are distributed, the number of the devices is limited, because the number of the device keys is finite. Therefore, when the device keys are distributed to the devices assuming that the finite number of the device keys is M and that n keys selected with a certain function are regarded as one set, the number of distributable key sets is about M multiplied n times. That is, the finite device key number can be enlarged to the number multiplied n times. In this case, when an illegal device key set is revoked, n device keys included in this key set cannot be used. However, even if the illegal device key exists in the device key set distributed to a correct device, correct encryption/decryption processing is possible as long as the device key that is not revoked exists in the device key set. The device key set will be hereinafter referred to, but the encryption/decryption processing will be described by means of the device key.

It is to be noted that from the above description, there must be presumed constitutions of the media key block (MKB) and the device key set which are encrypted secret key information, and a relation therebetween. However, as to a secrecy recording method and a restoring method with respect to the media key as the secret key, means can be additionally considered which is capable of realizing an object with a less information data amount by use of a mathematical characteristic. However, since this is not a direct content matter of the present invention, description is limited to the above description.

Figure 3:
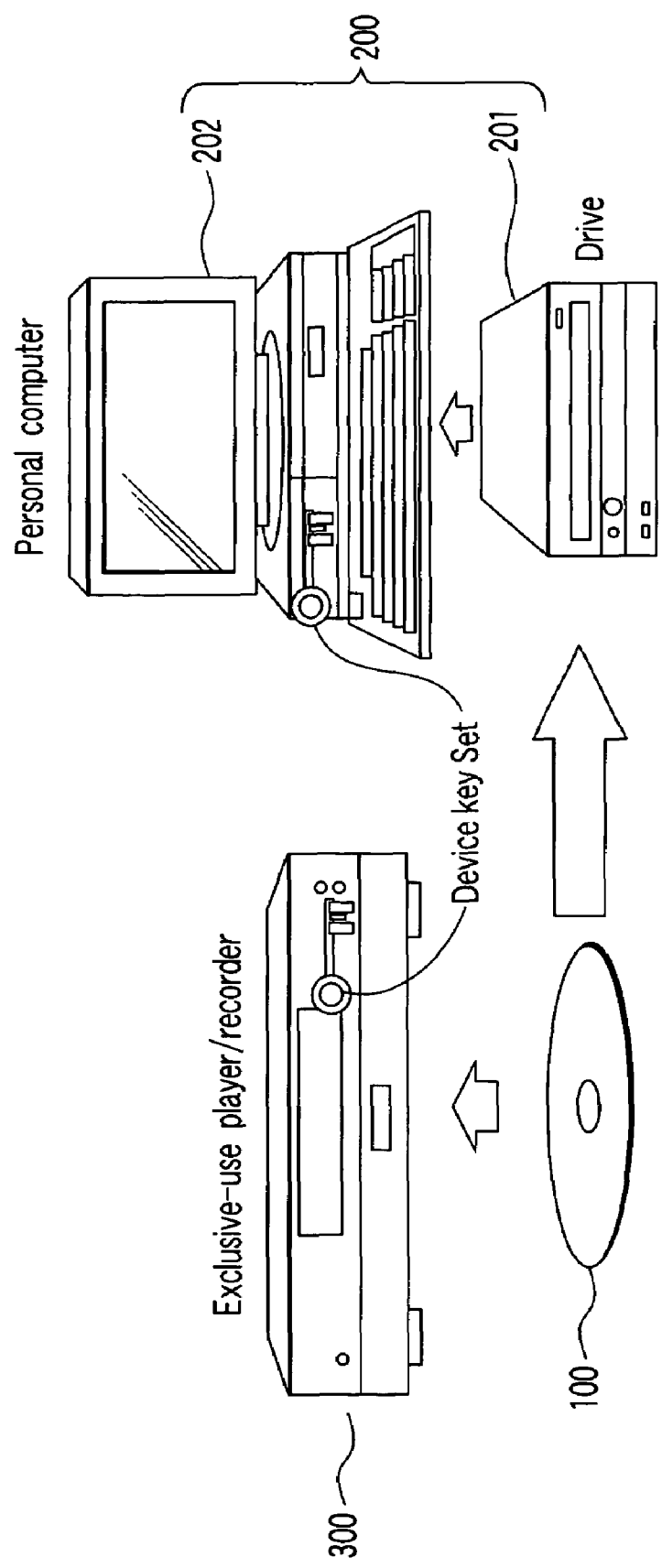
FIG. 3 is an explanatory view showing a relation between a recording/reproducing medium and a device in FIGS. 1A, 2A.

FIG. 3 is a diagram showing a relation between the recording/reproducing medium and the device in FIGS. 1A and 2A. The reproduction device or the recording/reproducing device is roughly classified into two types.

There are a device 200 (software (S/W) main body device) whose main body is software comprising a recording/reproducing drive 201 and a personal computer (PC) or a host computer 202, and a device 300 (hardware (H/W) main body device) whose main body is hardware in which a drive is integrated with data coding/demodulation processing. In the present invention, these two types of encryption/decryption tree are formed into different designs.

That is, the hardware main body device 300 is used, when the recording medium is inserted into the device like an exclusive-use player/recorder. In the device 300, there are kept a function of outputting a final reproduction signal, and conversely all functions of compressing an input signal or subjecting the signal to edition processing to encrypt and record the signal in the recording medium. On the other hand, in the software main body device 200, the drive 201 which reads/records data is connected to a device 202 such as the personal computer or the host computer to constitute a recording/reproducing system.

In this device system, as shown in FIG. 3, the device key set is installed inside the former exclusive-use player/recorder. However, in the drive-personal computer connected system, the device key set is installed in the personal computer or the host computer to perform a step of encryption/decryption processing. The drive 201 simply records the sent data, or reads the data from a designated place to transfer the data toward the personal computer or host computer 202.

The representative two devices 200 and 300 have peculiar properties, respectively.

1). Exclusive-use player/recorder (device 300)

Since all of the processing steps of the recording medium and a final video/voice signal are constituted in the closed device, the data cannot be illegally schemed in an intermediate point of the processing step.

A device such as a recent recorder device which utilizes an electronic program table in setting a recording time or the like is internet-connected. However, many general players and the like are utilized without being connected to the internet in many cases, and it is difficult to easily update a part of control software for the encryption processing, an encryption key or the like.

The inside of the device is independent of another external apparatus, and it is easy to install an exclusive-use circuit which performs detection and judgment.

2) Device 200 comprising the drive 201 and the personal computer or host computer 202

The internet connection is general as the utilization form of the personal computer.

It is easy to update application software installed in the personal computer.

The drive which records/reproduces the data with respect to the recording medium is controlled by an instruction from the personal computer which is a host device to record/reproduce the data with respect to the designated plate, but it is difficult to perform comparison/judgment between the data.

Since the recording/reproducing instruction of the data or encode/decode processing of the data is performed on a host side, and the processing is performed by the software, a final user might tamper with a control system, and the software has to be constituted to be resistant to the tampering to prevent violation.

As described above, the exclusive-use player/recorder which is the hardware (H/W) main body device or the like copes with a recording/reproducing operation with respect to the recording medium, encryption/decryption processing of the data, and the encryption/decryption processing in the closed device. Therefore, it is possible to incorporate the recording/reproducing and comparison/judgment processing of various types of data of all places recorded in the recording medium. When the exclusive-use processing circuit is incorporated in the closed device, it is possible to improve a security ability.

However, since the constitution independent of the external device is installed, in general, it is difficult to update an internal constitution easily.

On the other hand, in the device comprising the drive and the personal computer or the host computer, which is the software (S/W) main body device, the drive is a device which is instructed by an I/O command standardized by the personal computer or the host computer to read and write the data with respect to the recording medium. It is usually difficult to compare and judge the data uniquely in the drive. All of the processing concerning the data is performed by the application software disposed on the host side, and the encryption/decryption processing of the content is naturally performed on this side. The software is constituted to be resistant to the tampering, and prevented from being illegally tampered usually in order to prevent the fraudulent action.

Moreover, the device using the software (S/W) has the following advantages. That is, the utilization form of the personal computer or the like is often an internet utilization form, and the internet connection has been basic. Therefore, it is possible to update some software or, for example, the device key which is the secret key in the encryption system by secret processing, an it is possible to realize a system update of the encryption system.

Thus, it can be said that the device whose main body is the hardware and the device whose main body is the software have such a system relation as to differ from each other in respect of disadvantages and advantages. The present inventor has noted this respect.

Figure 4:
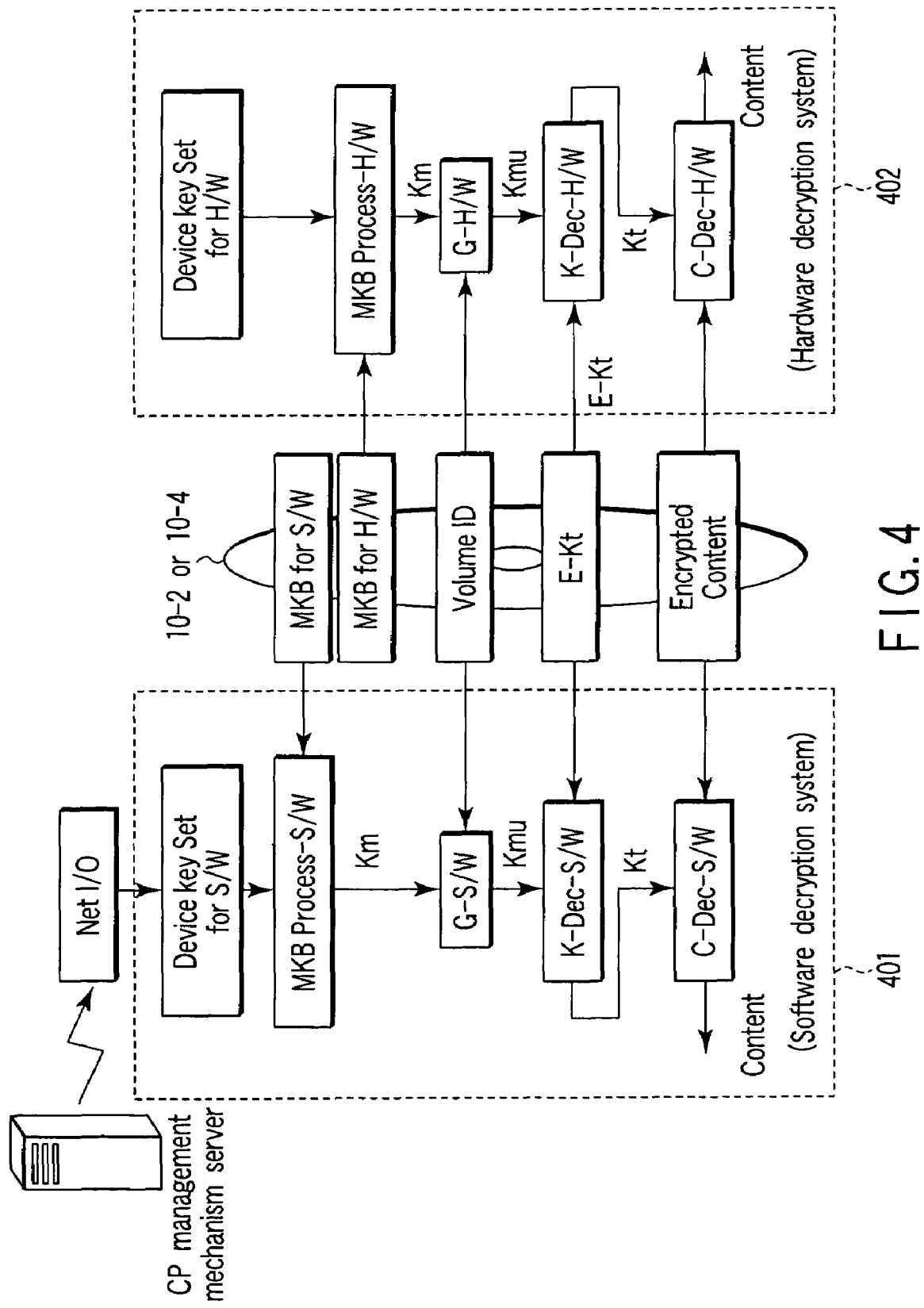
FIG. 4 is a diagram showing a constitution example of a decryption system showing a basic idea of the present invention.

FIG. 4 shows a constitution example of a decryption system showing a basic idea of the present invention. That is, the system renewability of the encryption/decryption system is largely improved skillfully utilizing the advantages and the disadvantages of the software (S/W) main body device and the hardware (H/W) main body device described with reference to FIG. 3.

The basic idea is a system in which as to the device key as a base of security in the encryption/decryption tree, the key for a software (S/W) system is constituted independently of that for a hardware (H/W) system. As a result, the MKBs are exclusively used in the systems, respectively, and recorded in the recording medium.

Additionally, although MKB data files will be described in separate paragraphs, the files are disposed independently of one another, or assembled into one file and recorded in the recording medium. Since both types of the files have characteristics, respectively, and are set including another problem.

The following device and method according to the present invention are constituted consciously on the hardware and software sides. Therefore, H/W is added to each symbol denoting the block and function for exclusive use on the hardware side, and S/W is added to each symbol denoting the block and function for exclusive use on the software side. In figures described hereinafter, components denoted with similar symbols obtain similar functions and operations.

1) Software Decryption system 401 (Left Side of FIG. 4)

(1a) An MKB (hereinafter referred to as the MKB for S/W) for processing the S/W is read from a recording medium 10-4, and a media key (Km) is calculated and extracted in a media key processing section (MKB Process-S/W) by use of a device key set (hereinafter referred to as the device key set for S/W) for software processing.

(1b) A media-ID of an ID inherent in the medium or a volume-ID for each content volume is read from the recording medium 10-4. In a generator (G-S/W), the volume-ID is function-calculated together with Km by the unidirectional function unit or the like to generate a media inherent key (Kmu).

It is to be noted that the volume-ID is referred to in the subsequent description, but this also includes a case where the media-ID which is the ID inherent in the recording medium is utilized.

(1c) An encrypted title key (E-Kt) is read which is recorded in the recording medium 10-4. This E-Kt is decoded by Kmu in K-Dec-S/W to generate a title key (Kt) which is a content encrypted key.

(1d) The encrypted content recorded in the recording medium 10-4 is successively read. The read encrypted content is decoded with Kt in C-Dec-S/W, and reproduced as the content data of the plain text.

2) Hardware Decryption system (402) (Right Side of FIG. 4)

(2a) An MKB for H/W is read from the recording medium 10-4, and a media key (Km) is calculated and extracted in a section (MKB Process-H/W) by use of the MKB for H/W and a device key set for H/W.

(2b) The media-ID of the ID inherent in the medium or the volume-ID for each content volume is read from the recording medium 10-4. In a generator (G-H/W), the volume-ID is function-calculated together with Km by the unidirectional function unit or the like to generate the media inherent key (Kmu) as a result.

(2c) The encrypted title key (E-Kt) is read which is recorded in the recording medium 10-4. This E-Kt is decoded by Kmu in K-Dec-H/W to generate the title key (Kt) which is the content encrypted key.

(2d) The encrypted content recorded in the recording medium 10-4 is successively read. The encrypted content is decoded with Kt in C-Dec-H/W, and reproduced as the content data of the plain text.

Thus, in a case where the device key sets are generated independently by the software (S/W) main body device and the hardware main body device, if the device key for the hardware main body device is hacked, and illegally distributed via the internet or the like, the key cannot be utilized by the software main body device. Therefore, the number of the devices in which the fraudulent action is performed can be minimized. As a result, even in the system update handled by the distributing of the new MKB with a time delay, a sufficient injustice preventing effect can be expected. Since the device key of the software main body device is connected to the internet, the injustice can be prevented from being enlarged by use of a periodic update system or the like.

Figure 5:
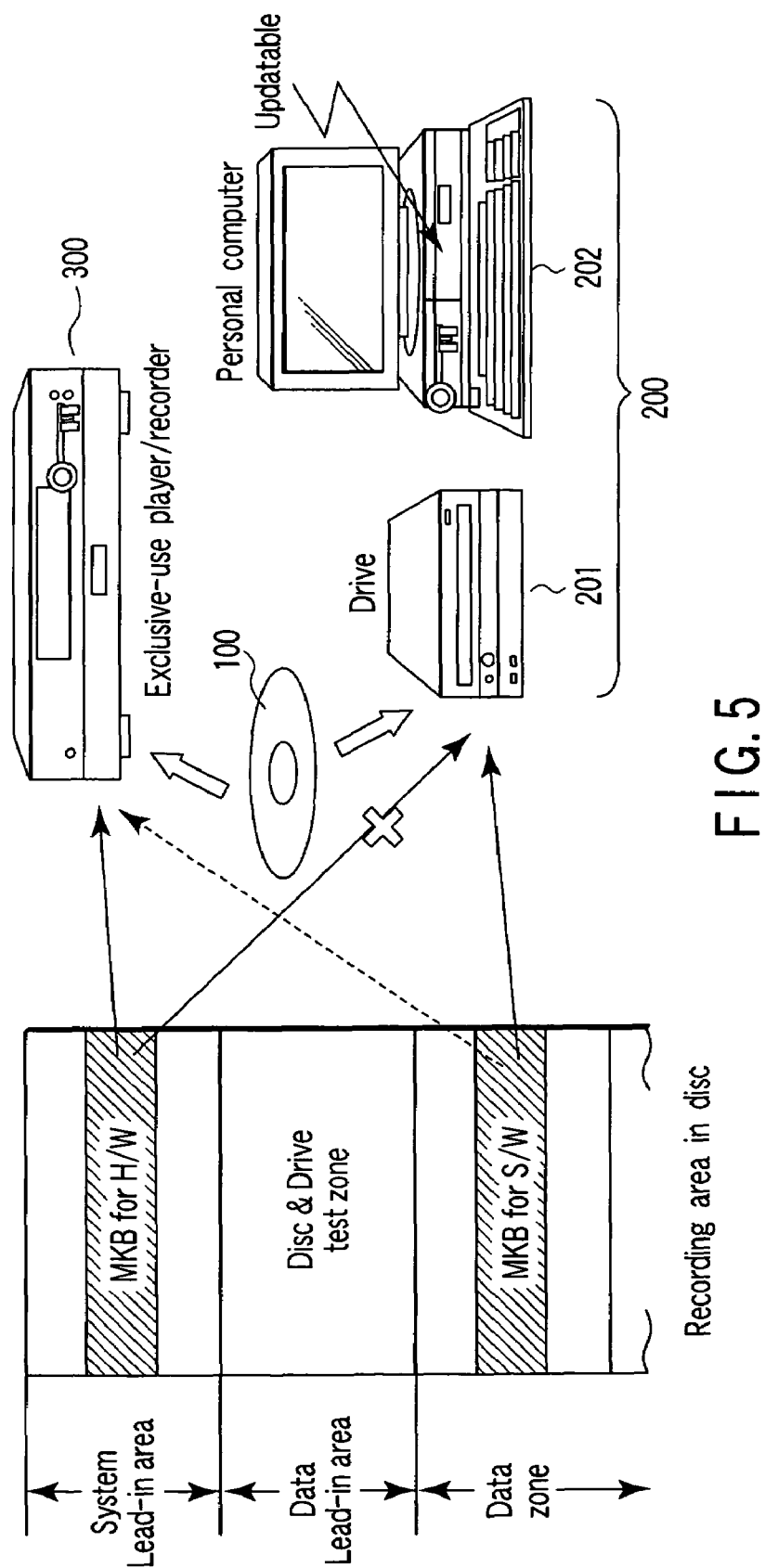
FIG. 5 is an explanatory view showing a relation between a device key according to the present invention, and an MKB to be input/output with respect to the device key.

FIG. 5 is a diagram showing a relation between the device key of the present invention and the corresponding MKB. Recorded information in a recording medium is shown on the left side of the figure, and there are shown a hardware main body device 300 which performs recording/reproducing with respect to the recording medium, and a software main body device 200 on the right side of the figure. Even if the MKB for S/W is used in the hardware main body device 300, a normal title key (Kt) is not decoded. Even if the MKB for H/W is used in the software main body device 200, the normal title key (Kt) is not decoded.

Here, in a case where the device key for hardware is to be used in the software main body device by the fraudulent action, control software is supposed to be tampered in a state input the MKB for H/W is read and utilized by the software main body device. When this illegal tampering is performed, Km can be extracted with the device key for hardware even by the software main body device.

However, in the constitution of FIG. 4, the above-described problem is solved utilizing the characteristics of the drive which performs the data recording/reproducing processing with respect to the recording medium for use generally in the software main body device.

That is, a zone in which the data can be freely managed in response to a standard command from the host side is a data zone of the recording medium. Moreover, in the recording medium, a control data area or the like, or a lead-in area in which a drive and medium test zone or the like is disposed is an area for use at a drive starting time, and a place which cannot be freely managed on the host side.

On the other hand, since all of the processing is closed in the hardware main body device, the processing is entrusted to data arrangement standard of the recording medium, and the data is freely read/written.

Furthermore, the MKB for H/W is disposed in the lead-in area, the MKB for S/W is disposed in the data zone, and the MKB for H/W cannot be read by the usual drive 201. This MKB arrangement can remarkably improve an illegal copy preventing effect of the system of FIG. 4.

Figure 6:
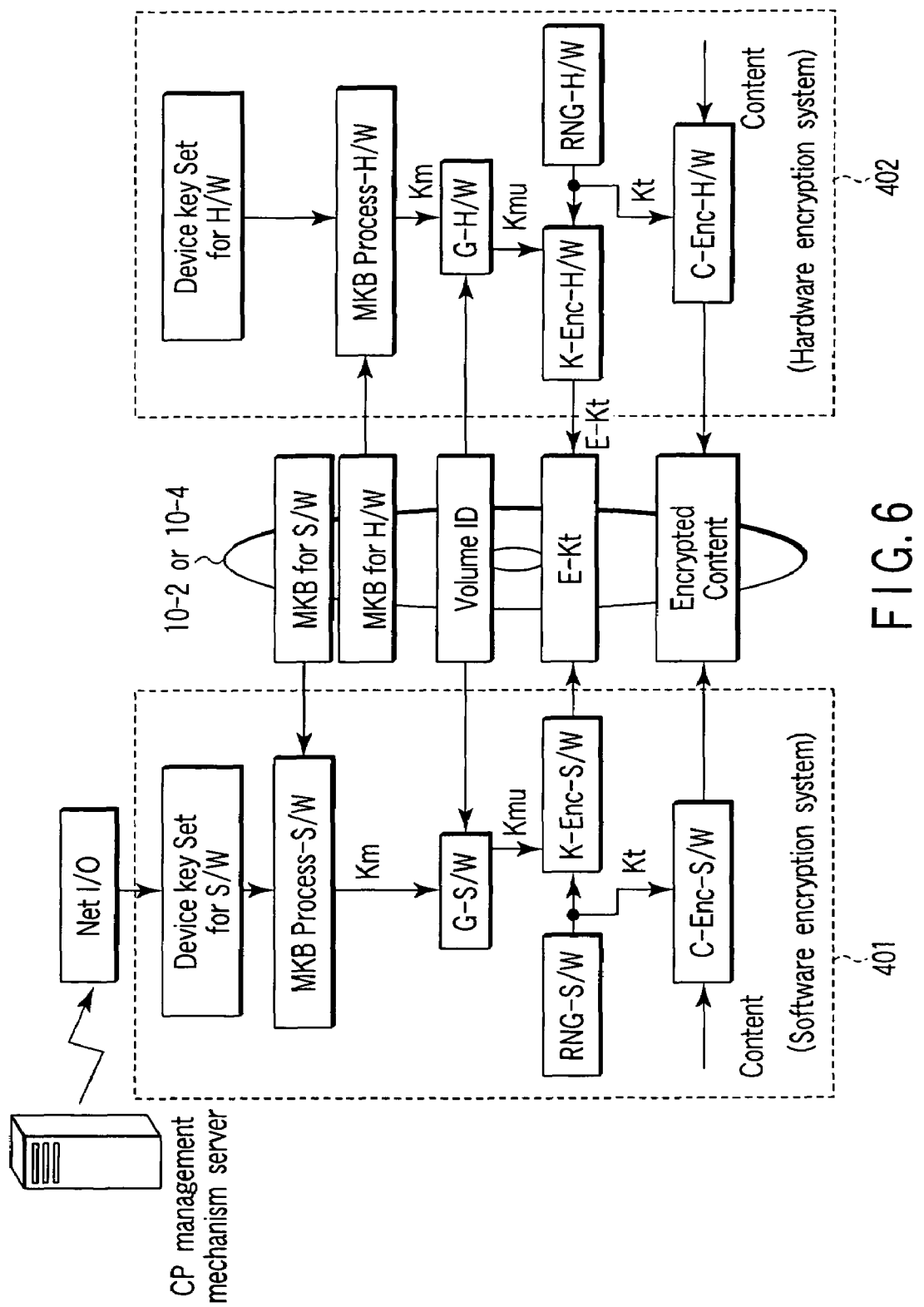
FIG. 6 is an explanatory view showing a constitution example of a decryption system corresponding to the decryption system of FIG. 4.

FIG. 6 shows a constitution example of an encryption system corresponding to the decryption system of FIG. 4.

1) Software Encryption system 401 (Left Side of FIG. 6)

(1a) A random number generator (RNG) or the like generates a title key (Kt) for encrypting a content. Next, in an encryption processing section, the content is successively encrypted with the title key (Kt), prepared as the encrypted content, and recorded in a recording medium.

(1b) An MKB for S/W is read to calculate and extract a media key (Km) in a section (MKB Process-S/W) by use of the MKB and a device key set for S/W.

(1c) Media inherent data (volume-ID) is read from the recording medium, and a media inherent key (Kmu) is generated, for example, in a unidirectional function unit (G-S/W) by use of this volume-ID and the media key (Km).

(1d) The title key (Kt) used in encrypting the content is encrypted with the media inherent key (Kmu) to generate an encrypted title key (E-Kt), and this key is recorded in the recording medium. In this case, an encrypted portion is denoted by K-Enc-S/W in the figure.

2) Hardware Encryption system 402 (Right Side of FIG. 6)

(2a) The random number generator (RNG) or the like generates the title key (Kt) for encrypting the content. Next, in the encryption processing section, the content is successively encrypted with the title key (Kt), prepared as the encrypted content, and recorded in the recording medium.

(2b) An MKB for H/W is read to calculate and extract the media key (Km) in a section (MKB Process-H/W) by use of the MKB and a device key set for H/W.

(2c) The media inherent data (volume-ID) is read from the recording medium, and the media inherent key (Kmu) is generated, for example, in a unidirectional function unit (G-H/W) by use of this volume-ID and the media key (Km).

(2d) The title key (Kt) used in encrypting the content is encrypted with the media inherent key (Kmu) to generate the encrypted title key (E-Kt), and this key is recorded in the recording medium. In this case, an encrypted portion is denoted by K-Enc-H/W in the figure.

Figure 7:
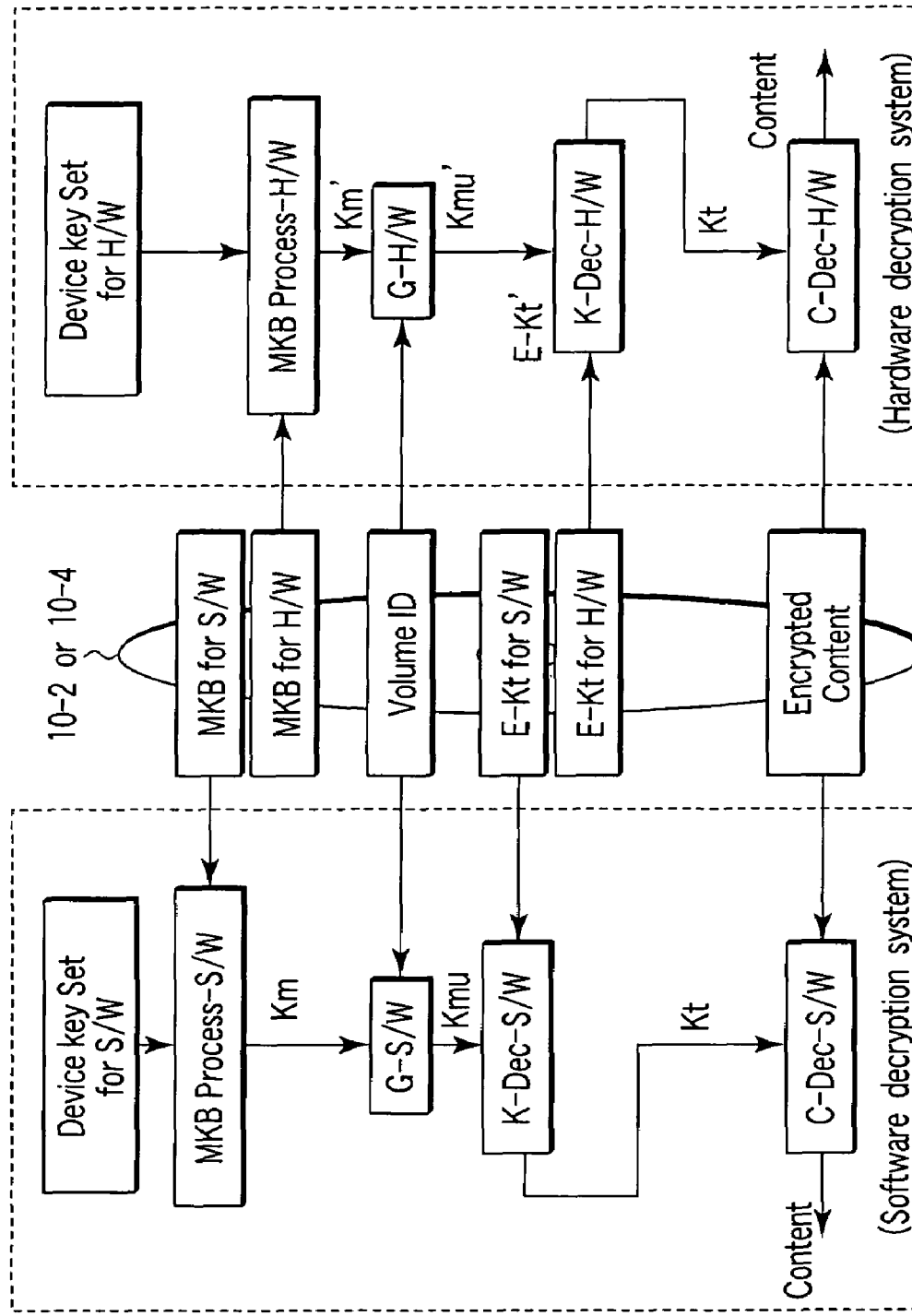
FIG. 7 is a diagram showing another embodiment of the decryption system according to the present invention.

FIG. 7 is a diagram showing another embodiment of the decryption system according to the present invention. The decryption system is different from that of FIG. 4 in that the title key which is a content encrypting key is encrypted and recorded, but the title key encrypted and recorded in the recording medium on a software main body side is different from that on a hardware main body side. That is, an E-Kt for S/W and an E-Kt for H/W are recorded.

That is, the software decryption system 401 is the same as the constitution example if FIG. 4, but the hardware decryption system 402 is slightly different from the example of FIG. 4. A media key (Km') is extracted as a result of calculation processing using a device key set for H/W and an MKB for H/W. A calculation processing section is denoted with MKB Process-H/W in the figure.

Next, a media inherent key (Kmu') is generated as a result of calculation using a volume-ID and Km' in a function calculating unit G-H/W such as a unidirectional function unit. When the title key (E-Kt for H/W) encrypted for hardware is read from the recording medium, and decoded with Kmu', the same title key (Kt) as that on the software main body side is generated.

Therefore, an encrypted content (E-Content) can be correctly decoded in both of the software main body device and the hardware main body device.

Figure 8:
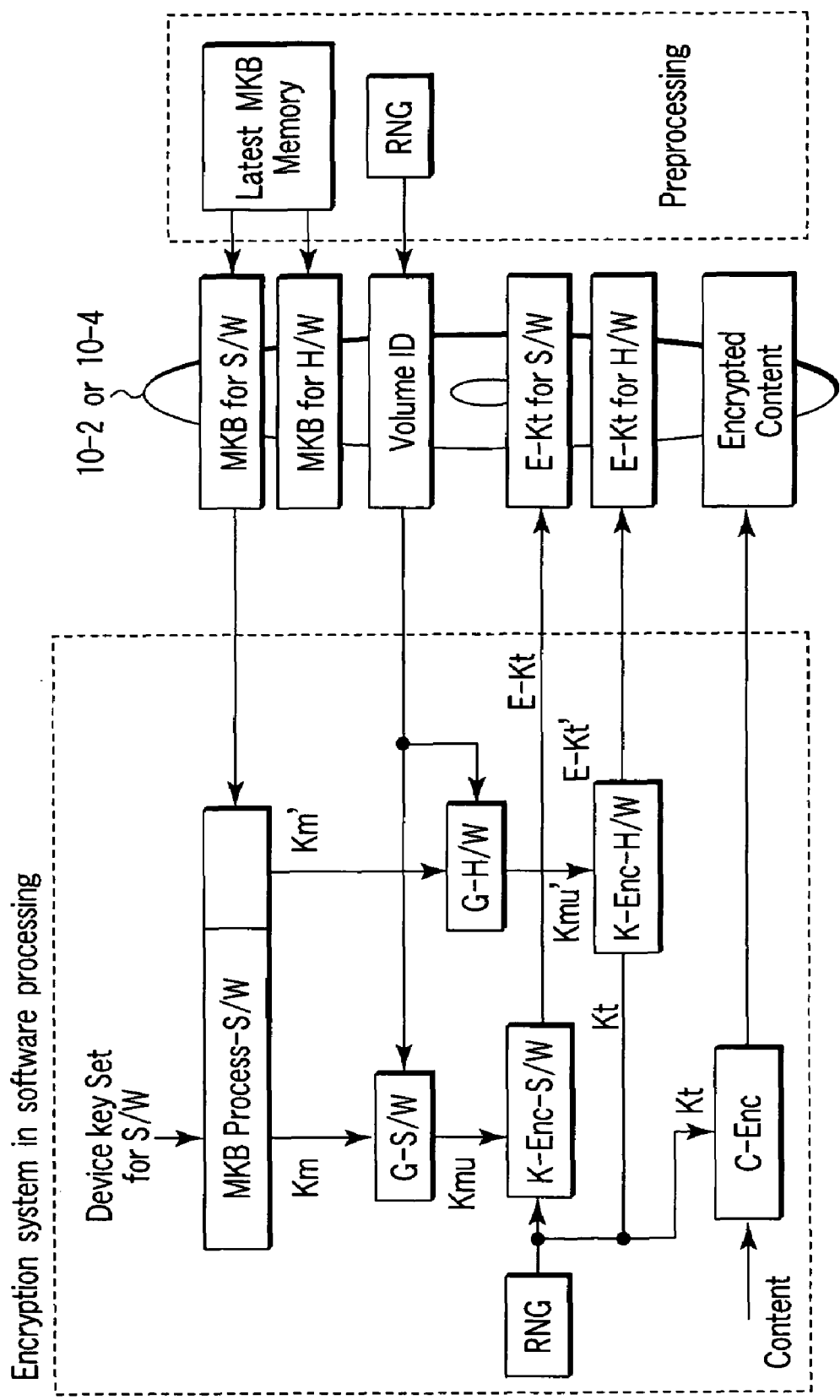
FIG. 8 is a diagram showing a constitution example of a software encryption system corresponding to the decryption system of FIG. 7 in a case where an encrypted content is recorded on the side of a software main body.

FIG. 8 shows a constitution example of a software encryption system corresponding to the decryption system of FIG. 7 in a case where an encrypted content is recorded in a software main body device. Even when the encrypted content is recorded in a recording medium by the software encryption system, as shown in FIG. 7, the content has to be constituted to be decodable in either of the software decryption system and the hardware decryption system.

The recording medium in a case where the content is encrypted and recorded is similar to that of FIG. 7, and the MKB for S/W, the MKB for H/W, and the volume-ID are recorded in advance in the recording medium. In this case, as a method of recording the MKB, the MKB is prerecorded in a recording medium such as an optical disc with a physical structure by wobble signal modulation or the like with respect to an emboss pit or a recording track. As another method, there is a method in which a latest MKB is stored beforehand in a recording drive. As to this latest MKB, the drive itself has the latest MKB in advance, when utilizing the medium in which the latest MKB is recorded. In a case where an unrecorded medium is inserted, the drive records the MKB in the medium in which the MKB is not recorded.

This embodiment does not define the method of recording the MKB in advance, and it is presumed that the MKB is recorded in advance in the recording medium. In preprocessing, the volume-ID obtained from the random number generator is also recorded.

Here, the MKB for S/W is prepared by encryption and calculation of the device key set for S/W and the media keys (Km) and (Km'), when the MKB is generated in advance in the management mechanism of the copyright protection system. Therefore, when the media key extraction and calculation are performed with the device key set for S/W, Km and Km' are generated.

Moreover, Km and Km' are processed using the volume-ID, respectively, and, as a result, the media inherent keys (Kmu) and (Kmu') are generated. These Kmu and Kmu' encrypt the title key (Kt) which is the content encrypting key. As a result, encrypted title keys (E-Kt) and (E-Kt') are generated, and recorded in the recording medium. The content is naturally encrypted with Kt, and recorded.

Figure 9:
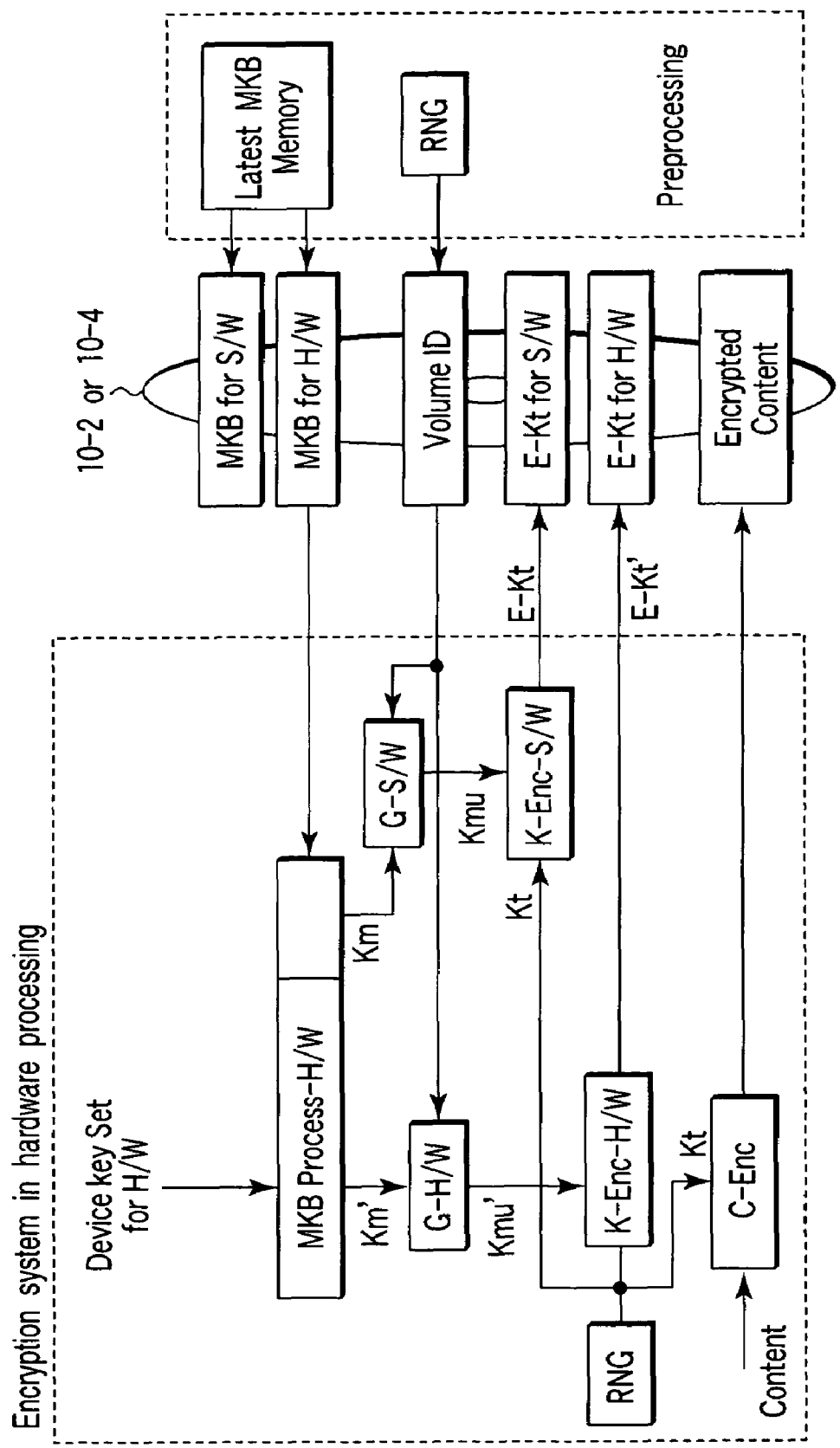
FIG. 9 is a diagram showing a constitution example of a hardware encryption system corresponding to the decryption system of FIG. 7 in a case where the encrypted content is recorded on the side of a hardware main body.

FIG. 9 shows a constitution example of a hardware encryption system corresponding to the decryption system of FIG. 7 in a case where the encrypted content is recorded in the hardware main body device. Also in this case, even when the encrypted content is recorded in the recording medium by the hardware encryption system, the content or the like has to be decoded even in a case where the content is reproduced by either of the software decryption system and the hardware decryption system as shown in FIG. 7.

Although data (MKB for H/W) and key (MKB for S/W) for use are for the hardware, processing steps and blocks have the same constitutions as those of the software encryption system. The preprocessing is also the same as that of the software encryption system.

Figure 10:
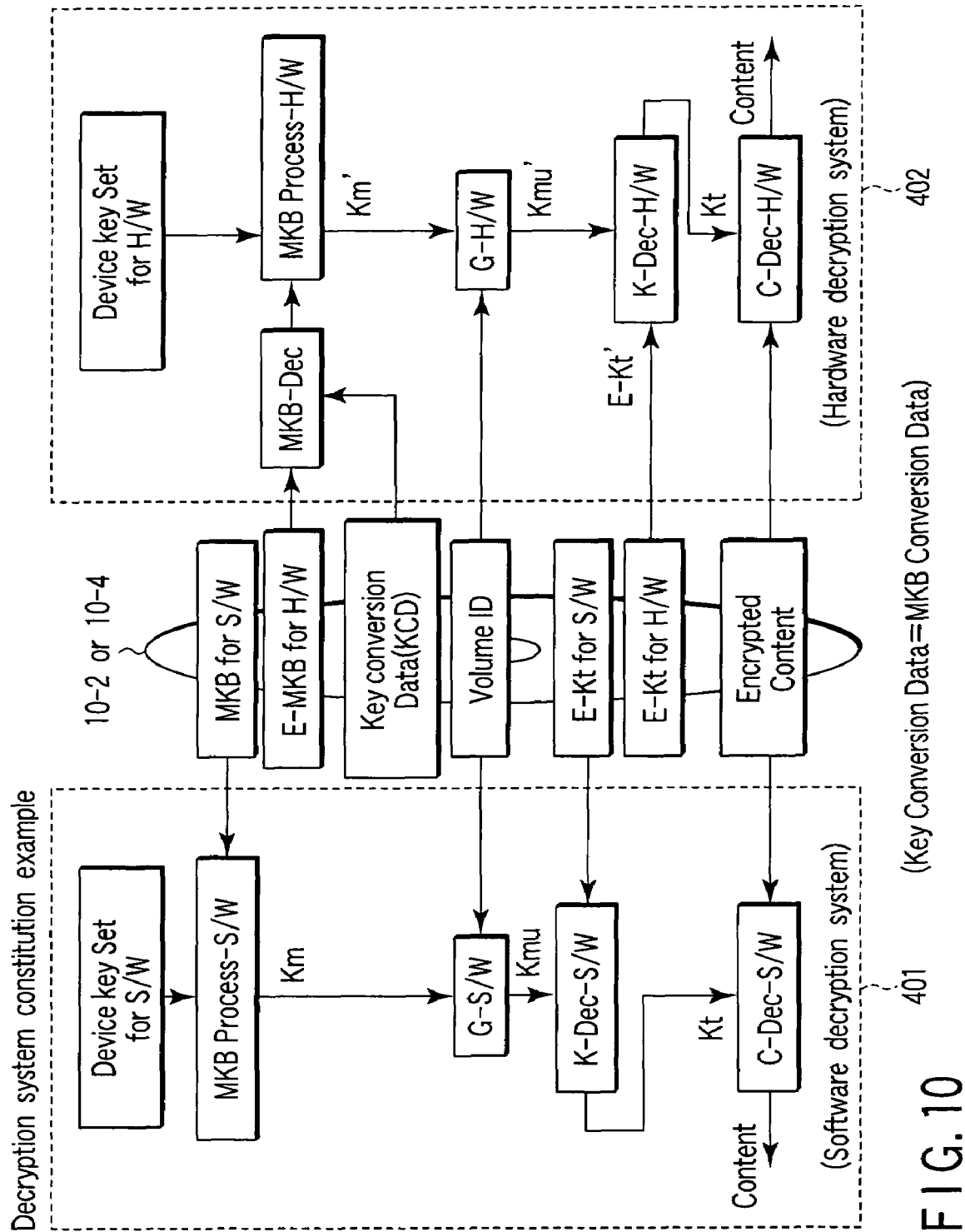
FIG. 10 is a diagram showing a constitution example of a hardware decryption system utilizing a characteristic of the hardware main body device, that is, a characteristic that it is easy to introduce an exclusive-use processing circuit as compared with the decryption system of FIG. 7.

FIG. 10 shows a constitution example of a hardware decryption system utilizing a characteristic of the hardware main body device, that is, a characteristic that it is easy to introduce an exclusive-use processing circuit as compared with the decryption system of FIG. 7.

A consistent idea of the present invention is that the device key set for the software main body device (or the method or the system) is different from that for the hardware main body device (or the method or the system). This largely improves an illegal action preventing ability. The constitution of FIG. 10 further improves the illegal action preventing ability. A basic difference between the examples of FIGS. 10 and 7 is introduction of key conversion data (hereinafter abbreviated as the KCD) which is for use only in the hardware main body device and which is subjected to key data conversion processing. Since the software decryption system is similar to that of FIG. 4 or 7, description thereof is omitted, but the hardware decryption system is different from the constitution of FIG. 4 or 7.

In the above-described embodiment, the MKB for H/W is calculated with the device key to extract the media key (Km), but the MKB for H/W is encrypted by the KCD and recorded in the embodiment of FIG. 10. Therefore, in the figure, E-MKB for H/W is shown. Therefore, after the E-MKB for H/W read from the recording medium is decoded by the KCD read from the recording medium in an MKB decryptions section (MKB-Dec), the MKB is sent to a section (MKB Process-H/W). In this MKB Process-H/W, a media key (Km') is extracted. Processing steps of and after the extraction of Km' are similar to those of the example of FIG. 7. It is to be noted that in this case, the key conversion data may be referred to as MKB conversion data because the MKB is converted.

Here, there is supposed a technology to record/reproduce the data (KCD) by use of the following secret information recording/reproducing system devised by the present inventors. That is, a digital watermark technology is used with respect to main information data in the drive which records/reproduces the data with respect to the recording medium.

Moreover, the encryption key or the like is buried in the main information data. This constitutes a mechanism in which the encryption/decryption is realized only in the drive, and the encryption/decryption processing cannot be handled in a usual recording/reproducing step outside the drive. In a case where this exclusive-use processing section is introduced into the hardware main body device, even if the device key set for H/W is hacked and illegally published in the internet, it is difficult for the software main body device to calculate and generate Km from the device key set for H/W and the MKB.

In a case where the MKB for S/W and the MKB for H/W are constituted as one set of MKB files although described in separate paragraphs, it is possible to detect the MKB for hardware from the side of the software main body device. In this case, an illegal user can extract Km. As a method of producing an environment in which the MKB for hardware cannot be utilized as shown in FIG. 5, the exclusive-use processing section on the hardware main body side according to the present invention is incorporated into the encryption/decryption tree. Accordingly, the constitution of the device key for software can be constituted independently of that of the device key for hardware. Consequently, a system updating function is reinforced.

FIG. 11 shows a constitution example of the software encryption system corresponding to the software decryption system of FIG. 10 in the recording of the content in the recording medium. The software encryption system on the left side of FIG. 11 is the same as that of the example shown in FIG. 8. The preprocessing in the decryption system of FIG. 11 has a system to encrypt and record an MKB for H/W. There is also disposed a system to record key conversion data (KCD) for encrypting the MKB for H/W in the recording medium. That is, in an MKB encrypting section (MKB-Enc), the MKB for H/W is encrypted by the KCD, and recorded in the recording medium. Another constitution is the same as that shown in FIG. 8.

FIG. 12 shows a constitution example of the hardware encryption system corresponding to the hardware decryption system of FIG. 10. In an MKB encrypting section (MKB-Enc), an MKB for H/W recorded in advance in the recording medium is encrypted by KCD, and recorded in the recording medium.

In content encryption processing, read and encrypted E-MKB for H/W is decoded using the KCD read from the recording medium, and sent to a section (MKB Process-H/W). Here, Km' and Km are restored by the device key set for H/W. This and subsequent processing steps are similar to those of FIG. 9.

It is to be noted that the title key encrypted in FIGS. 10 to 12 is independent for the software and the hardware, but a method may be used in which the keys comprise the same E-Kt in the same manner as in FIG. 4. In this case, as to outputs of MKB Process-S/W and MKB Process-H/W, the same media key (Km) is extracted on both of the software and hardware sides.

Figure 13:
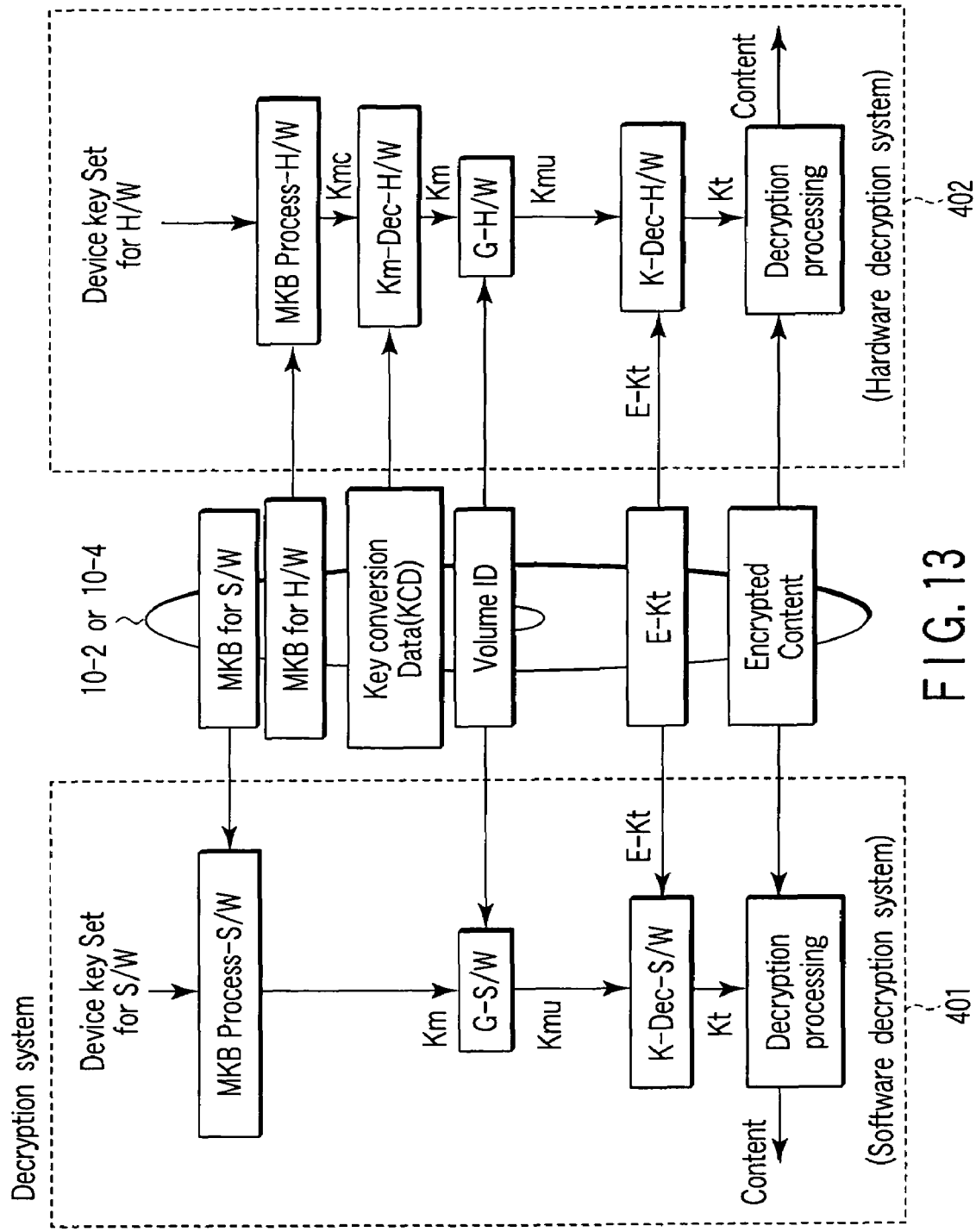
FIG. 13 is a diagram showing still another embodiment of the decryption system according to the present invention.

FIG. 13 shows still another embodiment of the decryption system according to the present invention. The decryption system is different from that of FIG. 10 in a position to use data (KCD). The same E-Kt is used in both of a software decryption system and a hardware decryption system.

In the software decryption system 401, a section (MKB Process-S/W) performs encryption (decryption) calculation processing using an MKB for S/W and a device key set for S/W to generate a media key (Km). On the other hand, in the hardware decryption system 402, a section (MKB Process-H/W) performs encryption calculation processing using an MKB for H/W and a device key set for H/W to generate E-Km (=Kmc) first. This Kmc is obtained by encryption of the media key (Km) by the KCD. Therefore, the encryption (decryption) calculation processing is performed using Kmc and KCD to generate the media key (Km). Processing of and after extraction of Km is similar to that of FIG. 4.

Figure 14:
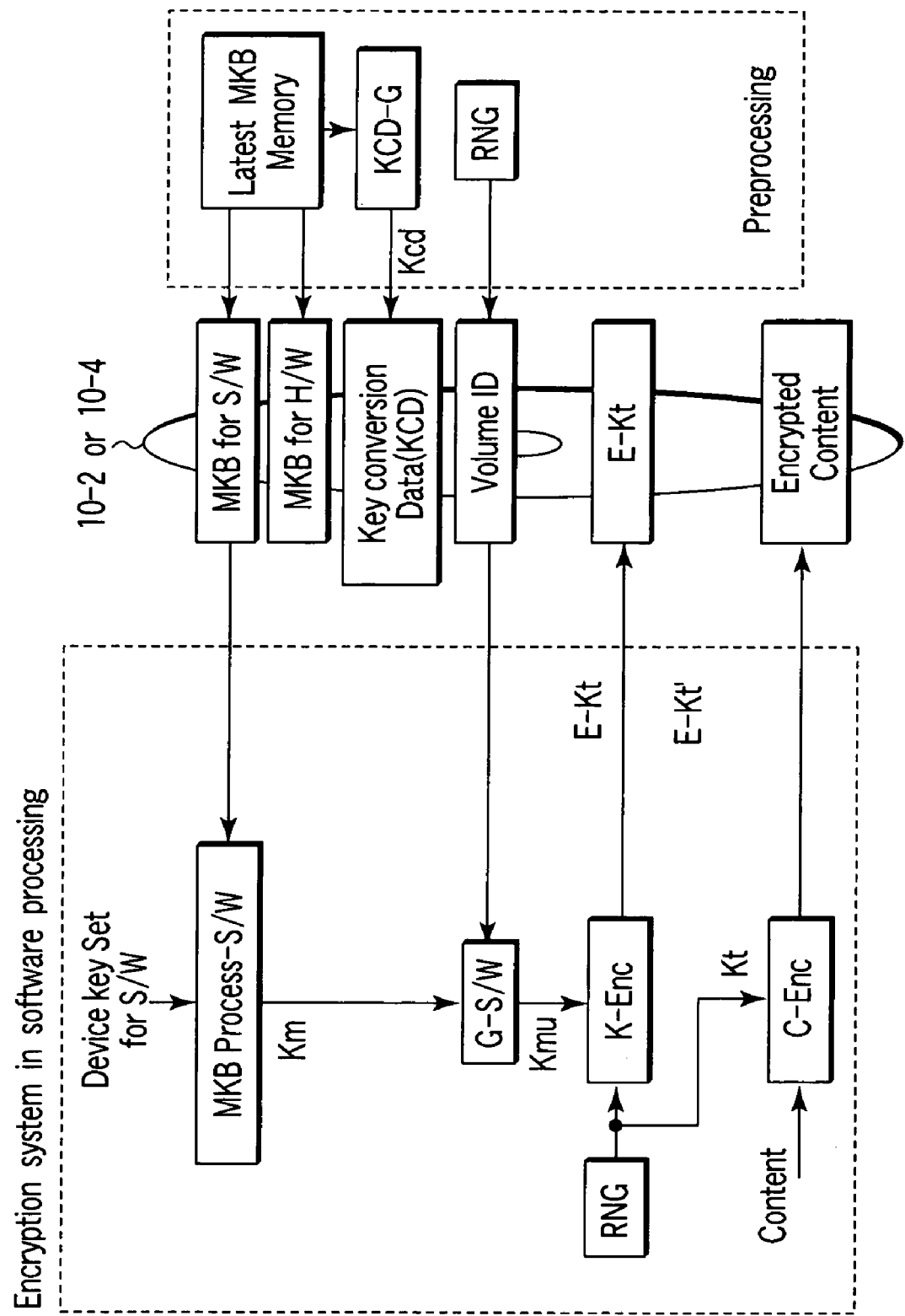
FIG. 14 is a diagram showing a constitution example of the software encryption system corresponding to the software decryption system shown in FIG. 13.

FIG. 14 shows a constitution example of the software encryption system corresponding to the software decryption system shown in FIG. 13. Encryption processing steps of FIG. 14 have the same as the contents shown in FIG. 6. Here, in preprocessing, key conversion data (KCD) is recorded in the recording medium. Another constitution is the same as that of the preprocessing shown in FIG. 8.

Figure 15:
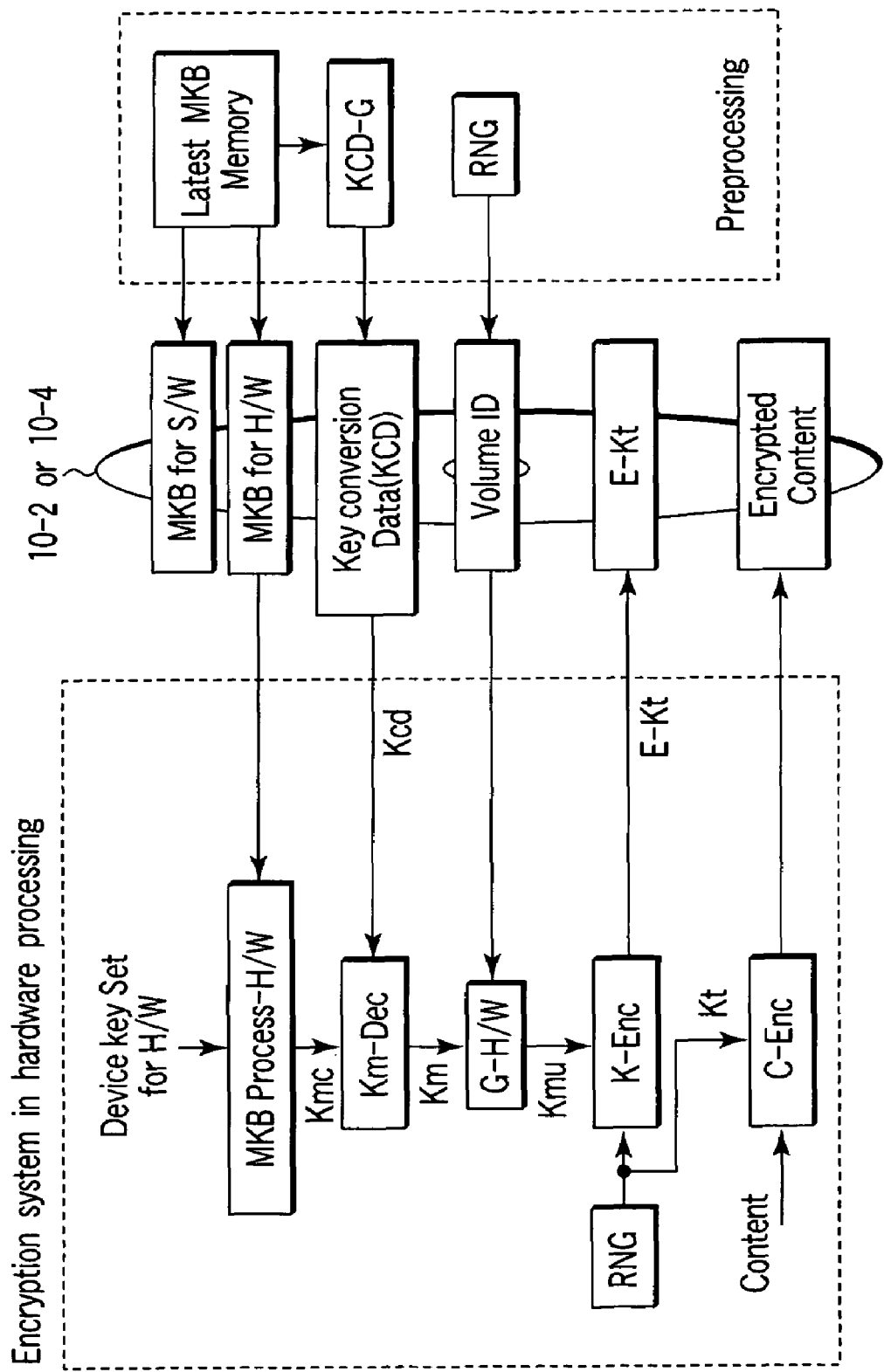
FIG. 15 is a diagram showing a constitution example of the hardware encryption system corresponding to the hardware decryption system shown in FIG. 13.

FIG. 15 shows a constitution example of the hardware encryption system corresponding to the hardware decryption system shown in FIG. 13. Preprocessing is the same as that of the example shown in FIG. 14.

In this system, a media key (Km) is encrypted by the KCD, and converted into Kmc, Therefore, a section (MKB Process-H/W) performs encryption calculation processing using an MKB for H/W and a device key set for H/W to generate E-Km (=Kmc) first. The encryption (decryption) calculation processing is performed using Kmc and KCD to generate the media key (Km). Next, the keys (Km) are processed using a volume-ID, respectively. As a result, a media inherent key (Kmu) is generated. The key (Kmu) encrypts a title key (Kt) which is a content encrypting key. As a result, an encrypted title key (E-Kt) is generated, and recorded in the recording medium. A content is encrypted by Kt, and recorded in the recording medium.

This constitution example is different from the other examples in that the MKB for H/W is generated and presented by a copyright protection system management mechanism. The data (KCD) (recorded in advance in the recording medium) is used in order to encrypt the media key (Km) and generate Kmc. This KCD is supplied from the management mechanism in the same manner as in the MKB for H/W and an MKB for S/W.

FIG. 16 shows still another embodiment of the present invention, and shows constitution examples of software and hardware decryption systems 401, 402 with respect to a recording medium for exclusive use in reproduction.

As a content providing style from a copyright holder, there is providing by a broadcasting form utilizing a radio wave, a transmission form utilizing the internet, or a package media form. In the package media form by the recording medium for exclusive use in reproduction, since large-amount distribution is possible, and there is not any time restriction at a recording time, there are many advantages that much time can be taken in a special edition processing. Therefore, the providing style by the package media form is suitable for providing a content such as a movie. Therefore, in this providing style, especially the illegal action preventing ability is required in order to prevent the content of the recording medium for exclusive use in reproduction from being illegally copied to recording system media.

Therefore, when an encryption tree adopted in the recording medium for exclusive use in reproduction is varied from an encryption (decryption) tree for use in recording/reproducing media, it is possible to enhance a targeted preventing effect by leaps and bounds. That is, since a processing structure in which a general final user records encrypted content in the recording medium by use of a recording/reproducing unit is different from an encryption processing structure in the medium for exclusive use in reproduction, as an actual problem, it is nearly impossible for the general user to prepare the recorded medium which approximates to the medium for exclusive use in reproduction by the illegal action.

This idea is added to the basic system of the present invention in which the hardware encryption/decryption system is varied from the software encryption/decryption system to construct four types of system constitutions. Consequently, it is possible to improve the security ability further.

In FIG. 16, from this way of thinking, a place where KCD is incorporated is disposed in a difficult place in the recording/reproducing system with respect to the encryption tree in the recording/reproducing system described in the above embodiment. Accordingly, the same structure as the encryption structure for exclusive use in reproduction cannot be adopted in the recording/reproducing system. Therefore, the recording medium by illegal copying cannot be prepared as a pseudo medium for exclusive use in reproduction.

That is, an encrypted title key to be recorded in the recording medium is EE-Kt'. As to this title key, E-Kt' encrypted by a media inherent key (Kmu') is further multiplexed and encrypted by the KCD to form EE-Kt'. In the hardware decryption system, EE-Kt' read from the recording medium is decoded by the simultaneously read KCD to calculate and generate E-Kt'. This processing is performed in a decryption section (KK-Dec-H/W). The decrypted key (E-Kt') is further processed in a decryption section (K-Dec-H/W), and derived as Kt.

On the other hand, a section (MKB Process-H/W) decodes Km' by an MKB for H/W and a device key set for H/W. Moreover, the media inherent key (Kmu') is decoded using this Km' and a volume-ID.

This media inherent key (Kmu') is decoded the above-described key (EE-Kt') to decode the title key (Kt) for decrypting the encrypted content. The encrypted content is decoded using this extracted title key (Kt) to reproduce plaintext content data.

As described above, since the KCD is utilized in multiplexing and encrypting the title key, the software encryption system of the above-described embodiment cannot generate the key (EE-Kt). Therefore, the encryption tree in the recording/reproducing medium can be varied from the encryption tree for exclusive use in reproduction, and the illegal action preventing ability can be improved further.

Figure 17:
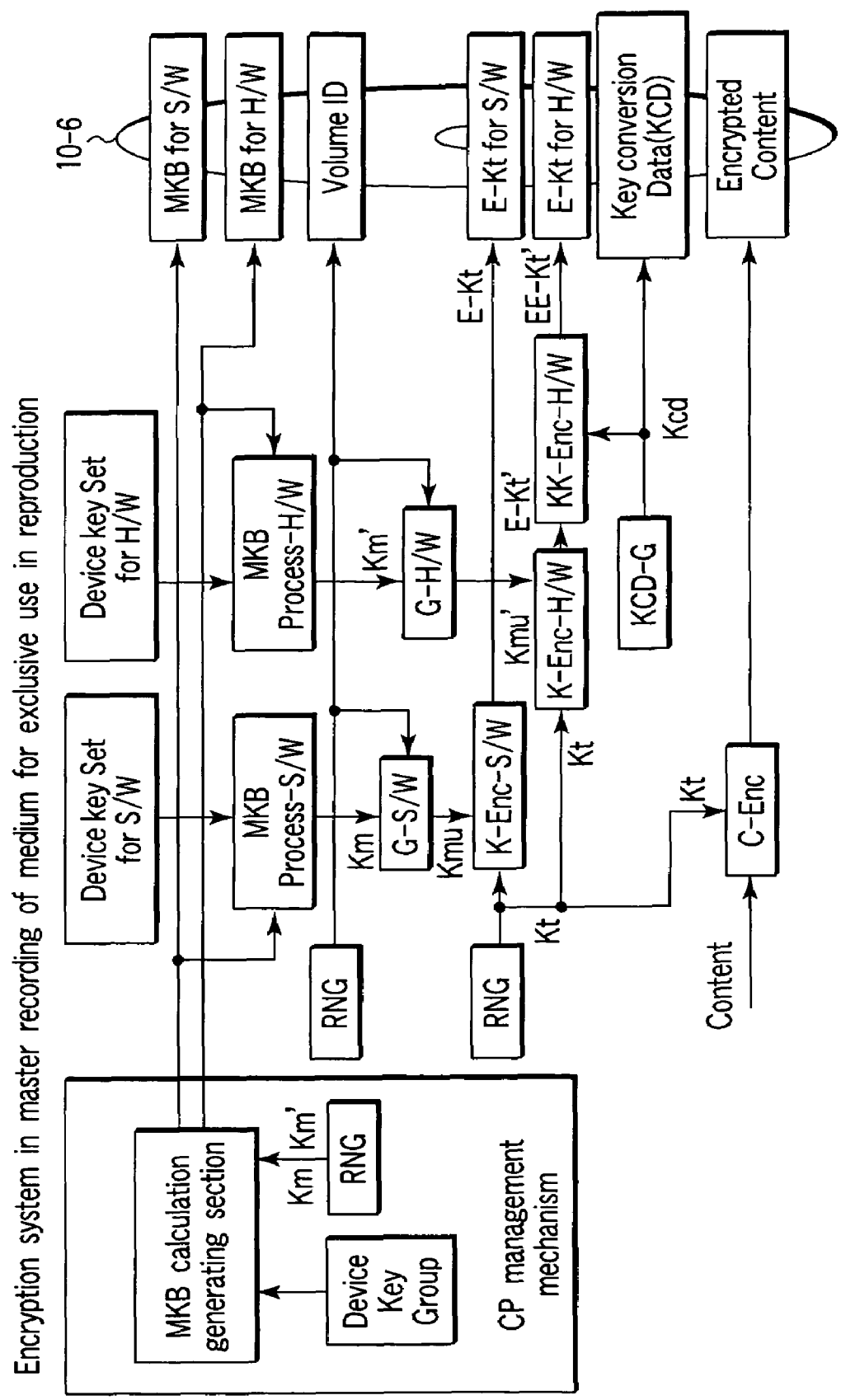
FIG. 17 is a diagram showing an encryption system for use at a time of manufacturing of a master board of the recording medium for exclusive use in reproduction.

FIG. 17 shows an encryption system for use at a time of manufacturing of a master board 10-6 of the recording medium for exclusive use in reproduction. Since an encryption device incorporated in a formatter system in a board manufacturing maker can be utilized in a managed situation, data for software is permitted to be disposed in parallel with data for hardware, and incorporated in the same device.

A copyright protection system management mechanism has a device key group, a random number generator (RNG), and an MKB calculation generating section to issue an MKB for H/W and an MKB for S/W.

In a software encryption system, a media key (Km) is generated using a device key set for S/W and an MKB in a section (MKB Process-S/W). A software corresponding section will be described. In a generator (G-S/W), Km turns to a media inherent key (Kmu) as a result of calculation processing with a random number output from the random number generator. This media inherent key (Kmu) is encrypted in an encrypting section (K-Enc-S/W), converted into E-Kt, and recorded in the master board 10-6.

In a hardware encryption system, a media key (Km') is generated using a device key set for H/W and an MKB in a section (MKB Process-H/W). A hardware corresponding section will be described.

In a generator (G-H/W), Km turns to a media inherent key (Kmu') as a result of calculation processing with the random number output from the random number generator. This media inherent key (Kmu') is encrypted in an encrypting section (K-Enc-H/W), and converted into E-Kt'. The key (E-Kt') is further encrypted in an encrypting section (KK-Enc-H/W) to constitute EE-Kt', and recorded in the master board 10-6.

It is to be noted that the encryption/decryption system of the medium for exclusive use in reproduction described with reference to FIGS. 16, 17 is characterized in that the encryption/decryption tree is varied from that of the recording medium system. Furthermore, when the MKB as the constituting element for exclusive use in reproduction is varied from that for recording, the security effect can be largely improved. That is, the above-described MKB for S/W and MKB for H/W turn to an MKB for S/W and prerecorded media and an MKB for H/W an prerecorded media, respectively. Needless to say, the MKBs for recording mediums turn to an MKB for S/W and recordable media and an MKB for H/W and recordable media, and four types of MKBs are properly used.

Figure 18:
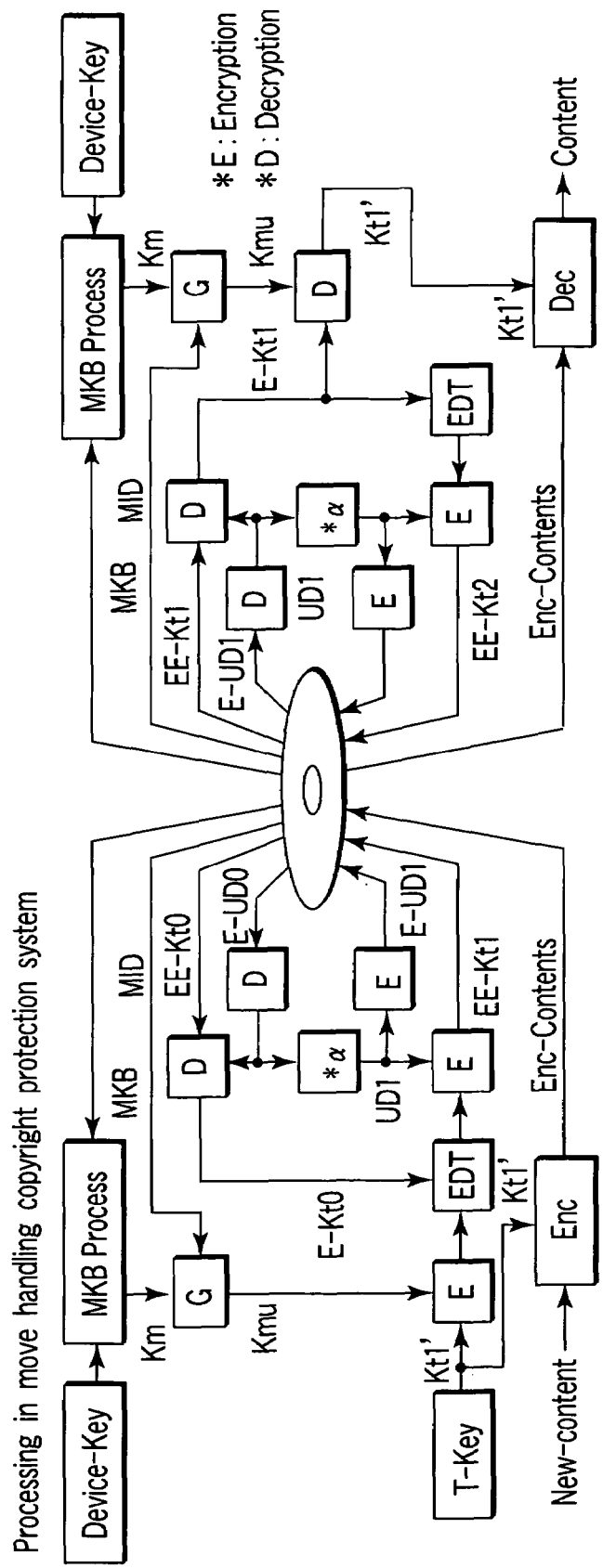
FIG. 18 is a diagram showing a processing constitution example in a copyright protection method corresponding to a content move.

FIG. 18 is a diagram showing a processing constitution example in a copyright protection method corresponding to a content move proposed by the present inventors. Constitutions of recording and reproducing operations will be described in an example in which a plurality of sets of contents exist centering on a recording medium.

The constitutions will be described from the left side of FIG. 18. A section (MKB-Process) processes an MKB read from a recording medium by use of a device key to extract a media key (Km). Next, a function unit (G) processes the media key (Km) and a medium inherent ID (MID) to generate a media inherent key (Kmu). A title key (Kt1') used in encrypting the content is encrypted by Kmu to constitute E-Kt1'. The content is encrypted by Kt1', and recorded in the recording medium.

Here, a plurality of sets of encryption keys are edited. That is, the encrypted title key (E-Kt1') is formed together with an encrypted title key (E-Kt0) into a file, and an encrypted key file (E-Kt1) is encrypted by update information (UD1) to constitute EE-Kt1. In FIG. 18, there is assumed a case where a plurality of title files are managed by individual title keys, respectively.

The above-described EE-Kt1 is recorded as a new encrypted title key in the recording medium to complete the move. The above-described update information (UD1) is encrypted as E-UD1 in the recording medium.

The update information (UD1) and the foregoing encrypted title key (E-Kt0) are generated as follows. That is, an encrypted title key (EE-Kt0) and encrypted update information (E-UD0) are recorded beforehand in the recording medium. The key (EE-Kt0) and the information (E-UD0) are read, and decoded, respectively. The key (EE-Kt0) is decoded into E-Kt0. The information (E-UD0) is decoded into UD0, multiplied by a coefficient $\alpha$, and extracted as the above-described information (UD1).

In FIG. 18, there is assumed a case where a plurality of title files are managed by individual title keys, respectively. The multiplexed and encrypted title key (EE-Kt0) of another title file recorded in the recording medium is subjected to first decryption, sent as (E-Kt0) to a title key editing section (EDT), assembled with the foregoing E-Kt1', and sent as a key file (E-Kt1) to an encryption unit.

Here, the file (E-Kt1) is multiplexed and encrypted by version update information (UD1), and recorded as (EE-Kt1) in the recording medium. The update information (UD) is encrypted by the media key (Km) and recorded in the recording medium. Moreover, in new recording processing or reproduction processing in a case where the encrypted content is moved, an old multiplexed and encrypted title key is removed and the update information (UD) is changed every processing. The multiplexing and encrypting of the encrypted title key are performed every moving. Accordingly, the multiplexed and encrypted title key is constantly updated, and this prevents a violation action by restoration of the removed old multiplexed and encrypted title key.

The reproduction processing in FIG. 18 shows a processing system in the reproducing operation for moving the content to another recording medium (right side of FIG. 18). The encrypted content is decrypted into content data of a plain text, and output. However, in the multiplexed and encrypted title key, the title key corresponding to the moved content is deleted. As to the title key of another content, the encryption processing is updated by the updated multiplexing encryption key, that is, the update information UD.

Even when the multiplexed and encrypted title key before deleted is schemed in advance, and the key is restored by the data by this processing, the title key to decrypt the encrypted content cannot be reproduced. Also in this move handling copyright protection system, the system of the present invention may be introduced in which the device key of the software main body device is distributed independently of that of the hardware main body device.

Figure 19:
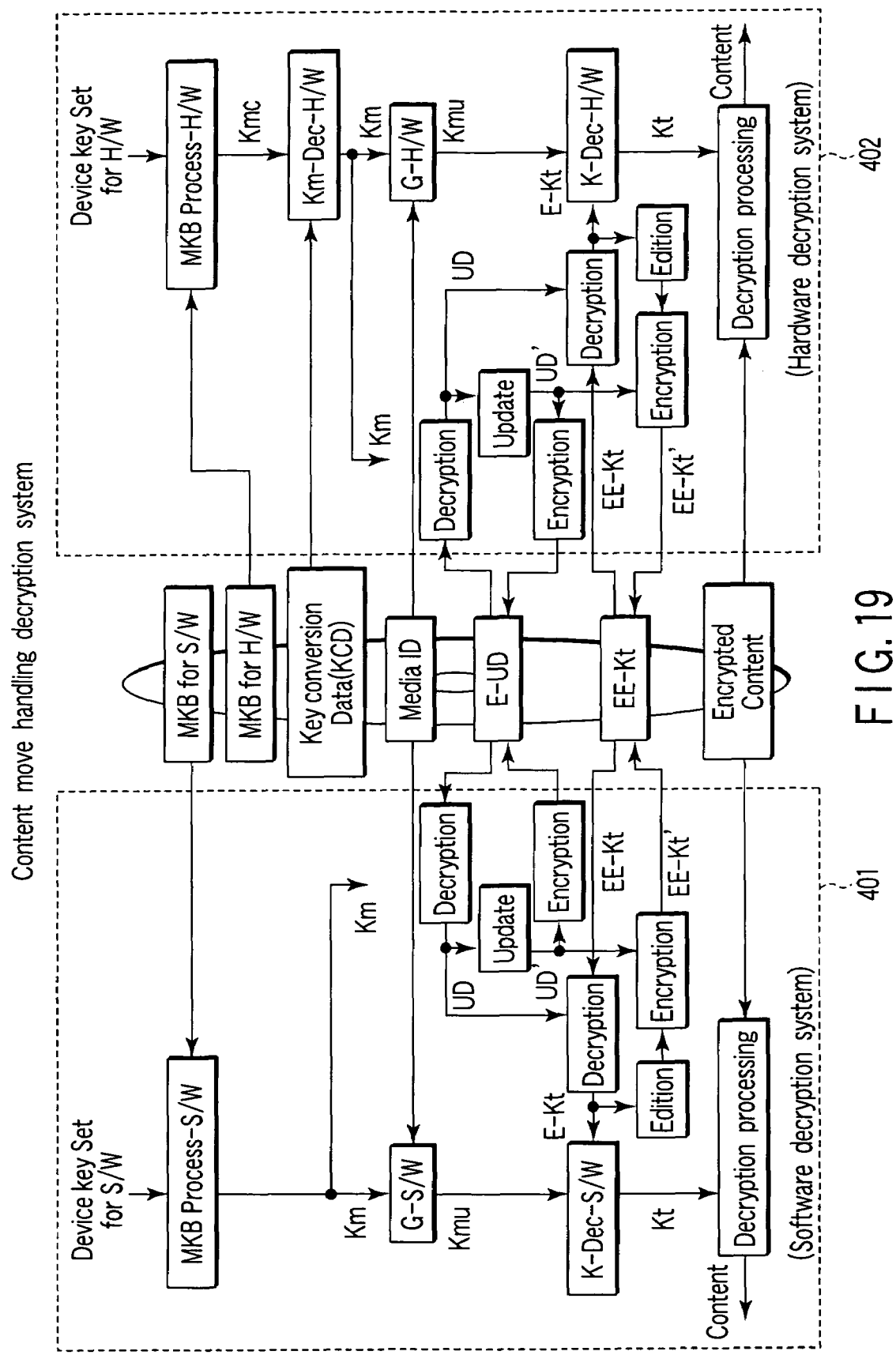
FIG. 19 is a diagram showing a constitution example of a device in which a move handling function is incorporated with respect to the constitution shown in FIG. 13.

FIG. 19 shows a constitution of a device in which a move handling function is incorporated with respect to the constitution shown in FIG. 13. The device key for the software (S/W) main body device is independent of that for the hardware (H/W) main body device. Blocks different from those shown in FIG. 13 will be described. Encrypted update information (E-UD), and multiplexed and encrypted title key (EE-Kt) are recorded in a recording medium.

The following processing is performed at a reproducing and recording time for moving a content. The information (E-UD) recorded in the recording medium is read, and decoded into UD. The key set (EE-Kt) recorded in the recording medium is read, and decoded into E-Kt by use of UD. This E-Kt is utilized for decrypting Kmu into Kt.

The above-described decryption outputs UD and E-Kt are encrypted and recorded again in the recording medium. The information (UD) is updated into UD'. Moreover, UD1 is encrypted, and recorded as new information (E-UD) in the recording medium. On the other hand, after edition, the foregoing E-Kt is encrypted using the foregoing UD' into a multiplexed and encrypted title key (EE-Kt'). This new title key is recorded again in the recording medium.

The processing of the multiplexed and encrypted title key, and that of the update information are performed in processing systems having the same constitution, respectively, in both of the software decryption system and the hardware decryption system.

FIG. 20 is an explanatory view showing an example of an arrangement of an MKB in the recording medium in a case where a KCD according to the present invention is utilized. In a constitution in which the KCD is brought into an active state only in the system on a hardware main body side, the MKB may be disposed in any position. That is, any problem does not occur even if the MKB can be read by either of the software main body device and the hardware main body device. Since the hardware main body device only can detect the KCD, as to the recorded MKB, the only corresponding MKB functions.

From this property, an MKB for S/W and an MKB for H/W are shown as separate blocks, but they do not have to be divided into separate blocks as data blocks of a recording area.

FIGS. 21 to 24 show various types of constitutions of the MKB data file according to the present invention. The file may be recorded in the recording medium in any form.

Figure 21:
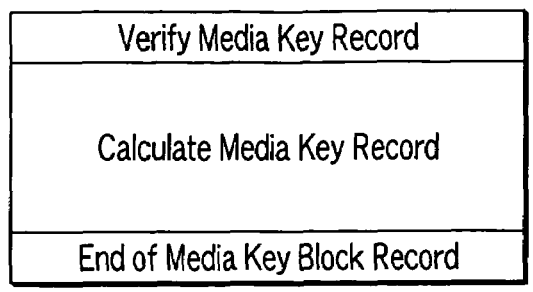
FIG. 21 is a diagram showing a constitution example of an MKB data file according to the present invention.

In the embodiment described with reference to FIGS. 4 and 5, the constitution shown in FIG. 21 is adopted which is a basic structure of the MKB data file, and the file for software is prepared independently of the file for hardware. Moreover, to arrange the respective MKB data files in the recording medium, it is necessary to determine arrangement positions of the respective MKB data files in consideration of properties of the arrangement positions (example shown in FIG. 5).

Figure 22:
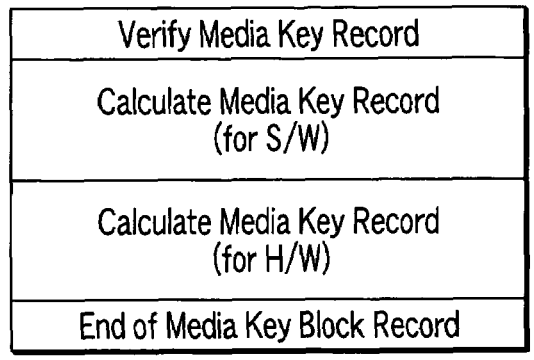
FIG. 22 is a diagram showing another constitution example of the MKB data file according to the present invention.
Figure 23:
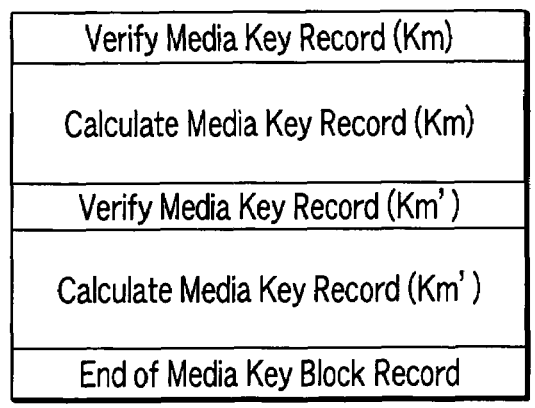
FIG. 23 is a diagram showing still another constitution example of the MKB data file according to the present invention.
Figure 24:
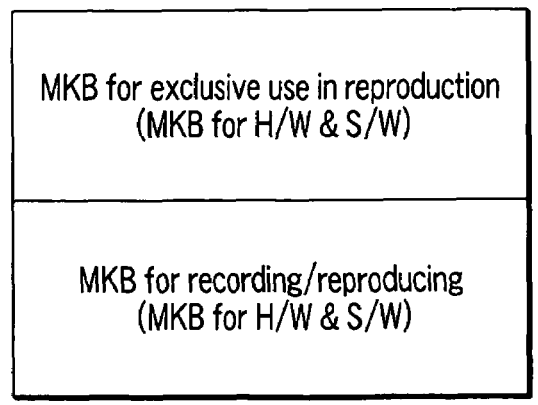
FIG. 24 is a diagram showing still another constitution example of the MKB data file according to the present invention.

However, in the other constitution examples of FIGS. 22 to 24, especially in a system in which the KCD is utilized, data for software is separate from that for hardware, but a data block as the MKB data file may be constituted as one set of data block.

As shown in FIG. 21, an MKB basic constitution comprises: an area (Verify Media Key Record) for verifying that the media key has been recorded; an area (Calculate Media Key Record) in which the media key is recorded; and an area (End of Media Key Block Record) indicating an end of the block in which the media key is recorded. When the media key (Km) for the software is the same as that for the hardware, as shown in FIG. 22, the only area (Calculate Media Key Record) may be prepared for the software independently of that for the hardware, and the areas (Verify Media Key Record) and (End of Media Key Block Record) may be added before and after the area to constitute the data file.

When different media keys (Km) and (Km') are recorded, as shown in FIG. 23, two sets of (Verify Media Key Record) and (Calculate Media Key Record) may be arranged, and the area (End of Media Key Block Record) may be finally added to constitute the data file.

The example of FIG. 24 complies with a case where a constitution for exclusive use in reproduction and that for recording/reproducing are constituted independently of each other as shown in FIG. 16 of the present invention. That is, an MKB for exclusive use in reproduction and that for recording/reproducing may be arranged to constitute the MKB as one data file.

Figure 25:
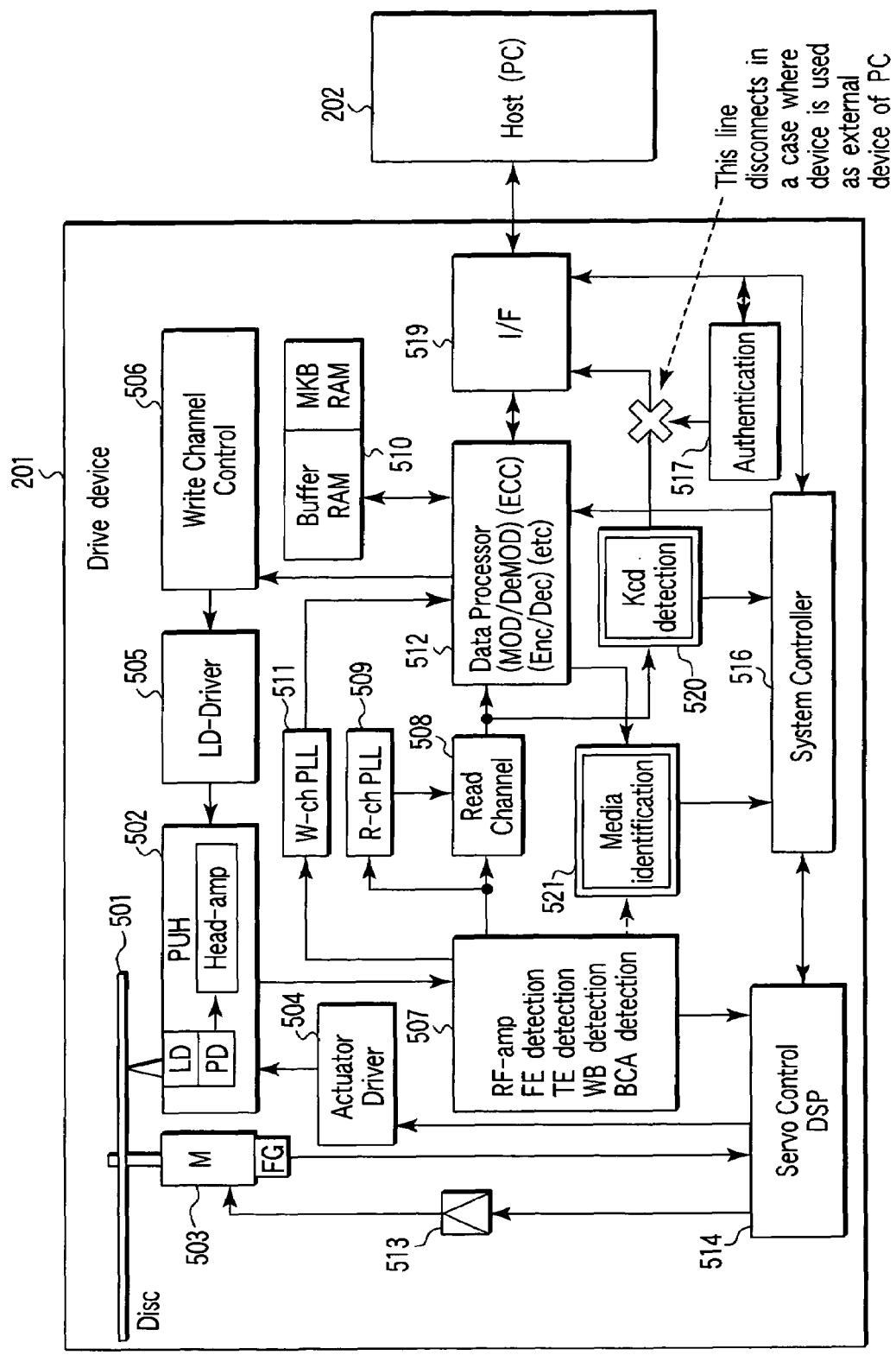
FIG. 25 is an explanatory view showing an example of a software main body device connected to a drive 201 and a host (personal computer) 202, particularly a block relation inside the drive 201.

Next, FIG. 25 shows an example of a software main body device connected to a drive 201 and a host (personal computer) 202, particularly a block relation inside the drive 201.

Especially the drive 201 is supposed to be incorporated as the same device in a hardware main body device, and the drive is shown in such a manner as to facilitate understanding of a relation of a KCD processing section in this case. That is, this drive 201 can be applied to either of the software main body device and the hardware main body device in order to improve a manufacturing efficiency. In a case where the drive is incorporated in the respective devices, different functions are fulfilled.

When the data recorded in a recording medium 501 is reproduced, a signal read from a pickup head PUP 502 is sent to a block 507. The block 507 includes: a high-frequency amplifier (RF-amp); a focus error (FE) detector, a tracking error (TE) detector; a wobble (WB) detector; a BCA detector and the like.

Usually in the drive device, media identification is performed as an initial operation. When the example relates to an optical disc, in addition to identification of CD, DVD, next-generation DVD or the like, media identification is performed. For example, it is judged whether the medium is a medium for exclusive use in reproduction or for recording/reproducing (even in the medium for recording/reproducing in the DVD, there are three types of R, RW, and RAM), or it is judged whether the medium comprises a single layer or a plurality of layers. In this media identification, tentative judgment is performed depending on a reflected light level, a focal position or the like, and data is read from an area in which control data is recorded. Moreover, final medial identifying judgment is performed from contents of the control data. In the copyright protection system CPRM of the DVD shown in FIG. 2, a medium inherent number is recorded as a media-ID in a BCA, a collapsed/non-collapsed area is formed in a reflective film by use of YAG laser, a pattern is regarded as information data, and information is irreversibly recorded. When media identification information is included in this BCA, it is easy to judge whether the medium is a medium for exclusive use in reproduction or a recording medium.

It is to be noted that as to BCA data, data read by the block 507 is utilized by a data processor 512 after error detection correction processing is performed, and reliability is high.

As described above, the media identification is performed by means of judgment information or BCA data by the block 507, and an encryption/decryption tree of the copyright protection system is selected. A servo controller 514 performs focus/tracking control of a recording/reading light beam, and arranges a state in which the recording/reproducing of the data is possible. In this state, in a reproducing operation, a high-frequency signal of the block 507 is input into a read channel section 508, and channel data is read. The high-frequency signal is also input into a phase lock loop circuit, and a read clock for channel data separation is reproduced.

The read channel data is subjected to demodulation/error correction processing or the like in the data processing section 512. Moreover, data required from the host 202 is sent to the host 202 via an I/F section 519.

Here, authentication processing is actually performed between the host 202 and the drive 201, and processing is performed to confirm whether or not to send the data, before the data is output. This authentication processing is performed utilizing an authentication processing section 517 under control of a system controller 516. The host 202 realizes an AV encoder/decoder by the software.

This authentication processing is performed in order to authenticate that the drive 201 and the host 202 have a correct relation, and is unnecessary for a system installed in the same housing as in the hardware main body device.

Therefore, a KCD detecting section 520 which is a secret information detecting section detects signal data of a specific portion of the output of the read channel section 508, that is, KCD depending on whether or not the authentication processing has been performed. However, this detection output signal is prohibited in a case where the above-described authentication processing is performed. That is, a KCD detection signal line between the KCD detecting section 520 and the I/F section 519 is cut as shown by a cross mark. There may be used a method of physically cutting the line or a method of cutting the line with an electric switch.

In the software main body device in which the drive 201 is connected to the host 202 in this manner, any KCD cannot be utilized. Therefore, the host 202 as such for the software main body device cannot utilize any KCD, and defense is kept against the fraudulent action.

It is to be noted that the detection output from the block 507 is input into the servo control section 514. The servo control section 514 can control an actuator drive 504 for controlling a lens position of the PUP 502, and also control a motor 503 which rotates the recording medium 501. In the servo control section 514, a rotation detecting pulse indicating a rotation frequency and phase of the motor 503 is input from a pulse generator (FG).

A buffer 510 is connected to the data processor 512, and is a memory which temporarily stores the data at an error correction processing time. A latest recording medium MKB is stored in this buffer memory. This latest MKB is sometimes transmitted via a network in a S/W system. When the MKB recorded in the medium for exclusive use in reproduction or the recording medium is newer than MKB data recorded in this memory, the MKB is updated.

In a case where recording processing is performed, in a blank medium in which any MKB is not recorded in the inserted medium, or a medium in which old MKB is recorded, the latest MKB is utilized as MKB data in recording the latest MKB in advance in the inserted recording medium.

A write channel control section 506 controls a laser drive 505 which controls a laser diode in the PUP 502, and an appropriate reading or writing power can be set. At a writing time, a phase lock loop circuit 511 for a write channel generates a clock synchronized with a physical address of a recording track of the optical disc 501. As a method of generating this clock, various types of methods are possible. For example, there is a method of obtaining a clock synchronized with a read signal read from the track. There is also a method of detecting wobble of the recording track to obtain a clock whose phase is synchronized with this wobble.

Further in this device, a media identification section 521 is disposed which judges whether the medium is a medium for exclusive use in reproduction or a recordable/reproducible medium. Media type information does not have to be especially encrypted and recorded, and may be disposed, for example, in a head of the MKB. Furthermore, the information may be uniquely recorded as media type information.

On the other hand, as shown in FIG. 26, in a case where the same drive 201 is incorporated together with an AV encoder/decoder section 203 in the same housing, and utilized as an exclusive-use recorder/player 200 (hardware main body device), any authentication processing does not have to be performed. In a case where the authentication processing is not performed, a KCD detection signal line between a KCD detecting section 520 and an I/F section 519 is maintained in a conductive state. Therefore, the AV encoder/decoder section 203 can utilize a KCD. In FIG. 26, blocks corresponding to those of FIG. 25 are denoted with the same reference numerals.

A reproduction signal output from the I/F section 519 is input into an encryption/decryption processing section 602 via an I/F section 601 of the AV encoder/decoder section 203, and decrypted. The decrypted content is decoded by a video/voice coding/decoding processing section 603. The decoded AV signal is derived to the outside via an I/F section 604. A signal input from the outside is input into the video/voice coding/decoding processing section 603 via the I/F section 604, compressed, and coded. The signal is encrypted by the encryption/decryption processing section 602, and sent to the drive 201 via the I/F section 601.

As described with reference to FIGS. 25 and 26, in a case where the drives 201 manufactured on the same conditions are utilized as the drives 201 in an S/W system (PC system) and an exclusive-use recorder/player, even when the KCD detecting section 520 is constantly operated, an output signal line is disconnected or connected so that a utilization efficiency can be enhanced. This is effective in reducing product costs.

Figure 27:
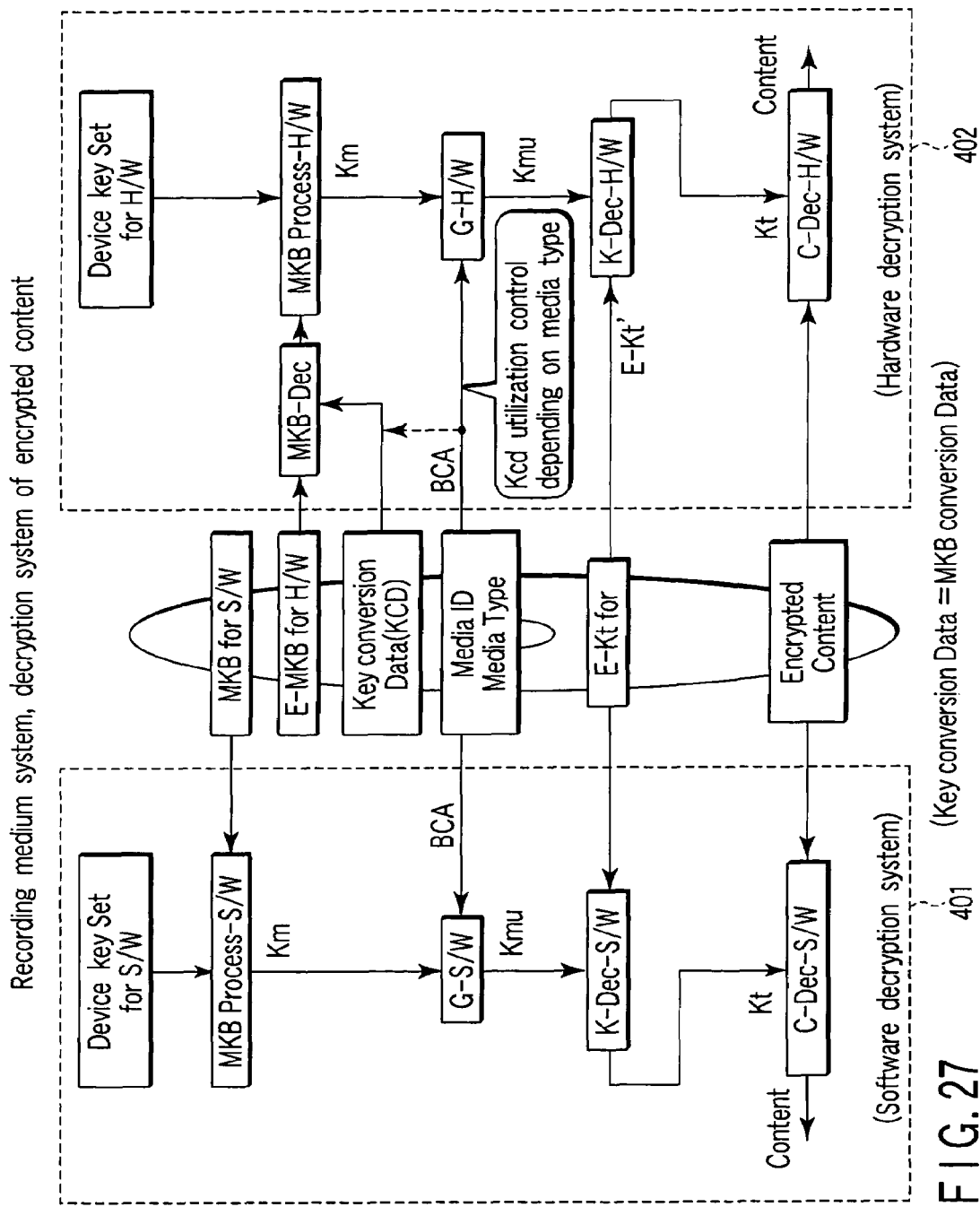
FIG. 27 is a diagram showing the software decryption system and the hardware decryption system according to still another embodiment of the present invention.

FIG. 27 shows the software decryption system and the hardware decryption system according to still another embodiment of the present invention. In the following embodiment, it is presumed that the soft and hardware main body devices described with reference to FIGS. 25 and 26, the medium system for exclusive use in reproduction of FIGS. 16, 17, and the medium system for recording with reference to another figure are judged and controlled by media identification. A constitution of FIG. 27 is substantially the same as that shown in FIG. 10, and E-Kt is constituted to be common on software and hardware sides. Media type information is irreversibly recorded together with a media-ID, and a place where the KCD is utilized is controlled depending on an identification result by the media type in the hardware decryption system.

In FIG. 28 sides (A) and (B) show constitution examples of the software encryption system corresponding to the software decryption system shown in FIG. 27. A constitution shown at the side (A) in FIG. 28 is substantially the same as that of FIG. 11. Additionally, since E-Kt is the same on the software and hardware sides at the side (A) in FIG. 28, the constitution is simplified as compared with that of FIG. 11. The system at the side (A) in FIG. 28 shows an example of an embodiment of preprocessing which is different from that at the side (B) in FIG. 28.

That is, even the software encryption system requires a function of recording E-MKB for H/W for the hardware main body device in advance. Therefore, in a preprocessing section, an MKB can be encrypted by key conversion data (KCD), and recorded in the recording medium. In the side (B) of FIG. 28, in a case where the KCD is recorded beforehand in the recording medium, the KCD is read from the recording medium, and the MKB is encrypted utilizing the KCD.

Figure 29:
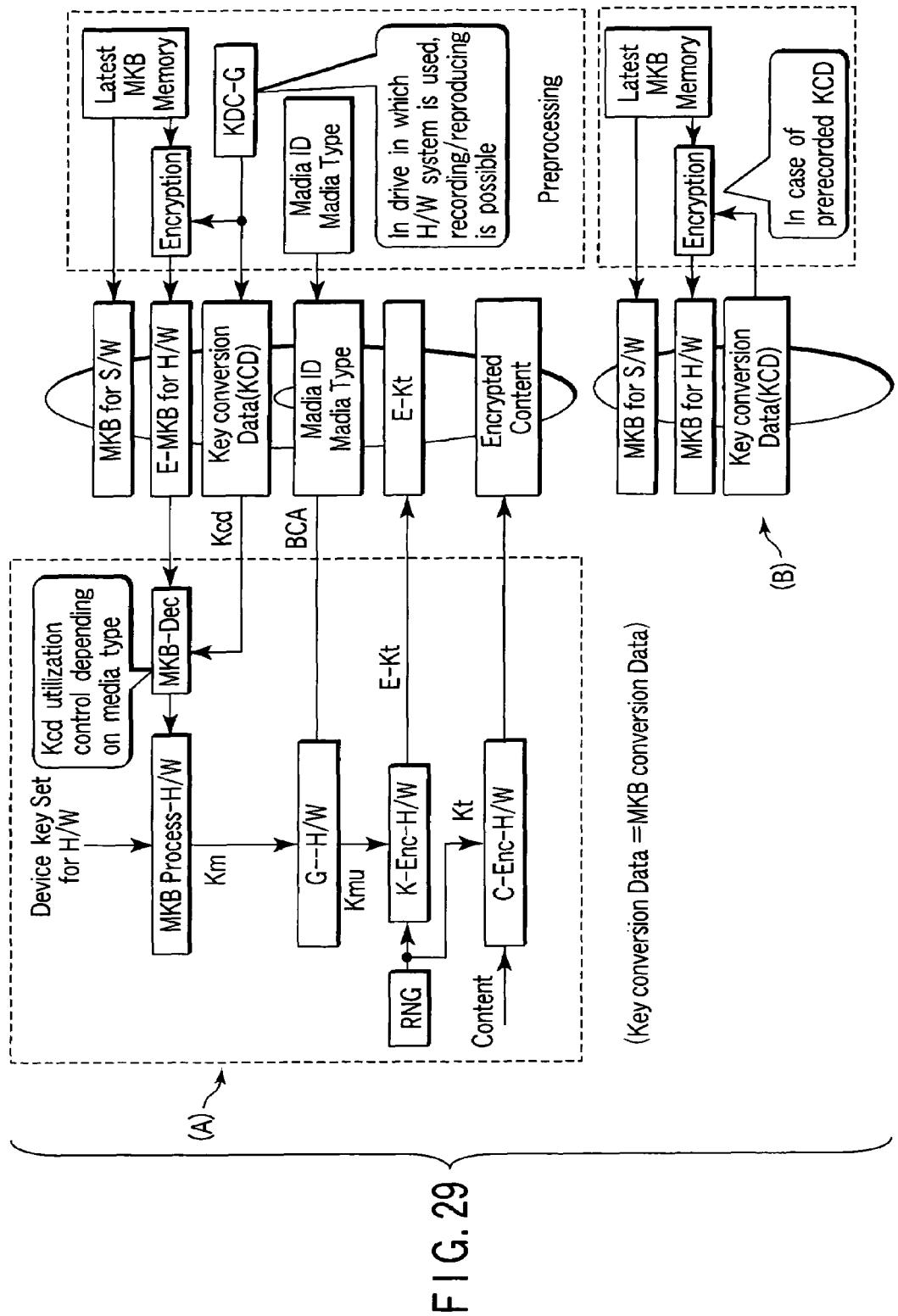
FIG. 29 is a diagram showing a constitution example of the hardware encryption system corresponding to the hardware decryption system shown in FIG. 27.

In FIG. 29, sides (A) and (B) show constitution examples of the hardware encryption system corresponding to the hardware decryption system shown in FIG. 27.

A constitution shown at the side (A) in FIG. 29 is substantially the same as that of FIG. 12. Additionally, since E-Kt is the same on the software and hardware sides at the side (A) in FIG. 29, the constitution is simplified as compared with that of FIG. 12. Moreover, the medium for recording is determined depending on a media type read from the BCA or the like together with a media-ID, and a place where the KCD is utilized is determined. As a result, even when the whole data recorded in the medium for exclusive use in reproduction is copied to the medium for recording, and falsified as the medium for exclusive use in reproduction, the data is not reproduced or ensured, and the security ability of the whole system is more largely improved.

In FIG. 29, the sides (A) and (B) show examples in which embodiments of preprocessing are different. In a preprocessing section at the side (A) FIG. 29, an MKB can be encrypted by key conversion data (KCD), and recorded in the recording medium. At the side (B) in FIG. 29, in a case where the KCD is recorded beforehand in the recording medium, the KCD is read from the recording medium, and an MKB is encrypted utilizing the KCD.

FIG. 30 shows the software decryption system and the hardware decryption system with respect to the medium for exclusive use in reproduction according to the present invention. This embodiment has the same constitution as that shown in FIG. 16. A software main body device side indicates that it is impossible to read the KCD. Furthermore, a volume-ID to be allocated to each title unit or each production lot is recorded as a volume-ID' in a conventional arrangement place, and a media type is recorded in an irreversibly recorded area such as a BCA. Moreover, there is added a constitution in which the volume-ID' and the media type are sent to a generator (G) such as a unidirectional function unit to generate the volume-ID of an encryption/decryption tree line.

According to this constitution, in media identification of reproducing and recording mediums and another recording medium system, when information of the BCA is first read, an encryption/decryption tree can be selected, and additionally the security ability can be expected to be largely improved.

Figures 31A, 31B:
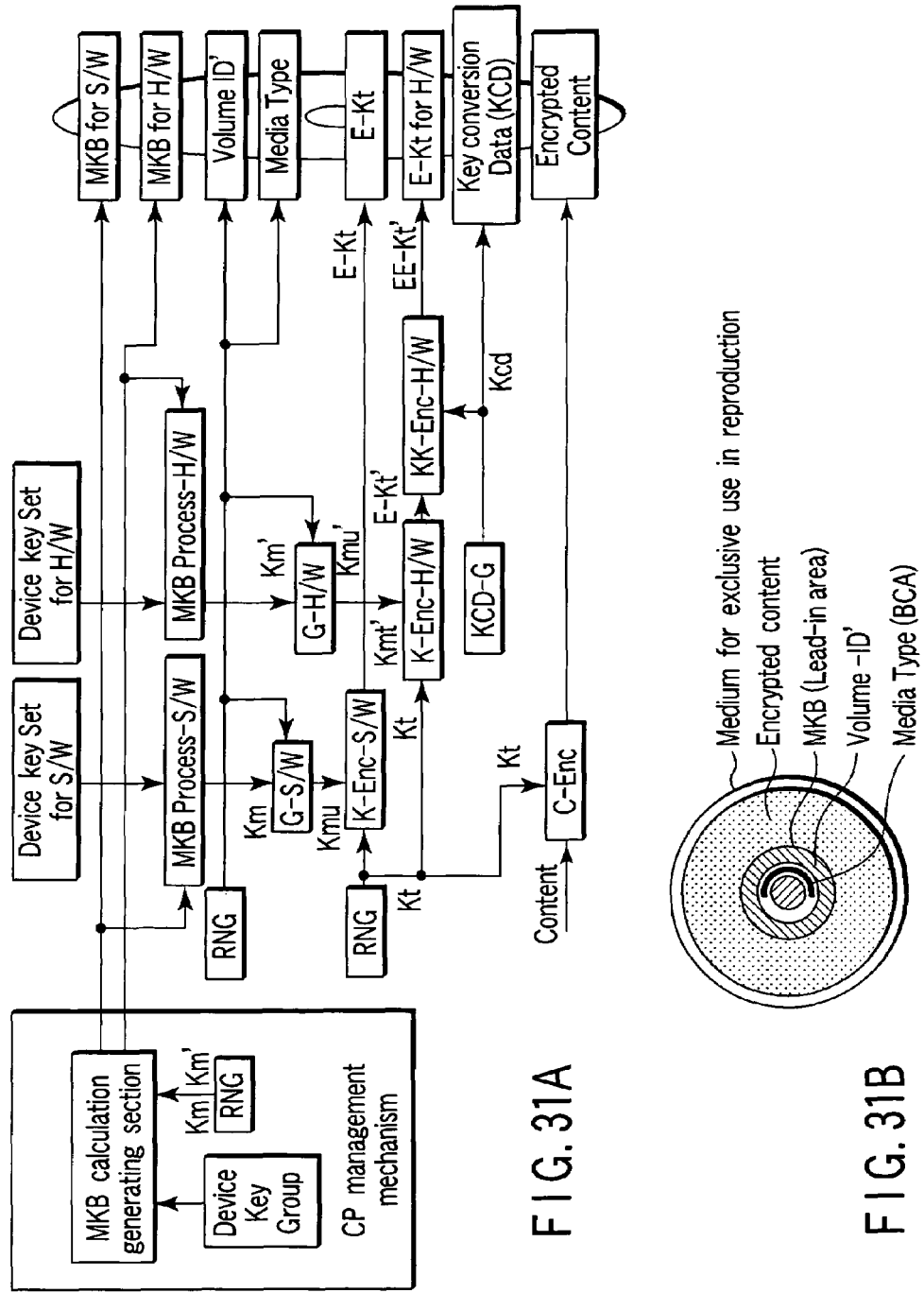
FIGS. 31A, 31B are explanatory views showing a block constitution of an encryption system and a disc for use at a time of production of a master board with respect to the medium for exclusive use in reproduction shown in FIG. 30.

FIG. 31A shows an encryption system for use at a time of production of a master board 10-6 with respect to the medium for exclusive use in reproduction shown in FIG. 30.

Since an encryption device incorporated in a formatter system in a board manufacturing maker can be utilized in a managed situation, data for software is permitted to be disposed in parallel with data for hardware, and incorporated in the same device. A constitution is the same as that of the example shown in FIG. 17. Here, a volume-ID which is encryption key information in generating an encryption key (Kmu) of a title key (Kt) for use in encrypting the content is divided into a volume-ID' and a media type in recording of the master board forming a medium for exclusive use in reproduction, and they are recorded in designated places, respectively.

FIG. 31B shows a medium for exclusive use in reproduction in which encrypted content and encryption key information or the like required for decryption processing are recorded. The media type is recorded in a BCA, the volume-ID' and MKB are recorded in a lead-in area, and the encrypted content is recorded in a data area.

Figure 32:
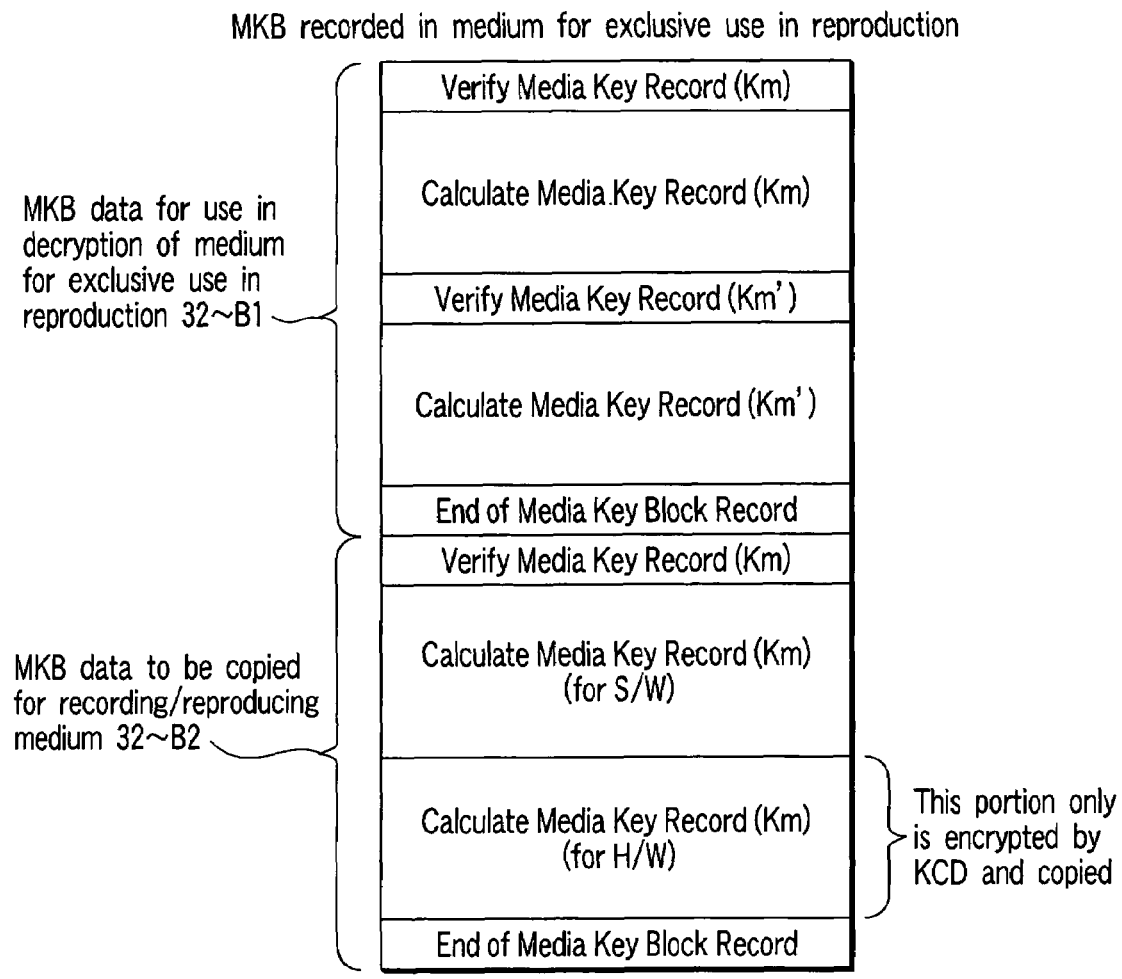
FIG. 32 is a diagram showing an example of a data structure of an MKB file recorded in the medium for exclusive use in reproduction.

FIG. 32 shows an example of a data structure of an MKB file recorded in the medium for exclusive use in reproduction. There are: a block 32-B1 of MKB data for use in decrypting a signal read from the medium for exclusive use in reproduction; and a block 32-B2 of MKB data to be copied for a recording/reproducing medium.

Areas (Verify Media Key Record (Km)) and (End of Media Key Block Record) are secured in a head and a terminating end of either of the blocks.

The block 32-B1 includes: an area (Calculate Media Key Record (Km)) utilized on a software main body device side; and an area (Calculate Media Key Record (Km')) utilized on a hardware main body device side. The block 32-B2 also includes: an area (Calculate Media Key Record (Km)) utilized on the software main body device side; and an area (Calculate Media Key Record (Km')) utilized on the hardware main body device side.

Here, the only area (Calculate Media Key Record (Km')) is encrypted by the KCD and copied.

It is to be noted that the areas (End of Media Key Block Record) are constituted in the blocks 32-B1 and 32-B2, respectively, but the block 32-B1 may be omitted.

FIG. 33 corresponds to the hardware main body device shown in FIG. 26. Therefore, the same components as those of FIG. 26 are denoted with the same reference numerals. A drive 201 is incorporated together with an AV encoder/decoder section 203 in the same housing to constitute an exclusive-use recorder/player 200 (hardware main body device). In this case, any authentication processing does not have to be performed. Therefore, authentication processing sections 525, 615 are set to be off. When any authentication processing is not performed, a KCD detection signal line between a KCD detecting section 520 and an I/F section 519 is maintained in a conductive state. Therefore, the AV encoder/decoder section 203 can utilize KCD. An encryption/decryption tree is selected in such a manner that a place where the KCD is utilized or the like is determined by detection of a media type.

Figure 34:
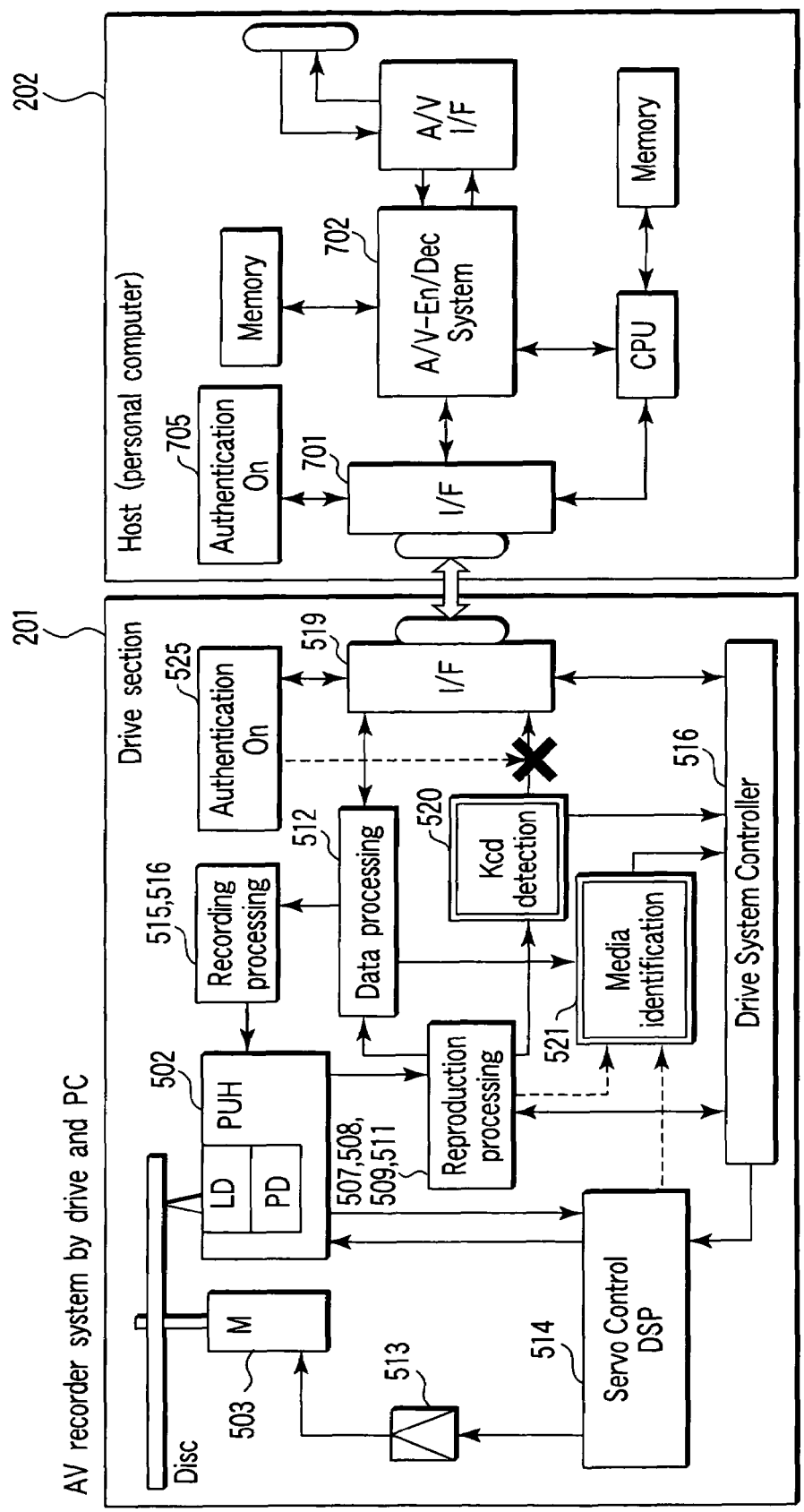
FIG. 34 is a diagram showing an example of the software main body device according to the present invention.

FIG. 34 shows a device corresponding to the software main body device shown in FIG. 25. Therefore, the same components as those of FIG. 26 are denoted with the same reference numerals. On the side of a personal compute 202, an AV encoder/decoder function 702, an authentication function 705 and the like are constructed by software. A signal input via an I/F section 701 is processed by the software. The signal processed by the software is sent to a drive 201 via the I/F section 701.

As described above, the embodiment of the present invention relates to a system which encrypt the content and record/reproduce the content with respect to the recording medium to realize copyright protection. As configurations of the device, there are: a software main body device in which the drive taking charge of the data recording/reproducing processing of the recording medium is connected to a host device such as a personal computer to constitute the system; and a hardware main body device in which the drive and the encode/decode processing of a content are installed in the same housing to constitute the system incapable of scheming the intermediate signal of the processing step. As mediums to be handled, there are a medium for exclusive use in reproduction and a recording medium. Here, the device key which is the secret key of the encryption base in the encryption tree is generally network connection in the software system, and periodic update can be introduced. That is, even when the device key as the secret key is hacked, the system is easily updated in the update processing of the device key.

On the other hand, in the hardware system, a form in which the system is utilized without being connected to the network is a main form. Therefore, it can be said that it is difficult to update the device key in the system. However, since the data processing step is performed in the exclusive-use housing, the step is not easily detected by the user in this constitution. Therefore, the drive is easily provided with a function of reading special secret data and comparing and judging the data. The drive for use in the software system has a structure which is controlled in response to the standardized command signal and in which the drive is brought into management by the host. Therefore, it is difficult to impart a special processing function to the drive.

Moreover, in the media type to be handled, there are roughly classified into the medium for exclusive use in reproduction and the recording medium. Since the medium for exclusive use in reproduction is manufactured by a major board manufacturing maker, the step of subjecting the content to the encryption processing to record the content, that is, the encryption processing step is all performed in a managed state authorized by the copyright protection management organization. Therefore, it cannot be considered that illegal copying occurs in the maker. The violation preventing function may handle the decryption processing only.

On the other hand, in a case where the content is encrypted and recorded in the recording medium, that is, copy-once of the content sent by digital TV broadcasting is admitted, the recording processing or the like is handled by the recording system of the final user. When the processing control is illegally altered, there are caused illegal actions such as production of a plurality of mediums in which the encrypted content is recorded, and illegal copy of the encrypted content of the medium for exclusive use in reproduction in the recording medium. Therefore, the violation preventing function has to be considered with respect to both of the encryption processing and the decryption processing.

There have been skillfully used the peculiar properties of the software processing system and the hardware processing system (it is not a problem whether the actual data processing is software or hardware) and the peculiar properties of the media type. That is, when the device keys are independently constituted for the software system and the hardware system, the software system can be quickly updated by the periodic update processing. On the other hand, the device key for the hardware processing cannot be utilized in the software system in which the violation is very quickly diffused. Therefore, damages can be minimized at a time when the violation is caused in the system updating by the conventional MKB updating. Furthermore, the encryption/decryption tree of the medium for exclusive use in reproduction is different from that for use in the recording medium. Consequently, even when all of the encrypted contents of the medium for exclusive use in reproduction are illegally copied, the decryption cannot be done in the decryption system for the recording medium.

FIG. 35 shows a decryption basic processing flow of the present invention. First, when a medium (optical disc) is inserted into a device main body, a media type recorded in a system such as irreversible recording is detected, and a medium for exclusive use in reproduction or a recording medium is selected. Further as a processing method, a software system or a hardware system is selected. As a result, one decryption processing is selected from four ways, that is, 1) decryption of a prerecorded medium for the S/W system;

2) decryption of the prerecorded medium for the H/W system;

3) decryption of a recordable medium for the S/W system; and 4) decryption of the recordable medium for the H/W system.

In FIG. 35, step ST1 is a step of reading the media type, control data or the like, and step ST2 is a step of judging a disc for exclusive use in reproduction or a recordable/reproducible disc. Step ST3 (S4) is a step of determining reproduction (recording/reproducing) by a hardware main body device or reproduction (recording/reproducing) by a software main body device. Therefor, encryption/decryption processing differs for a hardware main body and a software main body (steps ST5 to ST8).

Figure 36:
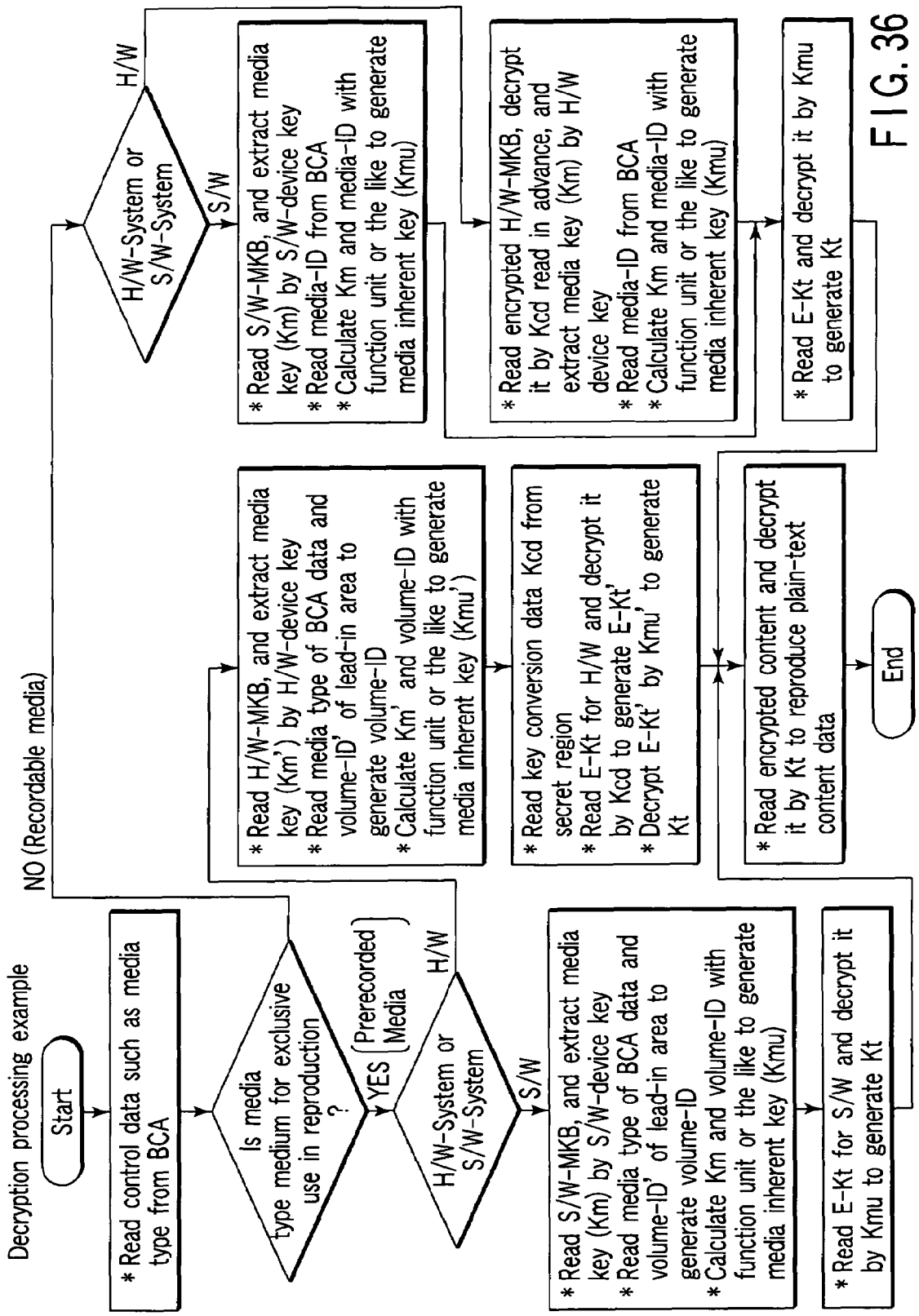
FIG. 36 is a diagram describing processing steps of each decryption in FIG. 35 in detail.

FIG. 36 describes processing steps of each decryption in FIG. 35 in detail.

Figure 37:
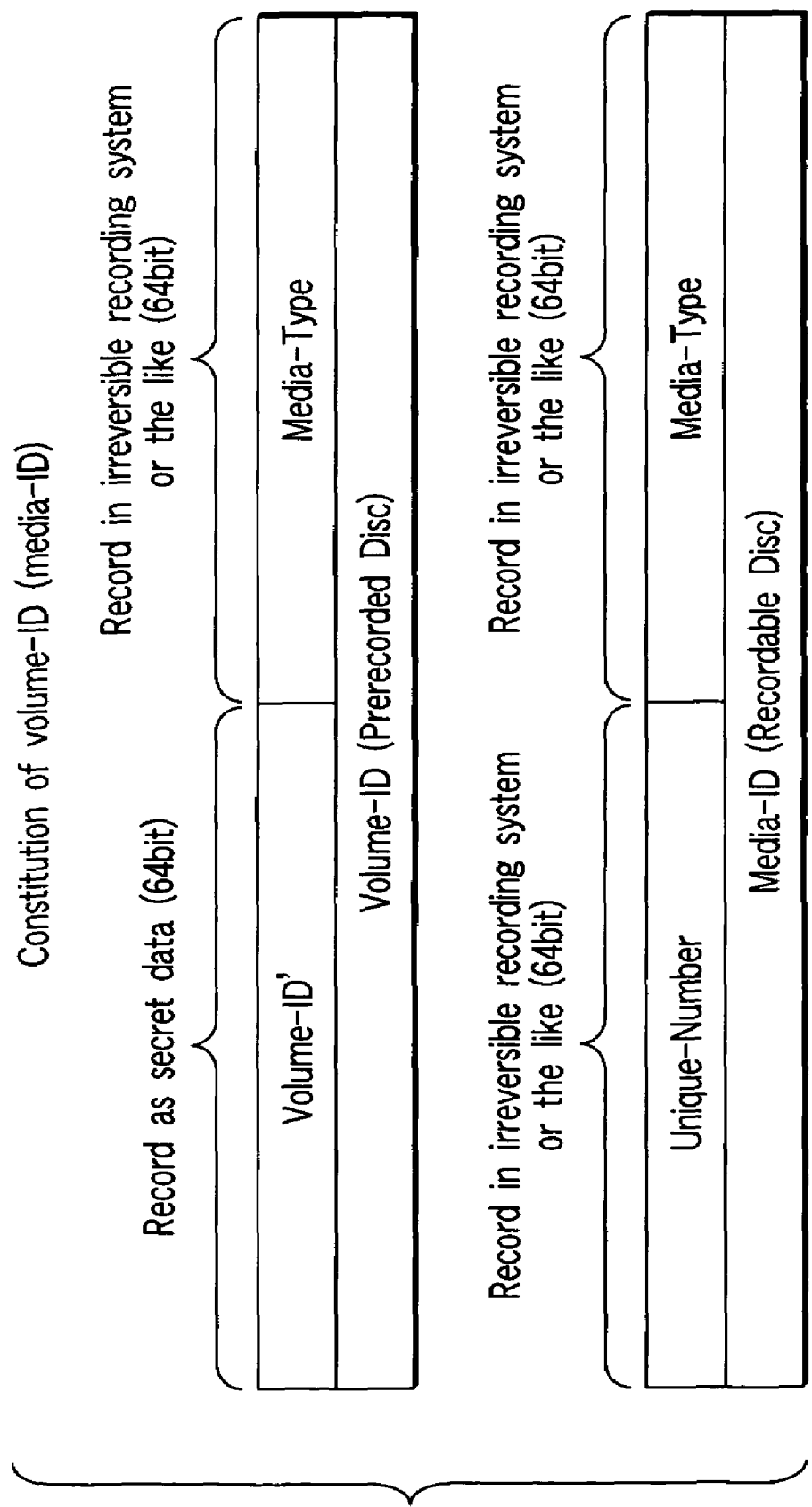
FIG. 37 is a diagram showing a data constitution example in which volume-ID or media-ID associated with the present invention is constituted to be as common as possible by pre-recorded media and recordable media, and a security ability is accordingly improved.

FIG. 37 is a diagram showing a data constitution example in which conventional constitutions of the volume-ID or the media-ID are set to be as common as possible by the prerecorded media and the recordable media, and the security ability is accordingly improved.

The volume-ID in the conventional CPPM has been recorded in a lead-in area, but in the present invention, the information is divided into two: a volume-ID'; and a media type. The volume-ID' is recorded in a place similar to a conventional place, the media type is irreversibly recorded as in a BCA, or recorded in a recording emboss pattern similar to that of the BCA in the same BCA.

On the other hand, as to the recording medium, a unique number and the media type are irreversibly recorded in the BCA or the like for each medium in order to impart a media binding function.

According to this constitution, the recording/reproducing device first reads information of the area in which the media type is recorded. Consequently, the subsequent processing system can be determined, and it is possible to perform another processing together with the copyright protecting function quickly.

Efforts have heretofore been made to constitute the encryption structure to be common, but in the present invention, this way of thinking has been changed, and effective enhancement of a protection ability can be realized by introducing of a devised system based on how to optimize the copyright protection.

A large number of characteristics in the present invention include the following technology.

In a system in which information such as a content is encrypted and recorded/reproduced, mutual encryption/decryption trees are varied between a system (software main body device) comprising a recording/reproducing drive of a recording medium and a personal computer (PC), and a recorder system (hardware main body device) in which the drive is integrated with a data coding/modulation processing section. As to a recording medium type, the encryption/decryption trees are varied from each other between a medium for exclusive use in reproduction and the recording medium.

Even in a case where information such as a content is encrypted and recorded in either of the software main body device and the hardware main body device, the information can be correctly reproduced and decrypted in the mutual devices. A device key set for software processing is constituted separately from that for hardware processing, and the hardware device key set cannot be utilized as the set for the software processing. There is also included a technology in which media key blocks (MKB) recorded beforehand in the recording medium are different MKBs calculated and generated for exclusive uses in the software processing and the hardware processing, respectively.

There is also included a technology in which a place where the MKB is to be recorded is a lead-in area for the hardware, and a data area for the S/W processing. It is included that the MKB for the software main body device and that for the hardware are constituted by the same data file. It is included that the MKBs are different for the medium for exclusive use in reproduction and the recording medium. It is included that in a case where the recording medium is a blank medium or an old MKB, the latest MKB for the recording medium, recorded in the medium for exclusive use in reproduction, is read and stored beforehand in a memory in the recording/reproducing device, and the old MKB is updated.

The device key set for the software is appropriately updated by network connection. Encryption title keys for use in decryption of encryption information are encryption title keys which are different for a software processing tree and a hardware processing tree. Only in the hardware encryption/decryption processing system, there is incorporated an MKB conversion data or encryption key conversion data processing section (KCD processing section) constituted by the hardware processing. In the recording/reproducing drive (including the exclusive use in reproduction) of the recording medium, the KCD processing section is incorporated in advance, and can be selected in such a manner that the section is valid in the H/W processing system, and invalid in the S/W processing system. An output signal (KCD) of the KCD processing section is prohibited from being output in a case where the drive for exclusive use in reproduction or the recording/reproducing drive is incorporated in a PC system, and bus authentication processing to be performed before transmission of the encrypted encryption key or control data is performed. The KCD signal generated by the KCD processing section is recorded in the secret area of the recording medium.

The recording/reproducing of the data with respect to the secret area is processed only in the drive, and constituted in such a manner as to be prevented from being controlled from the outside. There is also included a technology in which media type identification information is recorded in the same place (e.g., inner area from the lead-in area) in the medium for exclusive use in reproduction and the recording medium. The media type information is recorded in the BCA. In the recording medium, there are constituted media inherent identification information and media type information recorded by irreversible recording for each medium. The media type information of the medium for exclusive use in reproduction is constituted of the same media type recording place and recording pattern system as those recorded in the recording medium, and generated in a system in which a recording film is irreversibly recorded or a constitution by an emboss molding.

In a constitution of the present invention in which the media type information is incorporated in the encryption/decryption tree, a problem sometimes occurs in a master board producing process in a case where information such as a content is encrypted and supplied as the medium for exclusive use in reproduction. That is, in authoring processing to edit information data and check the data as final stream data, there is a method of recording a stream in a write-once type recording medium for authoring to evaluate the data with a usually commercially available player as a final confirmation step. However, in a case where the media type information is incorporated in the encryption/decryption tree, it is difficult to realize this method.

However, when the media type information for exclusive use in reproduction is also written into the media type information of the recording medium for authoring, it is possible to record in the write-once type recording medium the encrypted content to be recorded for exclusive use in reproduction and perform final check. In the detailed description of the contents of the present invention, the media type identification information has been described as the media type information, but the media type information mentioned herein can be utilized as content type identification information (Content-Type), not in the media type identification.

A content type recorded in the recording medium based on this way of thinking is used as identification information for identifying a content for exclusive use in reproduction or a content recorded by the user. Consequently, a conventional authoring problem can be solved.

In a system in which the content of the recording medium is encrypted and recorded/reproduced to thereby realize copyright protection, as device configurations, there can be assumed: a hardware device system in which the drive taking charge of the data recording/reproducing processing of the recording medium is connected to a host device such as a personal computer to constitute the system; and a hardware device system in which the drive and the encode/decode processing of the content are installed in the same housing to constitute the system incapable of scheming the intermediate signal of the processing step. Here, the device key which is the secret key of the encryption base in the encryption tree is generally network connection in the software system, and periodic update can be introduced.

That is, even when the device key as the secret key is hacked, the system is easily updated in the update processing of the device key. On the other hand, in the hardware system, the system is utilized without being connected to the network in a main configuration. Therefore, it can be said that it is difficult to update the device key in the system. However, since the data processing step is performed in the exclusive-use housing, the constitution is not easily seen by the user. Therefore, the drive is easily provided with a function of reading special secret data and comparing and judging the data. The drive for use in the software system has a structure which is controlled in response to the standardized command signal and in which the drive is brought into management by the host, and therefore a special processing function cannot be imparted.

The device keys are independently constituted for the software system and the hardware system by skillful use of the peculiar properties of the software processing system and the hardware processing system (it is not a problem whether the actual data processing is software or hardware). Consequently, the software system can be quickly updated by the periodic update processing The device key for the hardware processing cannot be utilized in the software system in which the violation is very quickly diffused. Therefore, damages can be minimized at a time when the violation is caused in the system updating by the conventional MKB updating.

Heretofore, efforts have been made to constitute the encryption structure to be common, but in the present invention, this way of thinking has been changed, and effective enhancement of a protection ability can be realized by introducing of a devised system based on how to optimize the copyright protection.

Furthermore, the constitution is not constituted to be common with the medium for exclusive use in reproduction and the recording/reproducing medium. The constitution can be positively changed to realize improvements of the function and ability largely in the technology.

The following characteristics of the embodiments according to the present invention are applied to an information recording/reproducing method, a reproduction device of an information recording medium, a recording/reproducing device, and an information recording medium.

Typical constituting elements of the present invention will be illustrated as follows.

<Regarding the whole> In an information recording/reproducing method of encrypting information such as a content to record the information in a recording medium or reproduce the information from the recording medium, there are provided: first encryption/decryption processing information (may be referred to as an encryption/decryption tree) disposed in a software main body comprising a recording/reproducing drive and a personal computer; and second encryption/decryption processing information disposed in a hardware main body in which the drive is integrated with a data coding/demodulation processing circuit, and the first and second encryption/decryption processing information are varied.

<Regarding the MKB> Contents of a media key block (MKB) for use in decrypt a title key are different from each other between the first encryption/decryption processing information and the second encryption/decryption processing information (key symbols: MKB for S/W, MKB for H/W).

<Represented by FIG. 7> The title key is decrypted using the media key block (MKB) and an encrypted title key (E-Kt) in a plurality of stages, but contents of the media key block (MKB) and those of the encrypted title key (E-Kt) are different from each other between the first encryption/decryption tree and the second encryption/decryption tree (key symbols: MKB for S/W, MKB for H/W, E-Kt for S/W, and E-Kt for H/W).

<Represented by FIGS. 8, 11> On the side of the software main body, as the encrypted title keys, there are generated an encrypted title key (E-Kt-S/W) on a software main body side and a different encrypted title key (E-Kt-H/W) on a hardware main body side in such a manner that the encrypted information including the content can be decrypted on the software and hardware main body sides in a case where the information is processed to obtain the encrypted information.

<Represented by FIGS. 9, 12> On the side of the hardware main body, as the encrypted title keys, there are generated an encrypted title key (E-Kt-S/W) on the software main body side and the different encrypted title key (E-Kt-H/W) on the hardware main body side in such a manner that the encrypted information including the content can be decrypted on the hardware and software main body sides in a case where the information is processed to obtain the encrypted information.

<Represented by FIG. 10> The title key is decrypted using the media key block (MKB) and the encrypted title key (E-Kt) in a plurality of stages, but the contents of the media key block (MKB) and those of the encrypted title key (E-Kt) are different from each other between the first encryption/decryption tree and the second encryption/decryption tree, and the media key block (MKB) for use on the hardware main body side is encrypted, and designed in such a manner as to be decrypted by key conversion data (KCD) from the recording medium and used (key symbols: MKB for S/W, E-MKB for H/W, E-Kt for S/W, and E-Kt for H/W).

<Represented by FIG. 13> The title key is decrypted using the media key block (MKB) and the key conversion data (KCD) in a plurality of stages, but the contents of the media key block (MKB) are different from each other between the first encryption/decryption tree and the second encryption/decryption tree, the key conversion data (KCD) from the recording medium is used on the hardware main body side, and this key conversion data (KCD) is regarded as non-adopted on the software main body side (MKB for S/W, E-MKB for H/W, and KCD).

<Common E-Kt represented by FIG. 13> The title key is decrypted using the media key block (MKB), the key conversion data (KCD), and the encrypted title key (E-Kt) in a plurality of stages, but the contents of the media key block (MKB) are different from each other between the first encryption/decryption tree and the second encryption/decryption tree. The key conversion data (KCD) from the recording medium is used on the hardware main body side, this key conversion data (KCD) is regarded as non-adopted on the software main body side, and a common encrypted title key (E-Kt) is used between the first encryption/decryption tree and the second encryption/decryption tree.

<Represented by FIG. 16> <Key symbols: MKB for S/W, MKB for H/W, E-Kt for S/W, E-Kt for H/W, and Key Conversion Data>

The title key is decrypted using the media key block (MKB), and the encrypted title key (E-Kt) in a plurality of stages, but the contents of the media key block (MKB) are different from each other between the first encryption/decryption tree and the second encryption/decryption tree. The contents of the encrypted title key (E-Kt) are different from each other. The encrypted title key (E-Kt) for use on the hardware main body side is encrypted, and is designed in such a manner as to be decrypted by the key conversion data (KCD) from the recording medium and used.

<Regarding latest MKB> Two types of media key blocks (MKB for S/W, MKB for H/W) for use in decrypting the title key are read from the used latest recording medium, and written into the next recording medium for use.

<Information recording medium> In an information recording medium <Key symbols: MKB-S/W and MKB-H/W> in which information such as a content is encrypted and recorded or from which recorded encryption information is reproduced, different encryption/decryption trees are obtained as a first encryption/decryption tree disposed in a software main body comprising a recording/reproducing drive and a personal computer and a second encryption/decryption tree disposed in a hardware main body in which the drive is integrated with a data coding/demodulation processing circuit. To obtain them, two types of media key blocks for use in decrypting a title key, having different contents, are recorded as a media key block (MKB-S/W) for the software main body and that (MKB-H/W) for the hardware main body.

<Information recording medium> The title key is decrypted using the media key block (MKB) and the encrypted title key (E-Kt) in a plurality of stages between the first encryption/decryption tree and the second encryption/decryption tree <Key symbols: MKB-S/W, MKB-H/W, Kt-S/W, and Kt-H/W>. Here, two types of encrypted title keys having different contents are recorded: an encrypted title key (Kt-S/W) for the software main body; and an encrypted title key (Kt-H/W) for the hardware main body.

<KCD+MKB-H/W is key symbol> In order to record a multiplexed and encrypted block as the media key block (MKB-H/W) for the hardware main body, there is further recorded key conversion data (KCD) for encryption processing.

<KCD+E-Kt-H/W is key symbol> <represented by FIGS. 16, 17> In order to record a multiplexed and encrypted key as the encrypted title key (E-Kt-H/W) for the hardware main body, there is further recorded the key conversion data (KCD) for encryption/decryption processing.

<UD> <Represented by FIG. 19>

Encrypted update information (E-UD) is recorded in order to update, encrypt, and store the title key decrypted at a reproduction time.

<Represented by FIG. 5> The media key block (MKB-S/W) for the software main body is recorded in a data zone, and a media key block (MKB-H/W) for the hardware main body is recorded in a lead-in area.

<Represented by FIGS. 22 and 23> The media key block (MKB-S/W) for the software main body and the media key block (MKB-H/W) for the hardware main body are recorded as one file.

<Represented by FIG. 24> The media key block (MKB-S/W) for the software main body and the media key block (MKB-H/W) for the hardware main body for exclusive use in reproduction are recorded in the lead-in area, and the media key block (MKB-S/W) for the software main body and the media key block (MKB-H/W) for the hardware main body for use in recording/reproducing are recorded in the data zone.

<Recording/reproducing device> There are defined: a device of a software main body comprising a recording/reproducing dive and a personal computer; and a device of a hardware main body in which the recording/reproducing drive is integrated with a data coding/demodulation processing circuit. In the recording/reproducing drive (including the drive for exclusive use in reproduction), there are incorporated: a pickup head (PUP) which reads information recorded in a recording medium; a reproduction processing section (507, 508, 509, 511) which reproduces the read information; a data processing section (512) which demodulates the reproduced data or which modulates data for recording; a KCD detecting section (520) which detects key conversion data (KCD) from the reproduced data; an authenticating section (525) capable of performing mutual authentication between the drive and a host computer; and an interface section. Here, in a case where the drive is incorporated in the device of the software main body via the interface section, the interface section is interrupted from the KCD detecting section, and the authenticating section is set to an operable state.

<Recording/reproducing device> There are defined: a device of a software main body comprising a recording/reproducing dive and a personal computer; and a device of a hardware main body in which the recording/reproducing drive is integrated with a data coding/demodulation processing circuit. In the recording/reproducing drive (including the drive for exclusive use in reproduction), there are incorporated: a pickup head (PUP) which reads information recorded in a recording medium; a reproduction processing section (507, 508, 509, 511) which reproduces the read information; a data processing section (512) which demodulates the reproduced data or which modulates data for recording; a KCD detecting section (520) which detects key conversion data (KCD) from the reproduced data; an authenticating section (525) capable of performing mutual authentication between the drive and a host computer; and an interface section. In a case where the recording/reproducing drive is incorporated in the device of the hardware main body via the interface section, an on-state is set between the interface section and the KCD detecting section, and the authenticating section is set to an inoperable state.

Furthermore, the characteristics of the present invention will be summarized as follows.

(1) In an embodiment of the present invention, in order to encrypt information such as a content and record the information in a recording medium or reproduce the information from the recording medium, there are defined: first A encryption/decryption processing information disposed for a software main body comprising a recording/reproducing drive and a personal computer and for a medium for exclusive use in reproduction; and first B encryption/decryption processing information disposed for the software main body and a recording/reproducing medium. There are also defined: second A encryption/decryption processing information disposed for a hardware main body in which the recording/reproducing drive and a data coding/demodulation processing circuit are integrally incorporated in the same housing and for the medium for exclusive use in reproduction; and second B encryption/decryption processing information disposed for the hardware main body and the recording/reproducing medium. Furthermore, contents of the first A, first B, second A, and second B encryption/decryption processing information are varied. Here, an information recording/reproducing method has characteristics in adoption of either of the first A and first B encryption/decryption processing information and the second A and second B encryption/decryption processing information.

Moreover, the embodiment of the present invention has characteristics as an information recording/reproducing device having either of processing means of the first A and first B encryption/decryption processing information and processing means of the second A and second B encryption/decryption processing information. The device of the software main body has the processing means of the first A and first B encryption/decryption processing information, and the device of the hardware main body has the processing means of the second A and second B encryption/decryption processing information.

(2) Moreover, in the embodiment of the present invention, information such as a content is encrypted based on a media key, and the media key is generated as a media key block (MKB) encrypted by a plurality of device keys. Moreover, the encrypted content and the encrypted media key block (MKB) are both recorded in the same recording medium. The plurality of device keys are selected from a plurality of device key sets obtained by selecting the specific number of the keys in different combinations, respectively, and the keys are distributed to an encryption/decryption system.

Here, there is a characteristic that a plurality of device keys 1 for generation of media key blocks (MKB1A, MKB1B) in the first A and first B encryption/decryption processing information of the software main body are different from a plurality of device keys 2 for generation of media key blocks (MKB2A, MKB2B) in the second A and second B encryption/decryption processing information of the hardware main body.

(3) Moreover, the plurality of device key sets are distributed to each encryption/decryption system, and utilized as secret keys to encrypt and decrypt information such as a content. Moreover, the device key set 1 distributed to the encryption/decryption system in the first A and first B encryption/decryption processing information of the software main body are different from the device key set 2 distributed to the encryption/decryption system in the second A and second B encryption/decryption processing information of the hardware main body in respect of a plurality of selected original device keys.

(4) Furthermore, in the embodiment of the present invention, the media key blocks (MKB1A, MKB1B, MKB2A, and MKB2B) in the first A, first B, second A, and second B encryption/decryption processing information are different from one another.

(5) Additionally, in the embodiment of the present invention, the media key block includes the first and second media key blocks, and the first media key block (MKB1A, MKB1B) is recorded as a data file 1 in a data area. The second media key block (MKB2A, MKB2B) is recorded as a data file 2 in a lead-in area.

(6) Moreover, in the embodiment of the present invention, the media key blocks (MKB1A, MKB1B, MKB2A, and MKB2B) in the first A, first B, second A, and second B encryption/decryption processing information may be constituted as the same MKB data file, and recorded in the medium.

(7) Furthermore, the media key blocks (MKB1A, MKB1B, MKB2A, and MKB2B) are recorded as the media key blocks (MKB) to be recorded in the medium for exclusive use in reproduction, and MKB1B and MKB2B are recorded as the media key blocks (MKB) to be recorded in the recording/reproducing medium.

(8) Additionally, in the embodiment of the present invention, information such as a content is encrypted by the title key, recorded as an encrypted content (Enc-Content) in the recording medium, and decrypted by the title key into a plain-text content in a reproducing operation of the recorded encrypted content (Enc-Content). The title key (Kt) is encrypted by a media inherent key (Kmu) generated by a media key (Km) and media identification information (Volume-ID), and recorded as an encrypted title key (Enc-Kt) in the recording medium. In a case where the title key (Kt) is decrypted from the recorded encrypted title key (Enc-Kt), the encrypted title key (Enc-Kt) is decrypted by the media inherent key (Kmu) to obtain the decrypted title key (Kt). The decrypted title key (Kt) is utilized in decryption of the encrypted content. Furthermore, the media key (Km) is extracted by decrypting the media key block (MKB) by use of the device key set, and utilized as an encryption/decryption key.

In this case, the media identification information (Volume-ID) is generated by a set of media type information (Media-Type) and media inherent information (Volume-ID').

(9) Moreover, in the embodiment of the present invention, the media type information (Media-Type) is disposed in a burst cutting area (BCA) constituted internally from the lead-in area of the recording medium.

(10) Furthermore, in the embodiment of the present invention, media inherent identification information (Media-ID) is recorded in advance in the recording/reproducing medium, and the media inherent identification information (Media-ID) comprises: an identification number (Unique-Number) inherent in each medium; and media type information (Media-Type). Moreover, the information is utilized instead of the media identification information (Volume-ID) for generation of a media inherent key (Kmu) for use in encryption of the title key (Kt).

(11) The media inherent identification information (Media-ID) may be disposed in BCA data inside the lead-in area.

(12) Moreover, in the embodiment of the present invention, information such as a content is encrypted by the title key, recorded as the encrypted content (Enc-Content) in the recording medium, and decrypted by the title key into the plain-text content in the reproducing operation of the recorded encrypted content (Enc-Content). The title key (Kt) is encrypted by the media inherent key (Kmu) generated by the media key (Km) and the media identification information (Volume-ID), and recorded as the encrypted title key (Enc-Kt) in the recording medium. In a case where the title key is decrypted from the recorded encrypted title key (Enc-Kt), the title key is decrypted by the media inherent key (Kmu), and utilized in decryption of the encrypted content. The media key (Km) is extracted by decryption of the media key block (MKB) by use of the device key set, and utilized as the encryption/decryption key. Here, constituting elements which are not present in the first A and first B encryption/decryption processing information are incorporated in the second A and second B encryption/decryption processing information of the hardware main body with respect to the first A and first B encryption/decryption processing information of the software main body.

(13) Key conversion data (KCD) which is not present in the first A and first B encryption/decryption processing information is included in the second A and second B encryption/decryption processing information of the hardware main body with respect to the first A and first B encryption/decryption processing information of the software main body. Moreover, there exists a processing step of encrypting/decrypting any other processing information by the KCD.

(14) The second A (for the medium for exclusive use in reproduction) and second B (for the recording medium) encryption/decryption processing information of the hardware main body include the key conversion data (KCD) which is not present in the first A (for the medium for exclusive use in reproduction) and first B (for the recording medium) encryption/decryption processing information of the software main body. Moreover, in a case where the processing step of encrypting/decrypting any other processing information by the KCD is incorporated into a signal processing step, the constituting elements encrypted/decrypted by the KCD of the second A (for the medium for exclusive use in reproduction) encryption/decryption processing information are constituted in such a manner as to be different from those encrypted/decrypted by the KCD of the second B (for the recording medium) encryption/decryption processing information.

(15) In the embodiment of the present invention, a first A (for the medium for exclusive use in reproduction) encryption processing structure of the software main body, and a second A (for the medium for exclusive use in reproduction) encryption processing structure of the hardware main body are integrally incorporated in a master board recording device authorized by the copyright protection management association. The second A encryption processing structure of the hardware main body is incorporated in a position in which the encrypted title key (Enc-Kt) is multiplexed and encrypted (EncEnc-Kt) by the KCD.

(16) The characteristics are characteristics incorporated in an information recording/reproducing method, an information recording/reproducing device, and an information recording medium for realizing these method and device.

(17) Moreover, as an information recording medium, in order to encrypt information such as a content and record the information in the recording medium or reproduce the information from the recording medium, there are defined: first A encryption/decryption processing information disposed for a software main body comprising a recording/reproducing drive and a personal computer and for a medium for exclusive use in reproduction; and first B encryption/decryption processing information disposed for a software main body and a recording/reproducing medium. There are also defined: second A encryption/decryption processing information disposed for a hardware main body in which the recording/reproducing drive and a data coding/demodulation processing circuit are integrally incorporated in the same housing and for the medium for exclusive use in reproduction; and second B encryption/decryption processing information disposed for the hardware main body and the recording/reproducing medium. Furthermore, contents of the first A, first B, second A, and second B encryption/decryption processing information are varied.

Here, the first A and second A encryption/decryption processing information are recorded in the medium for exclusive use in reproduction. The first B and second B encryption/decryption processing information are recorded in the recording/reproducing medium.

It is to be noted that the present invention is not limited to the above-described embodiments as such, and constituting elements can be modified and embodied in a range which does not depart from the scope in an implementation stage. Various inventions can be formed by an appropriate combination of a plurality of constituting elements disclosed in the above-described embodiments. For example, several constituting elements may be omitted from all of the constituting elements described in the embodiment. Furthermore, the constituting elements ranging over different embodiments may be appropriately combined.

Even in a case where the encryption key of the device whose main body is hardware is stolen, it is difficult to produce a large amount of devices whose main bodies are the hardware in a short period. Effects can be expected in a revoking system in conventional CPPM or CPRM. On the other hand, in a device whose main body is software, it is easy to update information utilized for encryption/decryption via a network, and it is possible to improve secrecy.

In a case where the encryption/decryption processing information of the medium for exclusive use in reproduction is different from that of the recording medium, even when a fraudulent action occurs to copy the encrypted content and the encrypted encryption key recorded in the medium for exclusive use in reproduction completely into the recording medium, correct decryption processing becomes difficult, because the processing information differs for each media type, so that an illegal copy preventing ability is largely improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A software information reproducing apparatus to decrypt encrypted content from a medium and to obtain decrypted content under control of a control section, the software information reproducing apparatus comprising:

a record of a first media key block for software and a second media key block for hardware being recorded in the medium in which contents of the first and second media key blocks are different, a record of key conversion data being recorded in the medium, and an area to record an encrypted title key, the encrypted content, and a media ID being provided on the medium;

a first device key set corresponding to the first media key block is provided in a software apparatus, the software apparatus comprising a recording/reproducing drive and a personal computer in which the encryption/decryption of the content is performed by application software, and the first device key set is configured to update; and a second device key set corresponding to the second media key block is provided in a hardware apparatus, the hardware apparatus comprises a recording/reproducing drive and a data coding/decoding processing circuit which are integrally incorporated in the same housing, and the second device key set is fixed and unchanged, wherein the software information apparatus comprises:
    means for reading the first media key block, key conversion data, the media ID, and the encrypted title key from the medium;
    means for processing the first device key set and the first media key block without the key conversion data, and obtaining a first media key;
    means for detecting a decrypted title key from the encrypted title key by using the first media key; and
    means for decrypting the encrypted content by using the decrypted title key.

2. The software information reproducing apparatus according to claim 1, wherein the encrypted title key includes a first encrypted title key for the software and second encrypted title key for the hardware, the first encrypted title key is used for detecting a decrypted title key.

3. A hardware information reproducing apparatus to decrypt encrypted content from a medium and to obtain decrypted content under control of a control section, comprising:

a record of a first media key block for software and a record of a second media key block for hardware are recorded on the medium in which contents of the first and second media key blocks are different, a record of key conversion data being recorded in the medium, and an area to record an encrypted title key, the encrypted content, and a media ID being provided on the medium a first device key set corresponding to the first media key block is provided in a software apparatus, the software apparatus comprises a recording/reproducing drive and a personal computer in which the encryption/decryption of the content is performed by application software, and the first device key set is able to update, and a second device key set corresponding to the second media key block is provided in a hardware apparatus, the hardware apparatus comprises a recording/reproducing drive and a data coding/decoding processing circuit which are integrally incorporated in the same housing, and the second device key set is fixed and unchanged, the hardware information apparatus comprising:
- means for reading the second media key block, key conversion data, the media ID and the encrypted title key from the medium;
- means for processing the second device key set, the second media key block and the key conversion data, and obtaining a second media key;
- means for detecting a decrypted title key from the encrypted title key by using the second media key; and
- means for decrypting the encrypted content by using the decrypted title key.

4. The hardware information reproducing apparatus according to claim 3, wherein the encrypted title key includes a second encrypted title key for the software and second encrypted title key for the hardware, the second encrypted title key is used for detecting a decrypted title key.

* * * * *